United States Patent
Svendsen

(10) Patent No.: US 11,283,937 B1
(45) Date of Patent: Mar. 22, 2022

(54) SHARING IMAGES BASED ON FACE MATCHING IN A NETWORK

(71) Applicant: Ikorongo Technology, LLC, Chapel Hill, NC (US)

(72) Inventor: Hugh B. Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 0 days.

(21) Appl. No.: 16/991,089

(22) Filed: Aug. 12, 2020

Related U.S. Application Data

(60) Provisional application No. 62/887,114, filed on Aug. 15, 2019, provisional application No. 63/012,175, filed on Apr. 19, 2020.

(51) Int. Cl.
```
G06K 13/00      (2006.01)
H04N 1/00       (2006.01)
H04W 4/80       (2018.01)
G06K 9/00       (2022.01)
H04W 84/18      (2009.01)
H04W 84/12      (2009.01)
```

(52) U.S. Cl.
CPC ..... H04N 1/00209 (2013.01); G06K 9/00255 (2013.01); G06K 9/00288 (2013.01); H04W 4/80 (2018.02); H04N 2201/0084 (2013.01); H04W 84/12 (2013.01); H04W 84/18 (2013.01)

(58) Field of Classification Search
CPC ....... H04W 84/18; H04W 84/12; H04W 4/80; H04N 2201/0084; H04N 1/00209; G06K 9/00255; G06K 9/00288
See application file for complete search history.

(56) References Cited

U.S. PATENT DOCUMENTS

| | | | |
|---|---|---|---|
| 6,256,737 B1 * | 7/2001 | Bianco | G07C 9/37 713/186 |
| 6,526,158 B1 | 2/2003 | Goldberg | |
| 6,591,068 B1 | 7/2003 | Dietz | |
| 6,606,398 B2 | 8/2003 | Cooper | |
| 6,801,907 B1 * | 10/2004 | Zagami | G07C 9/253 |
| 6,819,783 B2 | 11/2004 | Goldberg | |

(Continued)

OTHER PUBLICATIONS

James, Bruce How P2P (Peer to Peer) File Sharing Works, Makeuseof.com, dated Oct. 1, 2018, 15 pages.

*Primary Examiner* — Philip P. Dang

(57) ABSTRACT

The present disclosure describes a first device to send a second device a face template of the user of the first device. When the second device captures an image, the second device may compare the face template to a second face template derived from the captured image. If a match is determined to exist, the second device may send the captured image to the first device. The face template may be transferred over a first communication interface, while the captured image may be sent over a second communication interface. The first communication interface may be Bluetooth and the second communication interface may be WIFI Direct. As such, the system may function in environments without cellular coverage and/or infrastructure WIFI networks. Additionally, the user of the first device does not need to be identified, only matched to the second face template.

26 Claims, 37 Drawing Sheets

(56) References Cited

U.S. PATENT DOCUMENTS

| | | | |
|---|---|---|---|
| 7,006,672 B2* | 2/2006 | Sato | G06K 9/00288 382/118 |
| 7,050,608 B2* | 5/2006 | Dobashi | G07C 9/37 382/118 |
| 7,068,309 B2 | 6/2006 | Toyama et al. | |
| 7,107,605 B2 | 9/2006 | Janik | |
| 7,131,136 B2* | 10/2006 | Monroe | G08B 13/1966 725/105 |
| 7,154,642 B2 | 12/2006 | Lichtfuss | |
| 7,203,367 B2 | 4/2007 | Shniberg et al. | |
| 7,221,931 B2* | 5/2007 | Benco | G06K 9/00604 348/14.01 |
| 7,266,563 B2 | 9/2007 | Morris et al. | |
| 7,391,886 B1 | 1/2008 | Clark | |
| 7,376,276 B2 | 5/2008 | Shniberg et al. | |
| 7,376,696 B2 | 5/2008 | Bell | |
| 7,426,532 B2 | 9/2008 | Bell | |
| 7,472,134 B2 | 12/2008 | Kaku | |
| 7,526,106 B1 | 4/2009 | Clark | |
| 7,546,947 B1* | 6/2009 | Arias | G06Q 20/04 235/380 |
| 7,555,148 B1* | 6/2009 | Steinberg | G06F 16/583 382/118 |
| 7,561,723 B2 | 7/2009 | Goldberg | |
| 7,619,660 B2 | 11/2009 | Grosvenor | |
| 7,634,662 B2* | 12/2009 | Monroe | G08B 25/016 713/186 |
| 7,684,651 B2 | 3/2010 | Tang et al. | |
| 7,716,157 B1 | 5/2010 | Bourdev et al. | |
| 7,719,989 B2 | 5/2010 | Yau | |
| 7,730,130 B2 | 6/2010 | Issa | |
| 7,739,304 B2 | 6/2010 | Naaman et al. | |
| 7,783,085 B2 | 8/2010 | Perlmutter et al. | |
| 7,860,347 B2 | 12/2010 | Tang et al. | |
| 7,881,548 B2* | 2/2011 | Ono | G06T 11/60 382/254 |
| 7,907,755 B1 | 3/2011 | Perlmutter et al. | |
| 7,933,972 B1 | 4/2011 | Issa et al. | |
| 7,965,908 B2 | 6/2011 | Hayashi | |
| 7,979,716 B2* | 7/2011 | Fiske | G06F 21/46 713/184 |
| 7,995,806 B2 | 8/2011 | Goh et al. | |
| 8,014,572 B2 | 9/2011 | Xiao et al. | |
| 8,059,858 B2* | 11/2011 | Brundage | G06Q 20/347 382/100 |
| 8,144,939 B2* | 3/2012 | Thorn | G06F 16/58 382/115 |
| 8,144,944 B2 | 3/2012 | Ishii | |
| 8,189,880 B2 | 5/2012 | Wen et al. | |
| 8,204,437 B1 | 6/2012 | Rothschild | |
| 8,233,679 B2 | 7/2012 | Perlmutter et al. | |
| 8,292,178 B2* | 10/2012 | Chaves | G06K 19/06046 235/462.01 |
| 8,301,893 B2* | 10/2012 | Brundage | G07D 7/04 713/176 |
| 8,306,284 B2 | 11/2012 | Goldberg et al. | |
| 8,315,463 B2 | 11/2012 | Gallagher et al. | |
| 8,316,096 B2 | 11/2012 | Svendsen et al. | |
| 8,321,913 B2 | 11/2012 | Turnbull et al. | |
| 8,325,999 B2 | 12/2012 | Kapoor et al. | |
| 8,341,145 B2 | 12/2012 | Dodson et al. | |
| 8,358,811 B2 | 1/2013 | Adams et al. | |
| 8,385,971 B2* | 2/2013 | Rhoads | G06K 9/4604 455/556.1 |
| 8,386,620 B2 | 2/2013 | Chatterjee | |
| 8,396,265 B1 | 3/2013 | Ross et al. | |
| 8,437,797 B2 | 5/2013 | Rothschild | |
| 8,498,233 B2* | 7/2013 | Wu | H04L 12/185 370/312 |
| 8,570,586 B2* | 10/2013 | Calhoon | H04N 1/32325 358/1.18 |
| 8,577,053 B1* | 11/2013 | Simon | H04R 3/005 381/82 |
| 8,594,722 B2 | 11/2013 | Rothschild | |
| 8,600,121 B2* | 12/2013 | Gamliel | G06K 9/00281 382/118 |
| 8,655,053 B1* | 2/2014 | Hansen | G06Q 10/10 382/154 |
| 8,666,123 B2 | 3/2014 | Gossweiler et al. | |
| 8,667,560 B2 | 3/2014 | Albisu | |
| 8,688,579 B1* | 4/2014 | Ethington | G06Q 20/042 705/42 |
| 8,805,110 B2 | 8/2014 | Rhoads | |
| 8,818,049 B2 | 8/2014 | Wren et al. | |
| 9,300,910 B2* | 3/2016 | Shoemake | H04N 7/147 |
| 9,310,977 B2* | 4/2016 | Ahmed | H04N 5/23206 |
| 9,350,944 B2* | 5/2016 | Lee | G06K 9/00295 |
| 9,485,459 B2* | 11/2016 | Shoemake | H04N 7/14 |
| 9,638,537 B2 | 5/2017 | Abramson | G01C 21/3626 |
| 9,674,700 B2 | 6/2017 | John Archibald | |
| 9,916,010 B2* | 3/2018 | Harris | G06K 9/00671 |
| 9,916,538 B2* | 3/2018 | Zadeh | G06K 9/627 |
| 9,979,800 B2* | 5/2018 | Berookhim | G06K 9/00288 |
| 10,057,753 B2 | 8/2018 | Leppanen | |
| 10,135,815 B2 | 11/2018 | Perold | |
| 10,223,710 B2* | 3/2019 | Purves | G06F 3/011 |
| 10,262,126 B2* | 4/2019 | Tussy | H04W 12/065 |
| 10,334,158 B2* | 6/2019 | Gove | G06F 3/04883 |
| 10,432,728 B2* | 10/2019 | Dachille | G06F 21/32 |
| 10,459,254 B2* | 10/2019 | Antaki | G06F 3/013 |
| 10,509,951 B1* | 12/2019 | Nagalla | G06K 9/00315 |
| 10,542,799 B2* | 1/2020 | Gharabegian | H04N 7/181 |
| 10,579,921 B1* | 3/2020 | Cosic | G06N 20/00 |
| 10,614,204 B2* | 4/2020 | Tussy | G06F 21/32 |
| 10,685,257 B2* | 6/2020 | Bapat | G08B 13/19645 |
| 10,698,995 B2* | 6/2020 | Tussy | G06K 9/00288 |
| 10,715,762 B2* | 7/2020 | Lee | H04W 76/10 |
| 10,728,212 B2* | 7/2020 | Xu | H04L 61/25 |
| 10,776,471 B2* | 9/2020 | Tussy | H04W 12/065 |
| 10,803,160 B2* | 10/2020 | Tussy | G06F 21/34 |
| 10,817,710 B2* | 10/2020 | Rao | G06F 9/542 |
| 2001/0027475 A1* | 10/2001 | Givol | H04N 21/426 709/204 |
| 2002/0126150 A1 | 9/2002 | Parry | |
| 2003/0063770 A1 | 4/2003 | Svendsen et al. | |
| 2003/0063771 A1 | 4/2003 | Morris et al. | |
| 2003/0123069 A1* | 7/2003 | Perala | H04N 5/232121 358/1.2 |
| 2003/0161499 A1 | 8/2003 | Svendsen | |
| 2004/0003295 A1* | 1/2004 | Elderfield | G07C 9/257 713/176 |
| 2004/0044723 A1 | 3/2004 | Bell | |
| 2004/0044724 A1 | 3/2004 | Bell | |
| 2004/0044725 A1 | 3/2004 | Bell | |
| 2004/0068583 A1* | 4/2004 | Monroe | H04N 1/32128 709/246 |
| 2004/0111322 A1* | 6/2004 | Arias | G07F 17/0014 705/16 |
| 2004/0174440 A1 | 9/2004 | Kojima et al. | |
| 2005/0097019 A1* | 5/2005 | Jacobs | G06Q 40/08 705/35 |
| 2005/0162711 A1 | 7/2005 | Wu | |
| 2006/0161867 A1 | 3/2006 | Drucker | |
| 2006/0098875 A1 | 5/2006 | Sugimoto | |
| 2006/0140455 A1 | 6/2006 | Costache et al. | |
| 2006/0242238 A1 | 10/2006 | Issa | |
| 2007/0014442 A1* | 1/2007 | Yu | H04N 1/4406 382/124 |
| 2007/0140145 A1 | 6/2007 | Kumar et al. | |
| 2008/0046919 A1* | 2/2008 | Carmi | H04N 21/812 725/32 |
| 2008/0062283 A1 | 3/2008 | Matsushita et al. | |
| 2008/0080748 A1* | 4/2008 | Sukegawa | G06K 9/00885 382/118 |
| 2008/0126478 A1* | 5/2008 | Ferguson | G16H 40/67 709/203 |
| 2008/0189766 A1 | 8/2008 | Al. | |
| 2008/0201327 A1 | 8/2008 | Seth | |
| 2008/0270425 A1 | 10/2008 | Cotgreave | |
| 2008/0298766 A1 | 12/2008 | Wen et al. | |
| 2009/0016576 A1 | 1/2009 | Goh et al. | |

(56) References Cited

U.S. PATENT DOCUMENTS

| | | |
|---|---|---|
| 2009/0063995 A1 | 3/2009 | Baron et al. |
| 2009/0080715 A1* | 3/2009 | van Beek ............. A61B 5/0059 |
| | | 382/118 |
| 2009/0187435 A1* | 7/2009 | Carr ..................... G06Q 50/265 |
| | | 705/5 |
| 2009/0252383 A1 | 10/2009 | Adam et al. |
| 2009/0292549 A1 | 11/2009 | Ma et al. |
| 2010/0111377 A1* | 5/2010 | Monroe ............. G08B 13/1965 |
| | | 382/118 |
| 2010/0150407 A1 | 6/2010 | Cheswick |
| 2010/0172550 A1 | 7/2010 | Gilley et al. |
| 2010/0172551 A1 | 7/2010 | Gilley et al. |
| 2010/0191728 A1 | 7/2010 | Reilly |
| 2010/0289776 A1* | 11/2010 | Bryborn Krus ..... G06F 3/03545 |
| | | 345/179 |
| 2010/0310135 A1 | 12/2010 | Nagaoka et al. |
| 2011/0038512 A1 | 2/2011 | Petrou et al. |
| 2011/0047384 A1 | 2/2011 | Jacobs et al. |
| 2011/0182485 A1 | 2/2011 | Shochat |
| 2011/0091080 A1* | 4/2011 | Gamliel ............. G06K 9/00241 |
| | | 382/118 |
| 2011/0211736 A1 | 9/2011 | Krupka et al. |
| 2011/0211737 A1 | 9/2011 | Krupka et al. |
| 2011/0234613 A1 | 9/2011 | Hanson et al. |
| 2011/0243397 A1 | 10/2011 | Watkins et al. |
| 2011/0313861 A1* | 12/2011 | Lawrence, III ......... H04L 67/20 |
| | | 705/14.64 |
| 2012/0039513 A1* | 2/2012 | Kennedy ................ G06Q 30/02 |
| | | 382/118 |
| 2012/0069131 A1* | 3/2012 | Abelow ............... G06Q 10/067 |
| | | 348/14.01 |
| 2012/0076367 A1 | 3/2012 | Tseng |
| 2012/0078751 A1* | 3/2012 | MacPhail ............. G06Q 20/06 |
| | | 705/26.41 |
| 2012/0218301 A1* | 8/2012 | Miller ................ G02B 27/0172 |
| | | 345/633 |
| 2012/0250950 A1 | 10/2012 | Papakipos et al. |
| 2012/0265758 A1 | 10/2012 | Han et al. |
| 2013/0035114 A1 | 2/2013 | Holden et al. |
| 2013/0125167 A1* | 5/2013 | Sharif-Ahmadi ........................... |
| | | H04N 21/4335 |
| | | 725/37 |
| 2013/0169801 A1* | 7/2013 | Martin ................... H04N 7/181 |
| | | 348/143 |
| 2013/0215116 A1* | 8/2013 | Siddique ............. G06Q 20/204 |
| | | 345/420 |
| 2013/0251214 A1* | 9/2013 | Chung ............... G06K 9/00161 |
| | | 382/116 |
| 2013/0262333 A1* | 10/2013 | Wicker ................ G06Q 50/265 |
| | | 705/325 |
| 2014/0123275 A1* | 5/2014 | Azar ....................... G06F 21/36 |
| | | 726/19 |
| 2014/0143139 A1* | 5/2014 | Koplovitz .......... G06Q 20/3223 |
| | | 705/39 |
| 2014/0156833 A1* | 6/2014 | Robinson ................ H04L 43/12 |
| | | 709/224 |
| 2014/0254896 A1* | 9/2014 | Zhou ..................... B64C 39/024 |
| | | 382/124 |
| 2015/0286873 A1* | 10/2015 | Davis .................... G06F 1/1694 |
| | | 382/103 |
| 2016/0219248 A1* | 7/2016 | Reznik .............. H04N 21/23439 |
| 2017/0103440 A1* | 4/2017 | Xing ................... G06F 3/04883 |
| 2017/0116466 A1* | 4/2017 | Resnick .................. C07K 16/18 |
| 2017/0279957 A1* | 9/2017 | Abramson et al. ..... G06F 21/36 |
| 2018/0083978 A1* | 3/2018 | Pantazelos ........... H04W 12/06 |
| 2018/0349939 A1* | 12/2018 | Setchell .............. H04L 63/0861 |
| 2018/0374099 A1* | 12/2018 | Litsur .................. G06F 16/583 |
| 2019/0065874 A1* | 2/2019 | Gerard ............... G06K 9/00288 |
| 2019/0213312 A1* | 7/2019 | Tussy ................. G06K 9/00926 |
| 2019/0303551 A1* | 10/2019 | Tussy ................... H04W 12/06 |
| 2020/0042685 A1* | 2/2020 | Tussy ................. G06K 9/00892 |
| 2020/0053214 A1* | 2/2020 | Kats ................... H04M 19/041 |
| 2020/0053215 A1* | 2/2020 | Kats ...................... H04M 19/04 |
| 2020/0074151 A1* | 3/2020 | Resnick .............. G06K 9/00771 |
| 2020/0184278 A1* | 6/2020 | Zadeh ................... G06F 16/953 |
| 2021/0068198 A1* | 3/2021 | Michielsen ............. H04L 45/02 |

\* cited by examiner

PEER DICTIONARY

- PEER DICTIONARY 700
  - TIMESTAMP 702
  - FACE INFORMATION 704
    - FACE IMAGE 706
    - FACE TEMPLATE 708
  - LOCATION INFORMATION 710
    - LATITUDE 712
    - LONGITUDE 714
    - ALTITUDE 716
    - SPEED 718
    - FLOOR 720
    - COURSE 722
    - HORIZONTAL ACCURACY 724
    - VERTICAL ACCURACY 726
  - IDENTITY INFORMATION 728
    - NAME 730
    - GRAPHICAL IDENTIFIER 732
  - COMMUNICATION PREFERENCES 734
    - IMAGE SIZE 736
    - IMAGE DATA FORMAT 738
    - IMAGES TO RECEIVE 740
    - NOTIFICATION PREFERENCES 742
    - EMAIL ADDRESS 744
  - DEVICE INFORMATION 746
    - MODEL NAME 748
    - SYSTEM VERSION 750
    - SYSTEM NAME 752
    - DEVICE NAME 754
    - CLIENT VERSION 756

FIG. 7

PEER EVALUATOR

IMAGE ENVELOPE

PEER EVALUATION

PEER NOTIFICATION

PEER NOTIFICATION QUEUE

IMAGE REPOSITORY

DETERMINING IF DEVICE IS AVAILABLE TO RECEIVE IMAGES ⟶ 1920

| USER 12 / MOBILE DEVICE 20 | IN FOV 1906 | IN BLUETOOH RANGE 1910 | IN WIFI RANGE 1912 | IN AD HOC RANGE 1902 | AVAILABLE TO RECEIVE IMAGE |
|---|---|---|---|---|---|
| 12:2-4 / 20:2-4 | YES | YES | YES | YES | YES |
| 12-5 / 20-5 | YES | NO | NO | NO | NO |
| 12-6 / 20-6 | NO | NO | YES | NO | NO |
| 12-7 / 20-7 | NO | NO | NO | NO | NO |
| 12-8 / 20-8 | NO | YES | YES | YES | NO |

FIG. 19B

SCORING USERS / DEVICES FOR IMAGE DELIVERY ACCORDING TO EQUATION 1 ⟶ 1930

| USER 12 / MOBILE DEVICE 20 | IN RANGE | FMP 1012 | FW 1018 | PMP 1014 | PW 1020 | OMP 1016 | OW 1022 | SCORE 1006 | THRESHOLD 1008 | NOTIFICATION FLAG 1010 |
|---|---|---|---|---|---|---|---|---|---|---|
| 12-1 / 20-1 | YES | = | = | = | = | = | = | = | 1.6 | = |
| 12-2 / 20-2 | YES | 0.98 | 1 | 0.74 | 0.5 | 0.9 | 0.5 | 1.8 | 1.6 | YES |
| 12-3 / 20-3 | YES | 0.98 | 1 | 0.8 | 0.5 | 0.9 | 0.5 | 1.83 | 1.6 | YES |
| 12-4 / 20-4 | YES | 0.98 | 1 | 0.65 | 0.5 | 0.9 | 0.5 | 1.755 | 1.6 | YES |
| 12-5 / 20-5 | NO | = | = | = | = | = | = | = | = | = |
| 12-6 / 20-6 | NO | = | = | = | = | = | = | = | = | = |
| 12-7 / 20-7 | NO | = | = | = | = | = | = | = | = | = |
| 12-8 / 20-8 | NO | 0 | 1 | 0.1 | 0.5 | 0 | 0.5 | 0.05 | 1.6 | NO |

FIG. 19C

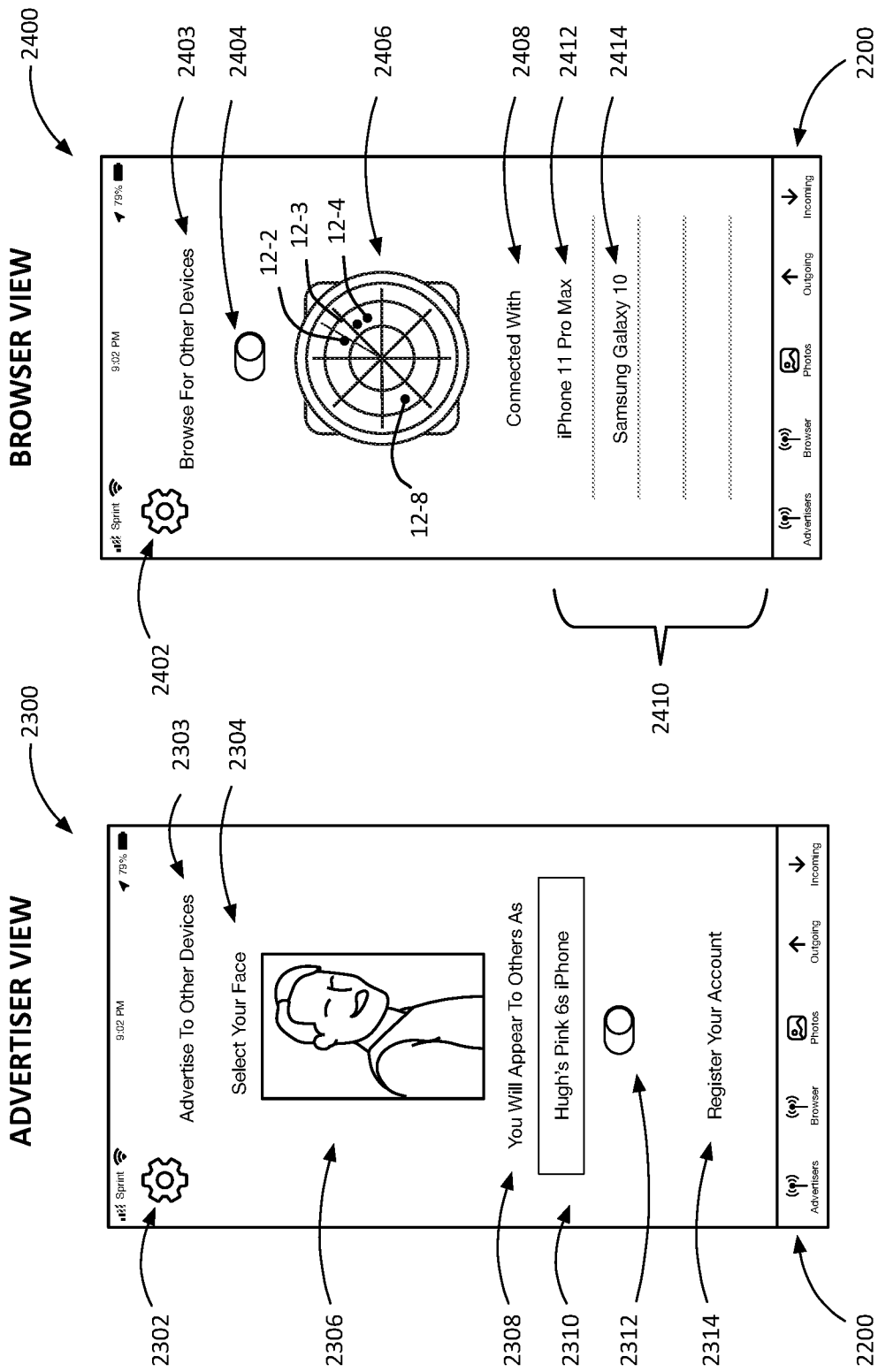

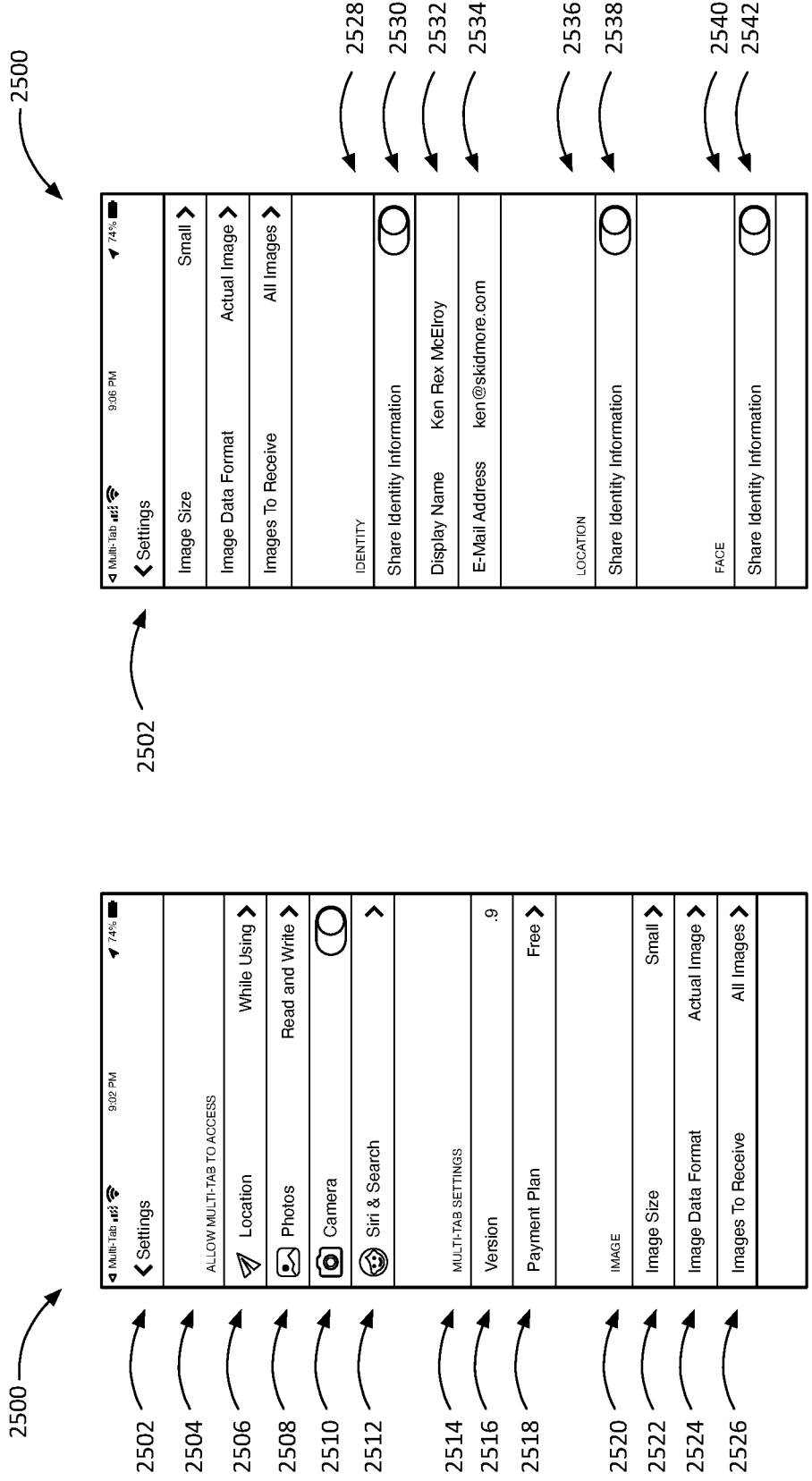

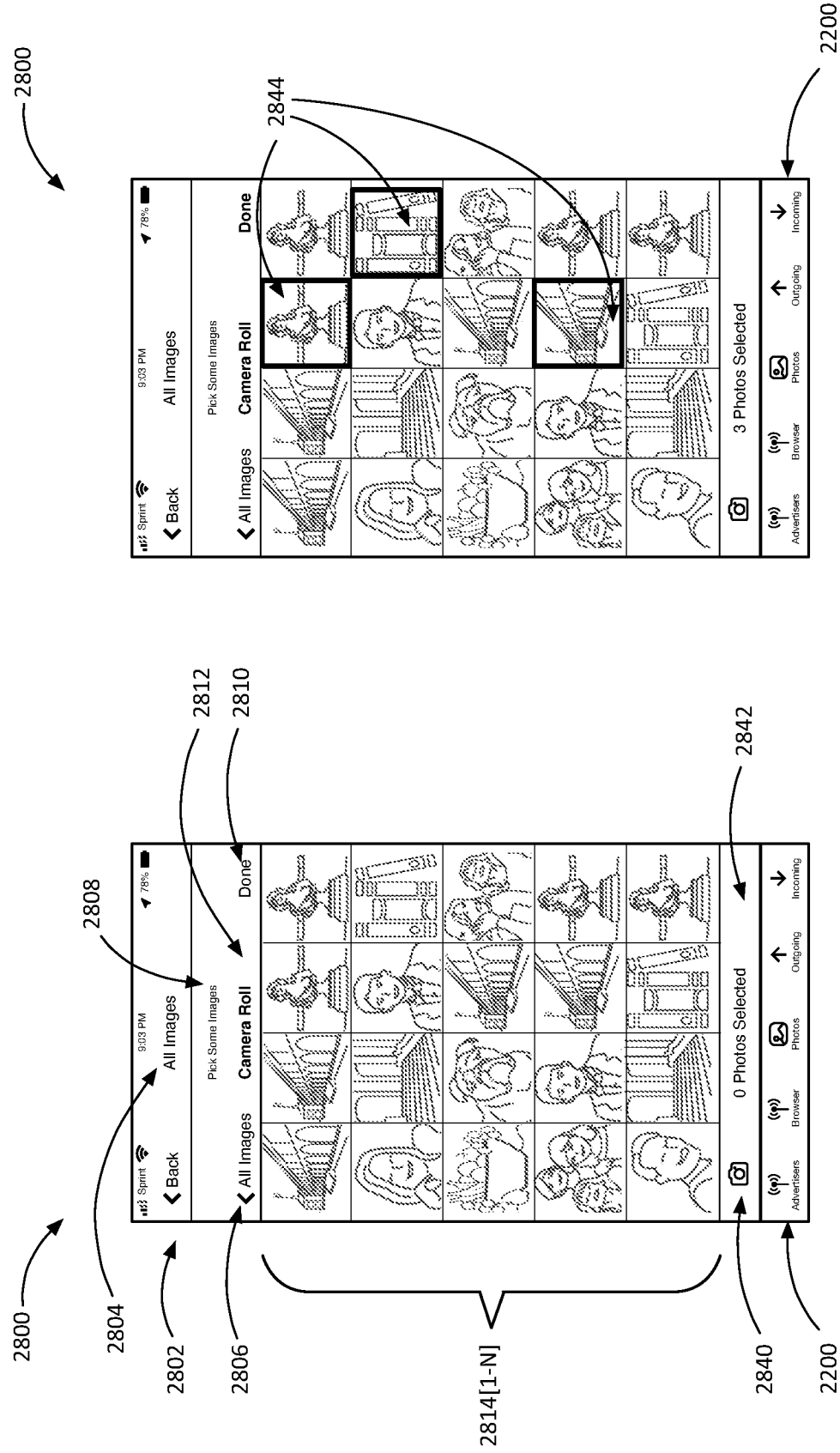

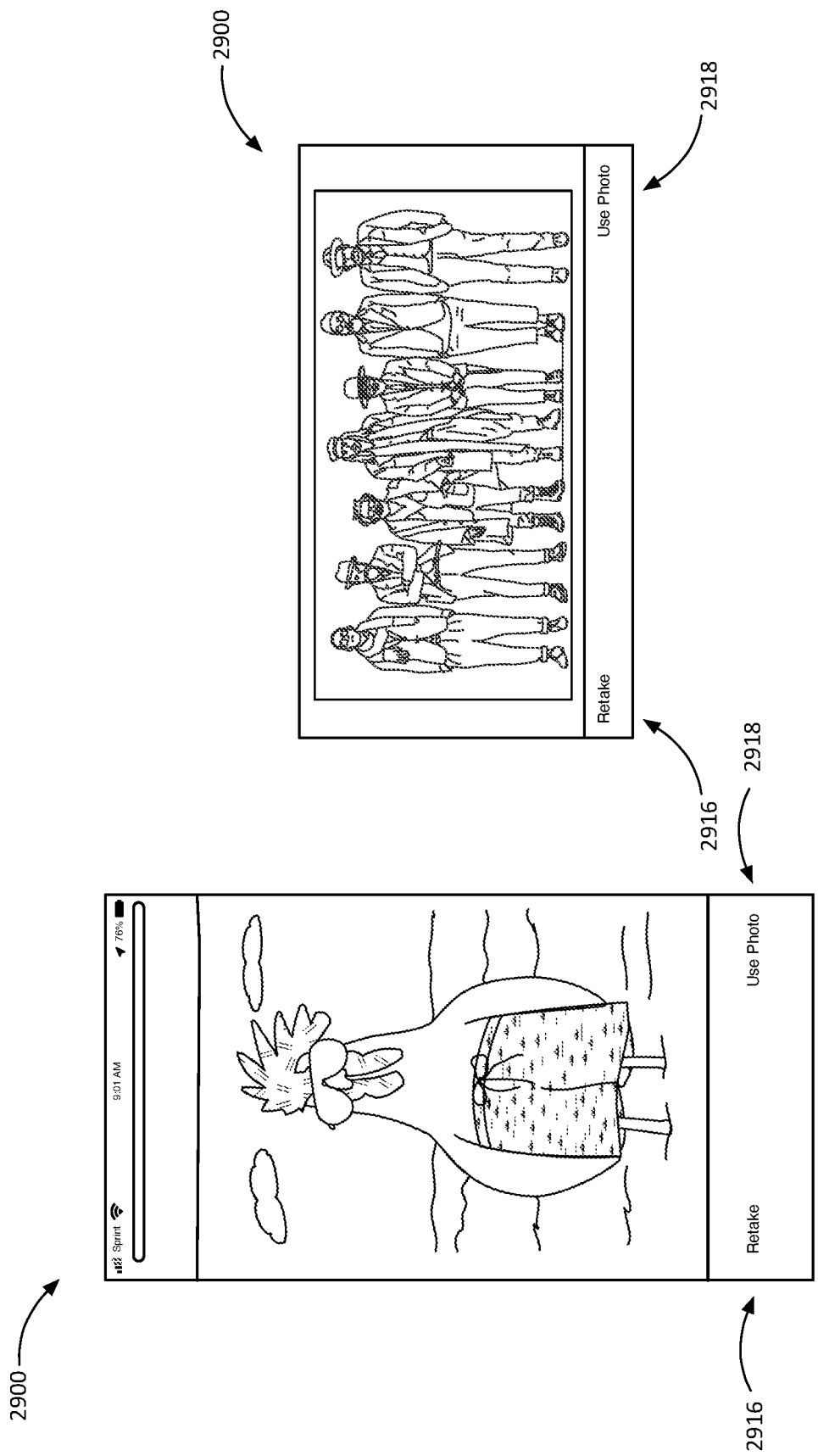

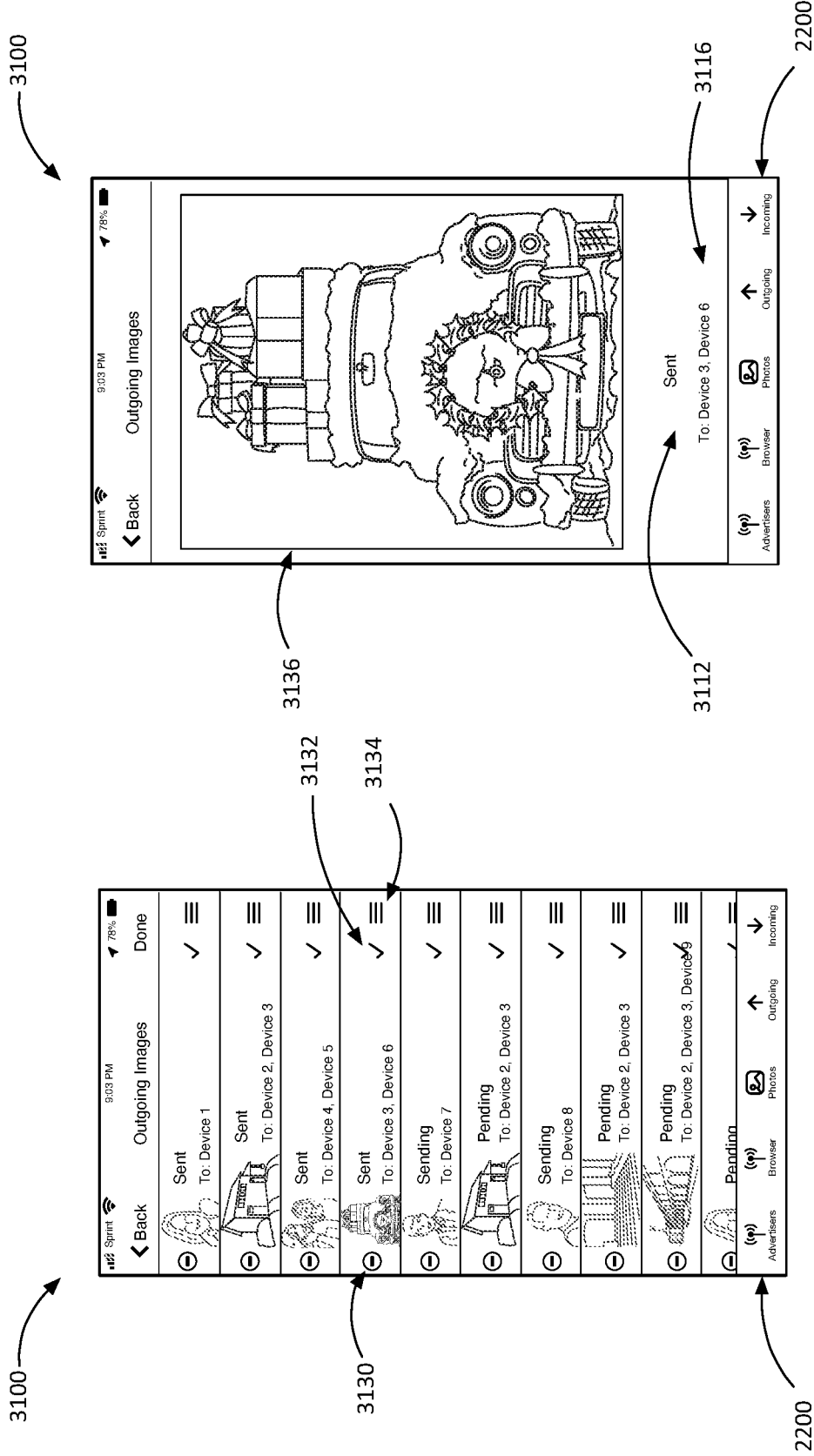

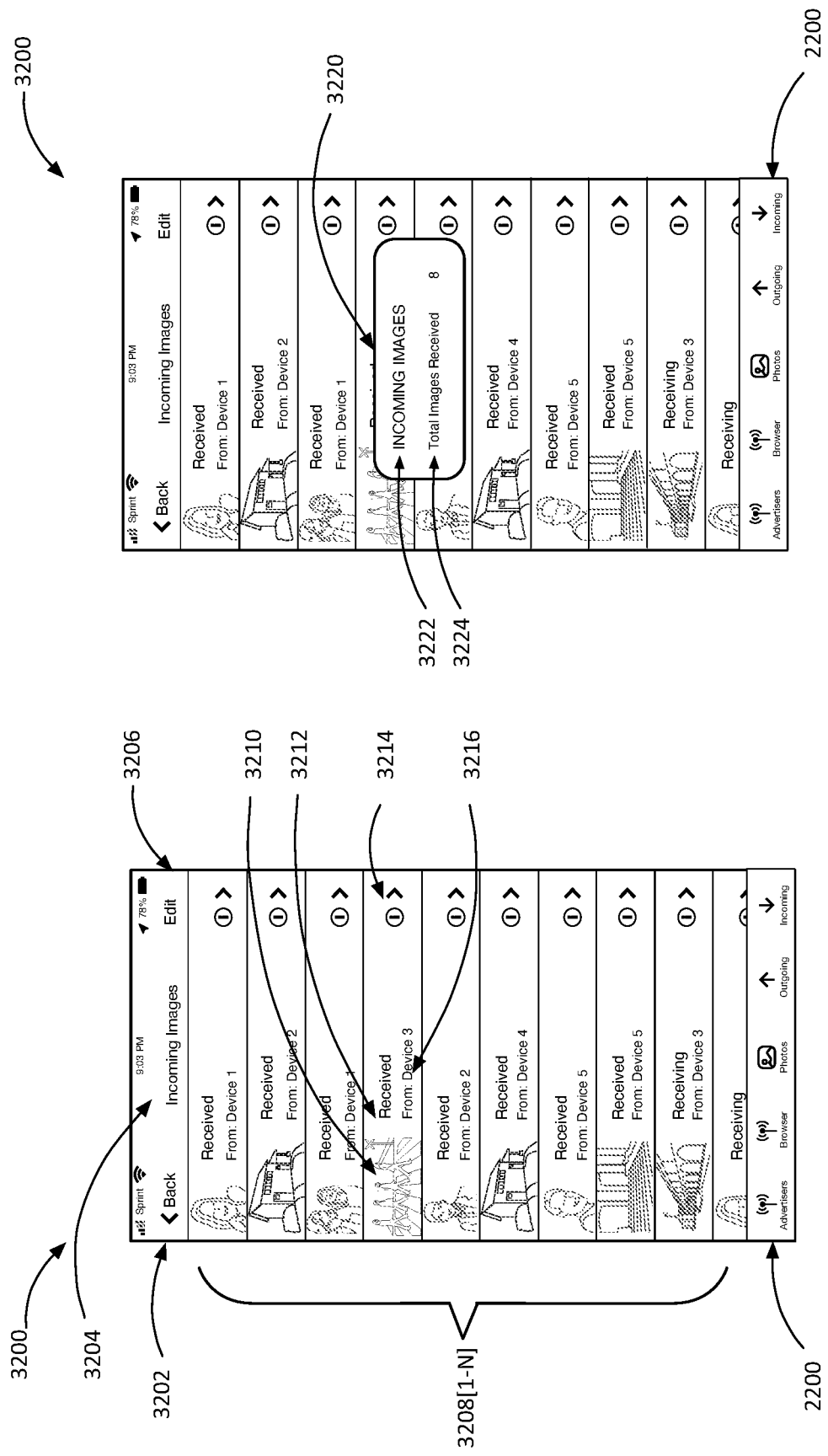

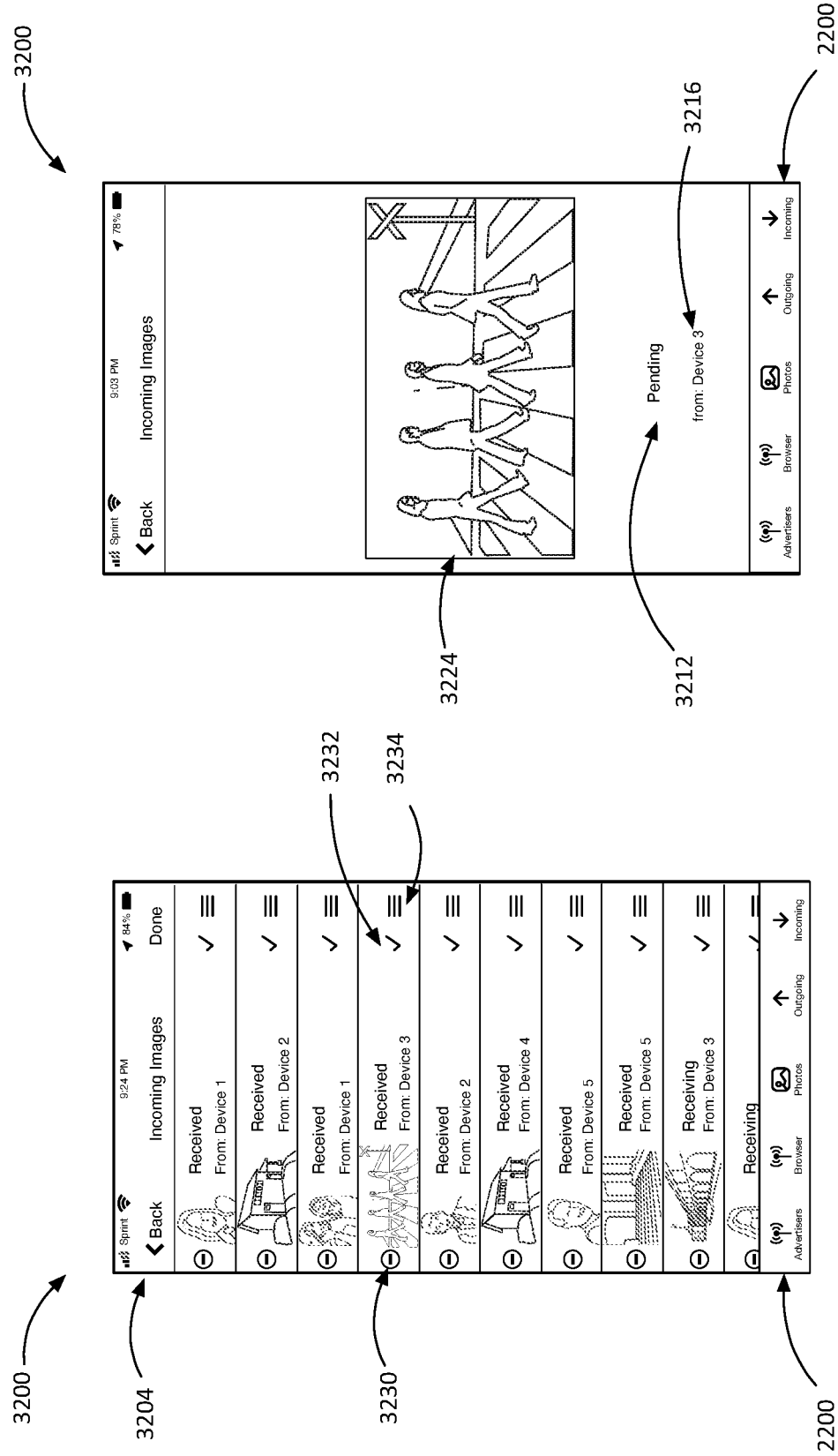

SHARING IMAGES BASED ON FACE MATCHING IN A NETWORK

FIELD OF THE DISCLOSURE

The present disclosure relates to the sharing of images over an ad hoc network based on face matching.

BACKGROUND

There are many applications and services available for sharing images. The vast majority of these solutions require that the sender and receiver both have an account on one of the services and/or know at least one communication address (e.g. email, cell number, etc.) of the intended recipient to perform the sharing.

The use of "events" to organize images to be shared with a group has also become popular. Events are typically defined by location, time, and participants. However, events do not work as well when the number of participants becomes too large, the location changes quickly over time, or the participant rosters change at the last minute.

SUMMARY

The present disclosure describes a system that addresses the short comings of the existing solutions.

The proposed system does not require a participant to belong to a service or have a user account. The participants are defined by their geographical proximity to the device capturing the image.

The device capturing the image uses a first network interface, such as Bluetooth, to discover other devices in physical proximity to the capture device. The capture device then queries other mobile devices in geographical proximity to receive user information. The user information may include face information, location information, and identity information and communication preference information. The location information, and identity information and communication preference information are optional. The face information is typically in the form of a template representing the face, not an image of the face. The location information may be in the form of GPS coordinates. The identification information may include textual information indicating the name of the subject corresponding to the face information.

In some embodiments of the present application, a live view is provided. Using the face information, faces in the live view are matched, and the identity information may be overlaid in real-time onto the subjects appearing in the live view. The identity information is user provided, without verification, and may or may not correspond to the real name of the person. For example, it may be an informal screen name and does not uniquely identify the user within the system.

In some embodiments of the present application other devices may be notified if the users associated with the other devices appear in the live view of the capturing device.

Once an image is captured, the image is processed to identify any faces within the image for which the capturing device has received face information. If matches are determined, then the other mobile devices belonging to the other users appearing in the image are notified.

The other device(s) may be sent the captured image, a reduced resolution version of the captured image, information allowing the later downloading of the image, or any combination thereof.

In an example usage scenario, consider a family reunion gathering. The group might include relatives of varying ages from disparate geographical locations that rarely see each other. They may not be connected via social networks, nor in possession of each other's contact information (phone number, e-mail, etc.). The event may be held in an area with no WIFI network (or at least an open public one) and/or spotty cellular coverage. During the event, someone decides to take a photo of a subset of the group attendees. By using the proposed system, the photographer is able to effortlessly and selectively share the captured image with the group attendees in the photo by using facial matching. And this all occurs without the photographer and the subset of the group attendees exchanging contact information or subscribing to a common service. The photographer may not even know some of the subjects in the image. Further, it occurs without participants joining a WIFI network and/or having cellular service.

A system is described comprising: a first device comprising: a first memory and first processor, associated with a first communication subsystem, operable to: capture a first image of a first face of a first user of the first device; determine a first facial template based on the first image; send first information, the first information including the first facial template; receive a second image; and the first communication subsystem operable to: couple the first device to a second device; and the second device comprising: a second communication subsystem operable to: couple the second device to the first device; and a second memory and second processor, associated with the second communication subsystem, operable to: receive the first information; capture the second image; designate a second face appearing in the second image; determine a second facial template from the second face appearing in the second image; perform a comparison of the first facial template to the second facial template; based on the comparison, determine a match; and in response to determining the match, send to the first device the second image. In another aspect, to send to the first device the second image the second device is further operable to: determine a notification score based on a computation of a face match probability, position match probability, and an orientation match probability; and send to the first device the second image based on the notification score. In another aspect, to send the second image based on the notification score the second device is further operable to: perform a second comparison of the notification score to a threshold value; and based on the comparison, send to the first device the second image. In another aspect, the first information comprises identity information including one or more of: an alphanumeric name of the first user associated with the first device, the alphanumeric name not uniquely identifying the first user; a graphical element representing the first user of the first device, the graphical element not being an image of the first face of the first user; and an image of a face of the first user of the first device. In another aspect, the first information comprises communication preferences including one or more of: a network address at which the first user of the first device may be contacted; a first preference identifying how the first user of the first device will be sent the second image; and a second preference identifying additional notification types to be sent, the additional notification types including one or more of image viewing events and face appearances in a live viewfinder. In another aspect, the first facial template and the second facial template are numerical parameters representing faces corresponding to the first user and second user. In another aspect, the first communication subsystem is comprised of a first network interface and a second network interface; and the second communication subsystem is comprised of a third network interface and a fourth network interface. In another aspect, the first network interface and the third network interface are Bluetooth interfaces; and the second network interface and the fourth network interface are WIFI interfaces. In another aspect, the first network interface and the third network interface are NFC interfaces; and the second network interface and the fourth network interface are wireless interfaces. In another aspect, the first network interface of the first communication subsystem is operable to: advertise the first information; and the third network interface of the second communication subsystem is operable to: browse for the first information. In another aspect, the second network interface of the first communication subsystem is operable to: receive the second image; and the fourth network interface of the second communication subsystem is operable to: send the second image. In another aspect, to provide a live viewfinder on the second device, the second device is further operable to periodically: capture an updated viewfinder image; determine a third facial template from a third face detected in the updated viewfinder image; perform a second comparison of the first facial template to the third facial template to determine a second match; in second response to determining the second match, present a detection frame around the third face; and send to the first device a notification. In another aspect, the second device further operable to: send the notification, in response to the second match, indicating to the first device that the first face of the first user of the first device appears in the updated viewfinder image and is subject to appear in a future captured image. In another aspect, the second device is further operable to: determine a position within the updated viewfinder image of the third face appearing in the updated viewfinder image; and display, in an area adjacent to the position within the updated viewfinder image of the third face appearing in the updated viewfinder image, identity information, the identity information included in the first information. In another aspect, to detect the third face appearing in the second image, the second device further operable to: detect other faces appearing in the updated viewfinder image, the other faces corresponding to other users of other devices; and based on geographical positions of the other devices, adjust notification scores of ones of the other users of the other devices, the geographical positions obtained from location information included in the first information. In another aspect, to adjust the notification scores of the ones of the other users of the other devices, the second device is operable to: determine a field of view of a camera subsystem of the second device; determine, using the geographical positions of the other users of the other devices, the ones of the other users of the other devices that are not currently in the field of view of the camera subsystem of the second device; and adjust the notification scores of the ones of the other users of the other devices. In another aspect, the first device and the second device are ones of a mobile phone, a tablet computer, a personal digital assistant, a digital camera, and a laptop computer. In another aspect, neither of the first device nor the second device are connected to a cellular network or an infrastructure WIFI network. In another aspect, in performing the comparison of the first facial template to the second facial template to determine the match, faces in the second image are detected and matched, but not uniquely identified. In another aspect, to send the second image to the first device the second device is further operable to: send one or more of: a full resolution version of the second image, a thumbnail of the second image, an identifier usable to receive the second image from the second device, and an identifier usable to receive the second image from a server device. In another aspect, the first device and the second device are mobile devices. In another aspect, neither of the first device nor the second device are members a same image sharing service. In another aspect, the first device does not have a second phone number of the second device and the second device does not have a first phone number of the first device. In another aspect, the first device does not have a second email address of a second user of the second device and the second device does not have a first email address of the first user of the first device. In another aspect, the second device is not storing any images of the first user and any face template of the first user. In another aspect, in performing the comparison of the first facial template to the second facial template to determine the match, faces in the second image are detected and matched, and identified based on identity information received from a server device. In another aspect, the identifier is a universally unique identifier (UUID).

A method is described of operating a first device comprising: receiving, on a first communication interface, first information including facial template representing a face of a user operating a second device; determining a match of the facial template to a second face appearing in an image captured at the first device; and In response to determining the match, sending to the first device over a second communication interface the image captured at the first device. In another aspect, the facial template is the first facial template and determining the match of the facial template to the second face appearing in the image captured at the first device further comprises: determining second facial template from the second face appearing in the image captured at the first device; performing a comparison of the first facial template to the second facial template; and based on the comparison, determining the match. In another aspect, determining the match further comprises computing a match probability score based on the comparison; performing a second comparison of the match probability score to a threshold score; and based on the second comparison, determining the match. In another aspect, the first communication interface is a Bluetooth interface and the second communication interface is a WIFI interface. In another aspect, the first information further includes: receiving one or more of location information, identity information, and communication preferences information. In another aspect, the first device is a discovery device further operable to: browse for advertisement information, the advertisement information included in the first information, the first information received over the first communication interface, the first communication interface including a Bluetooth interface.

A method is described of operating a first device comprising: sending, to a second device over a first communication interface, first information including facial template representing a face of a user operating the first device; and receiving, from the second device over a second communication interface, an image captured at the second device, the image received in response to the second device having matched the facial template to a second face appearing in the image. In another aspect, sending the facial template representing the face of the user operating the first device further comprises: obtaining the facial template from a login security component of an operating system of the first device, the login security component having received the image of the face of the user operating the first device during a login and authentication sequence. In another aspect, sending the facial template representing the face of the user operating the first device further comprises: capturing the image in which the face of the user operating the first device appears; and determining the facial template from the image. In another aspect, sending the first information further includes: sending one or more of location information, identity information, and communication preferences information. In another aspect, the first device is an advertising device further operable to: publish advertisement information, the advertisement information included in the first information, the first information published over the first communication interface, the first communication interface including a Bluetooth interface.

A first device is described comprising: a first communication interface and a second communication interface; and a processor and memory, associated with the first communication interface and the second communication interface, operable to: receive, on the first communication interface, first information including facial template representing a face of a user operating a second device; match the facial template to a second face appearing in an image captured at the first device; and in response to the match, send to the first device over the second communication interface the image captured at the first device.

A first device is described comprising: a first communication interface and a second communication interface; and a processor and memory, coupled to the first communication interface and the second communication interface, operable to: send to a second device over a first communication interface first information including facial template representing a face of a user operating the first device; and receive, from the second device over the second communication interface, an image captured at the second device, the image received in response to the second device having matched the facial template to a second face appearing in the image.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 7 is a graphical illustration of Peer Dictionary structure;

FIG. 19B illustrates the logic involved in determining if a mobile device can and should be sent an image according to one embodiment of the present disclosure;

FIG. 19C illustrates an example computation for determining if a mobile device can and should be sent an image according to one embodiment of the present disclosure;

Figure 20:
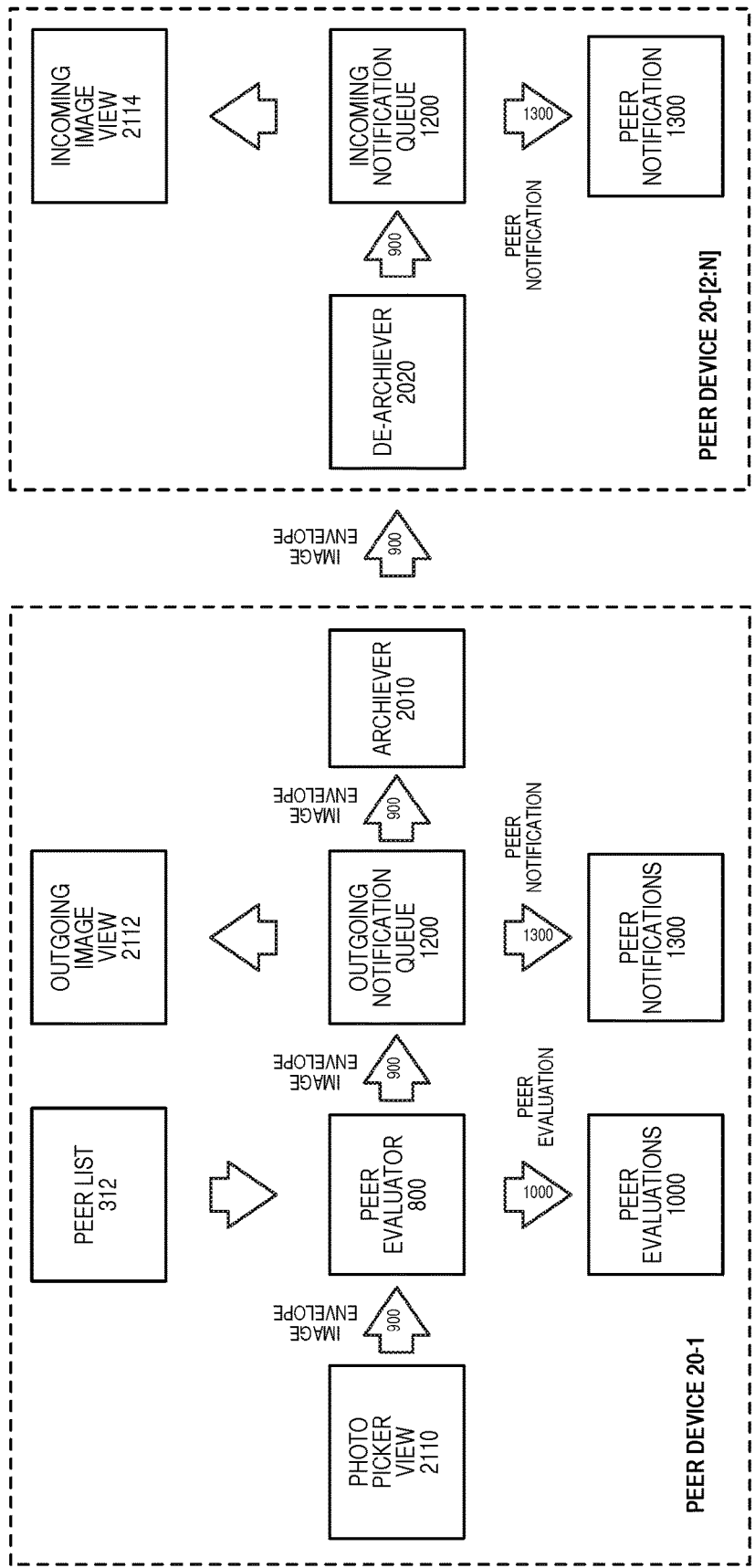
Figure 21:
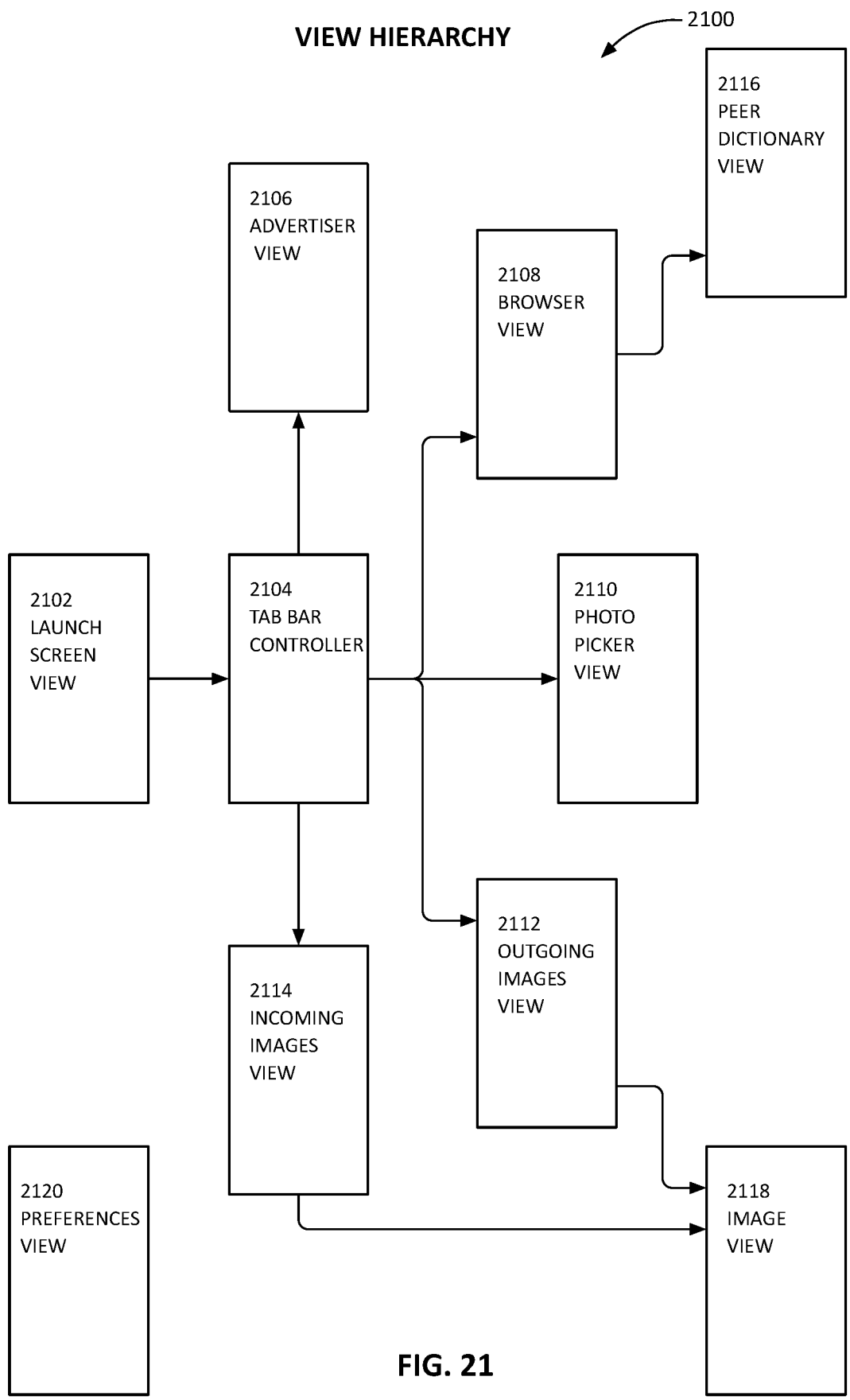
Figure 22:
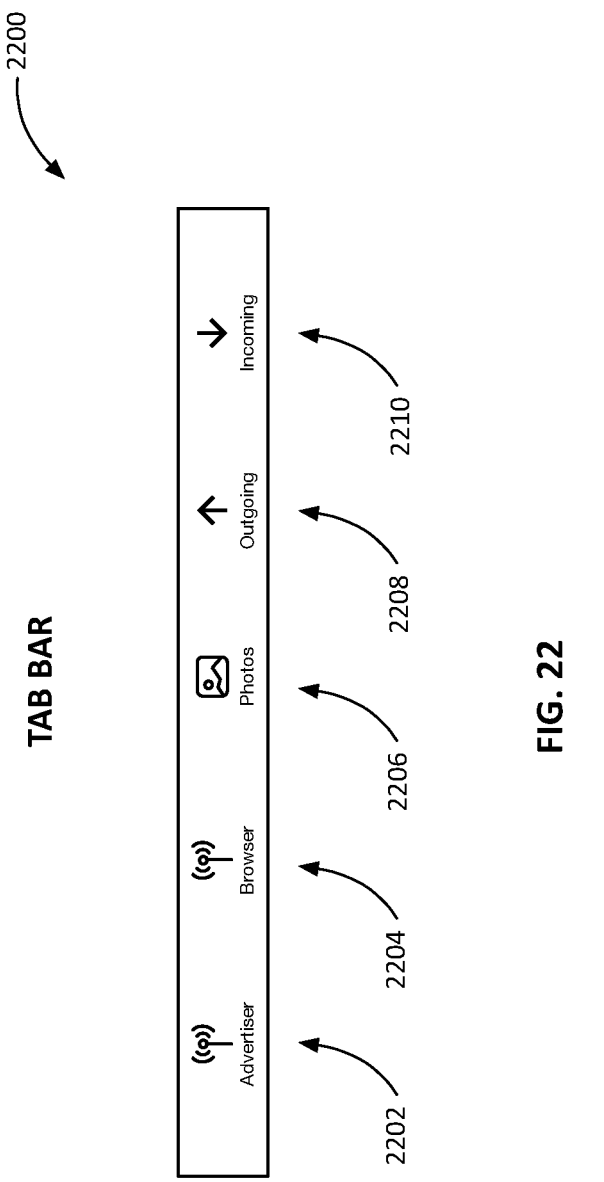
Figures 26A, 26B:
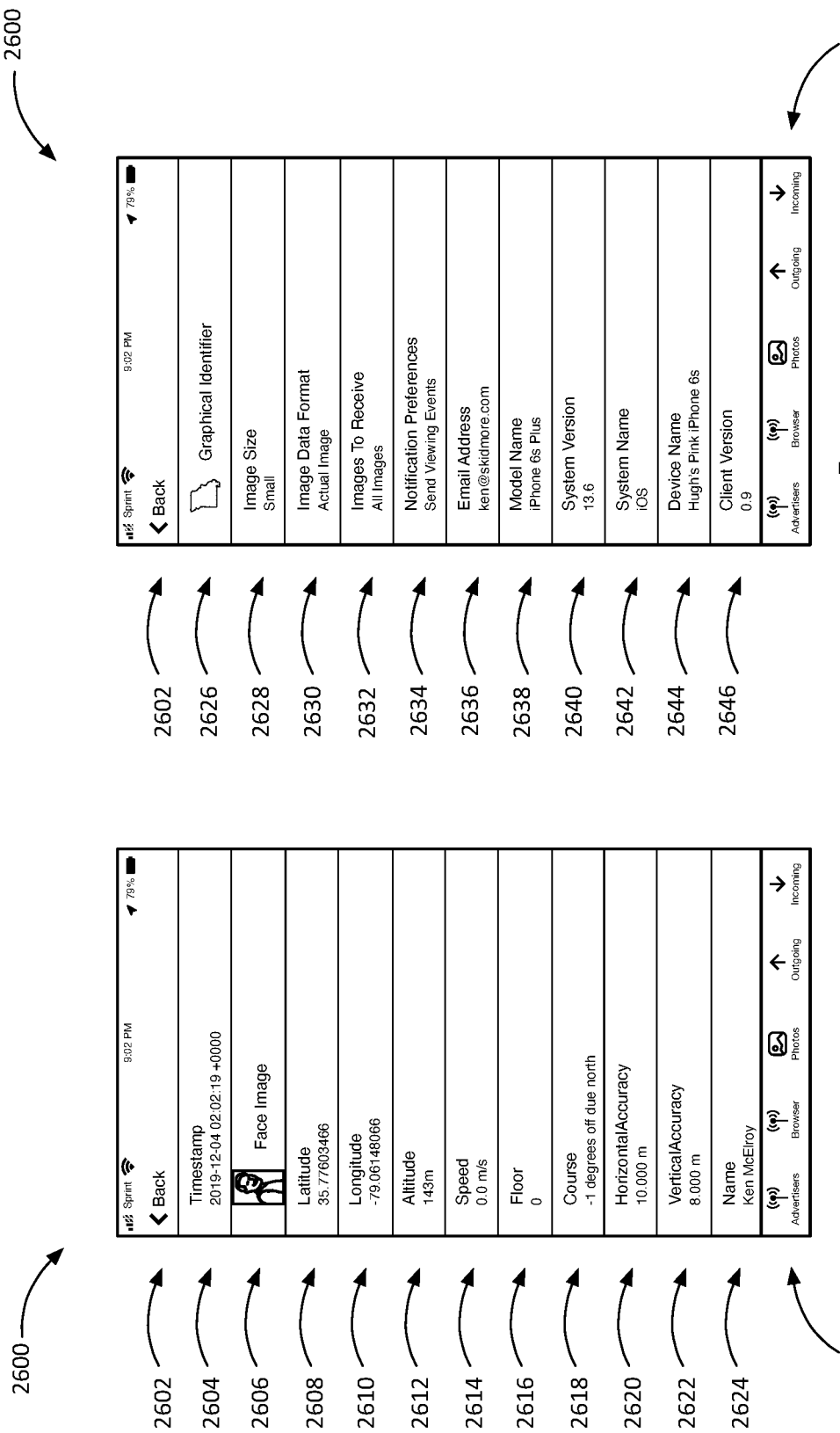
Figure 27:
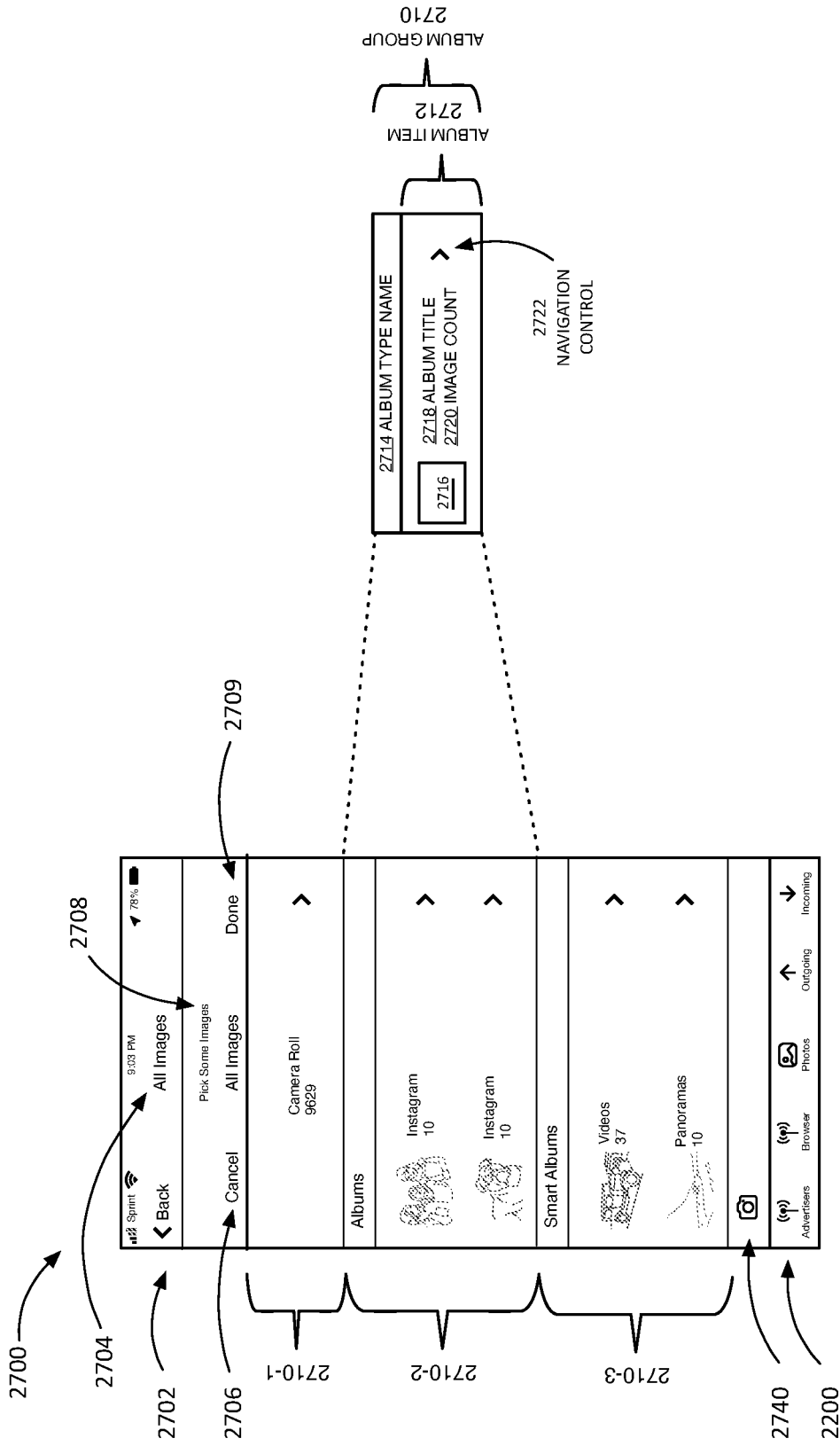
Figure 29B:
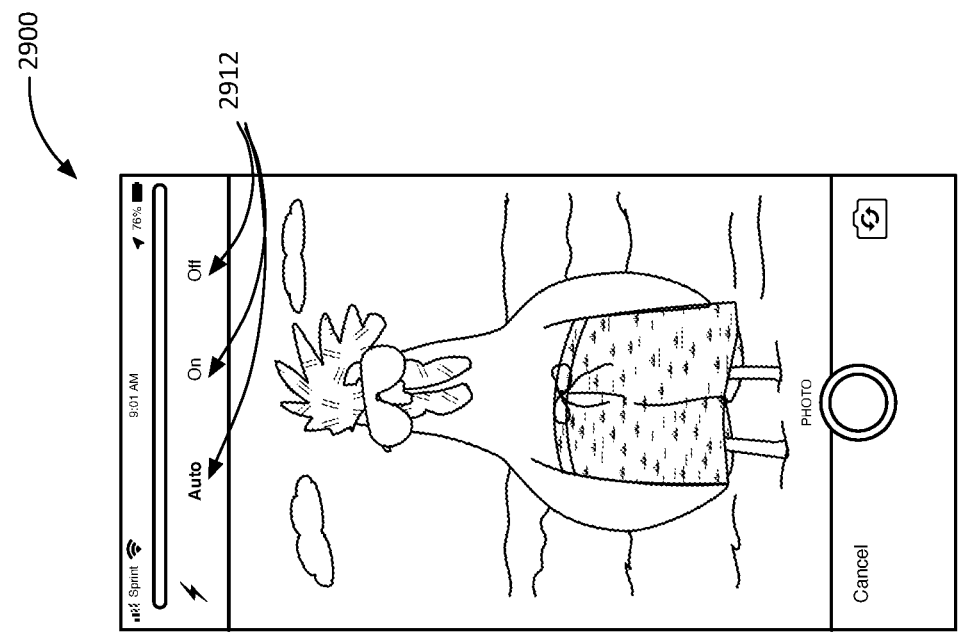
Figure 29A:
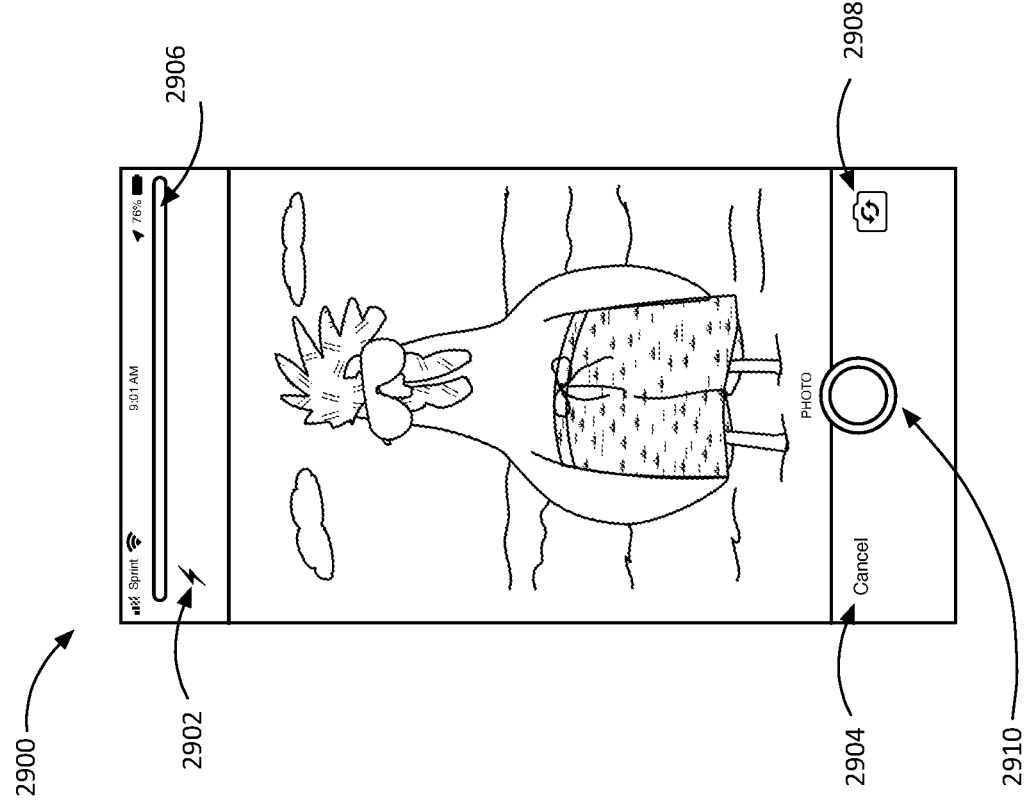
Figure 30:
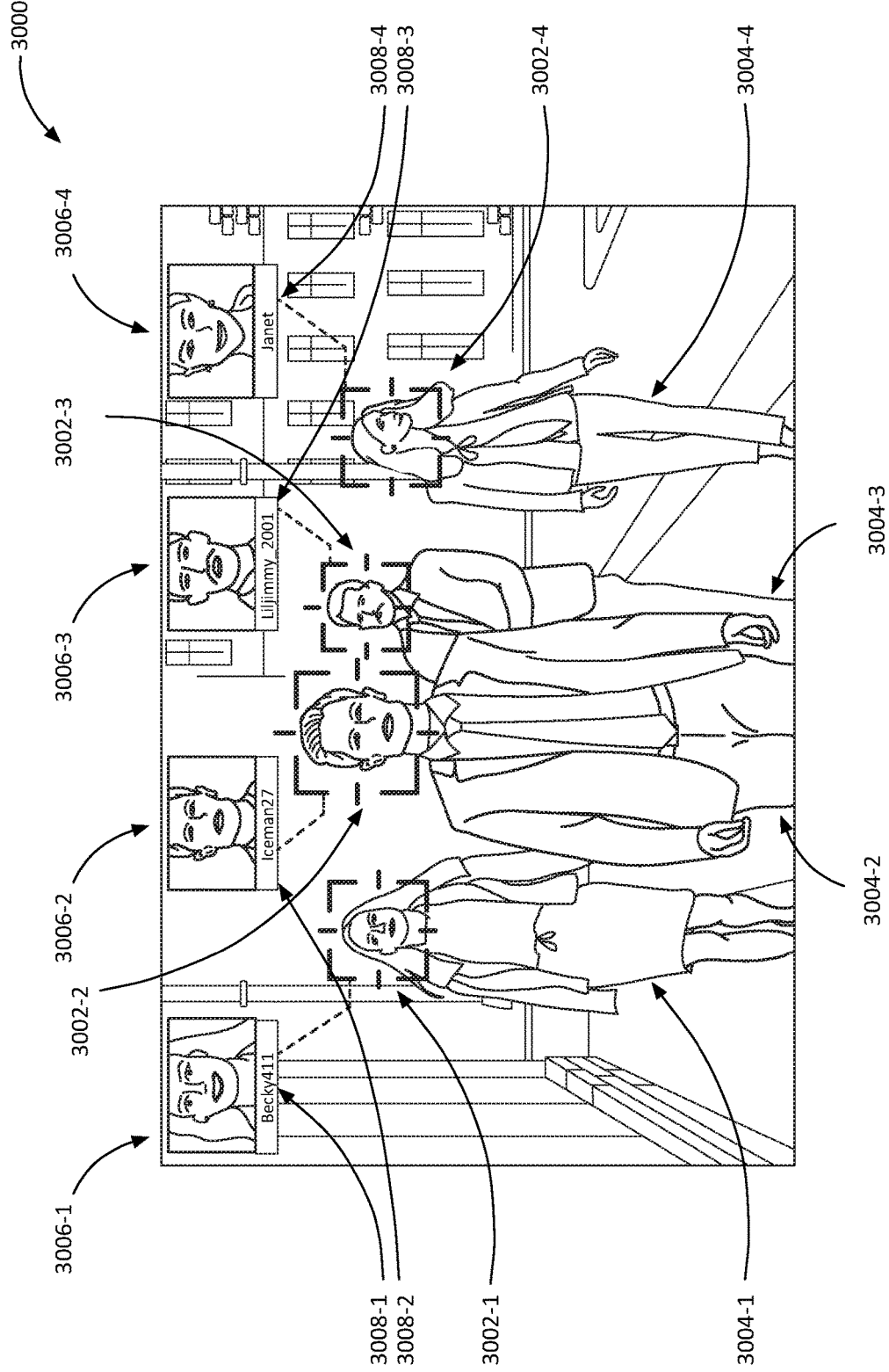
Figures 31A, 31B:
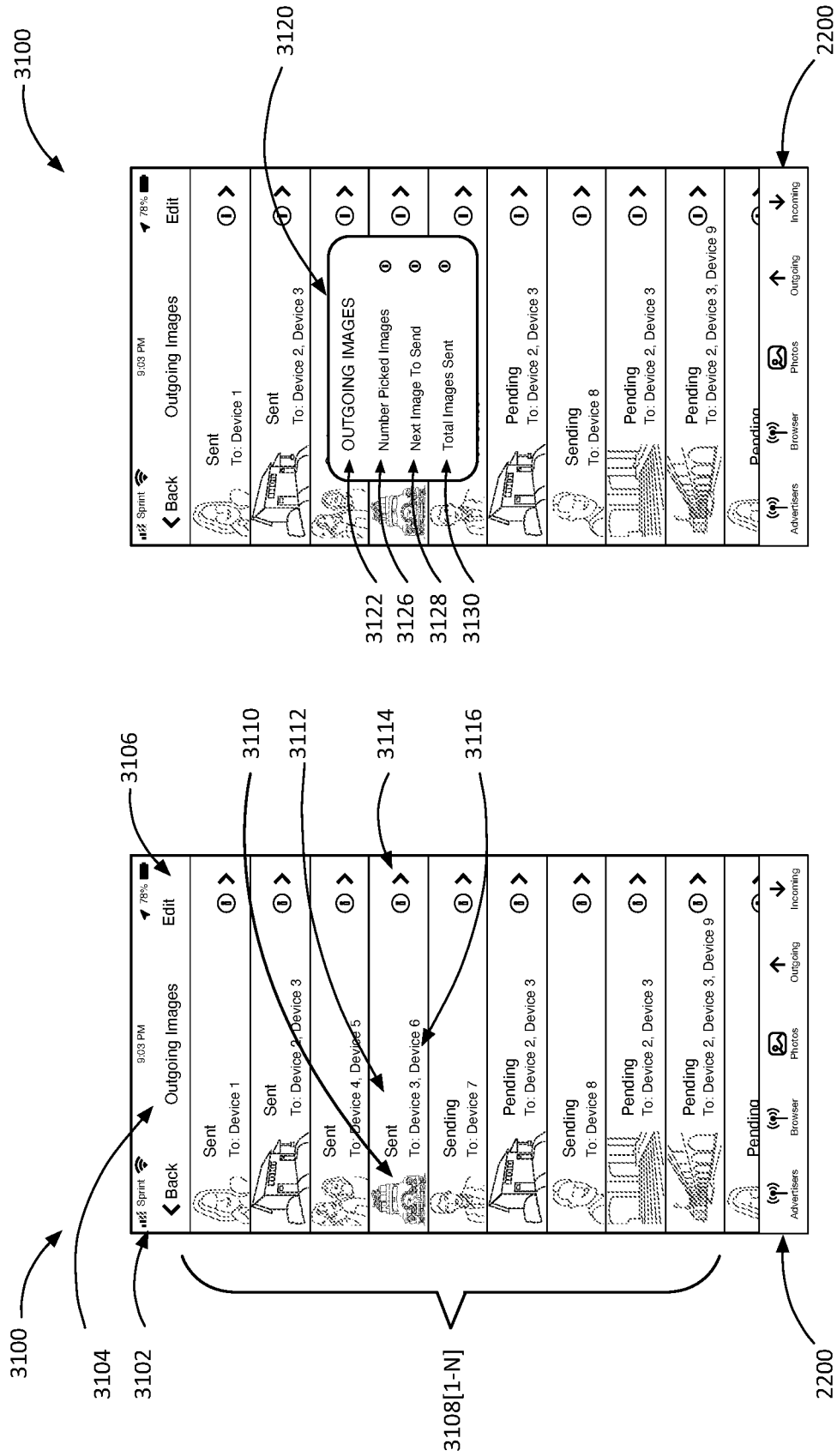
Figure 33:
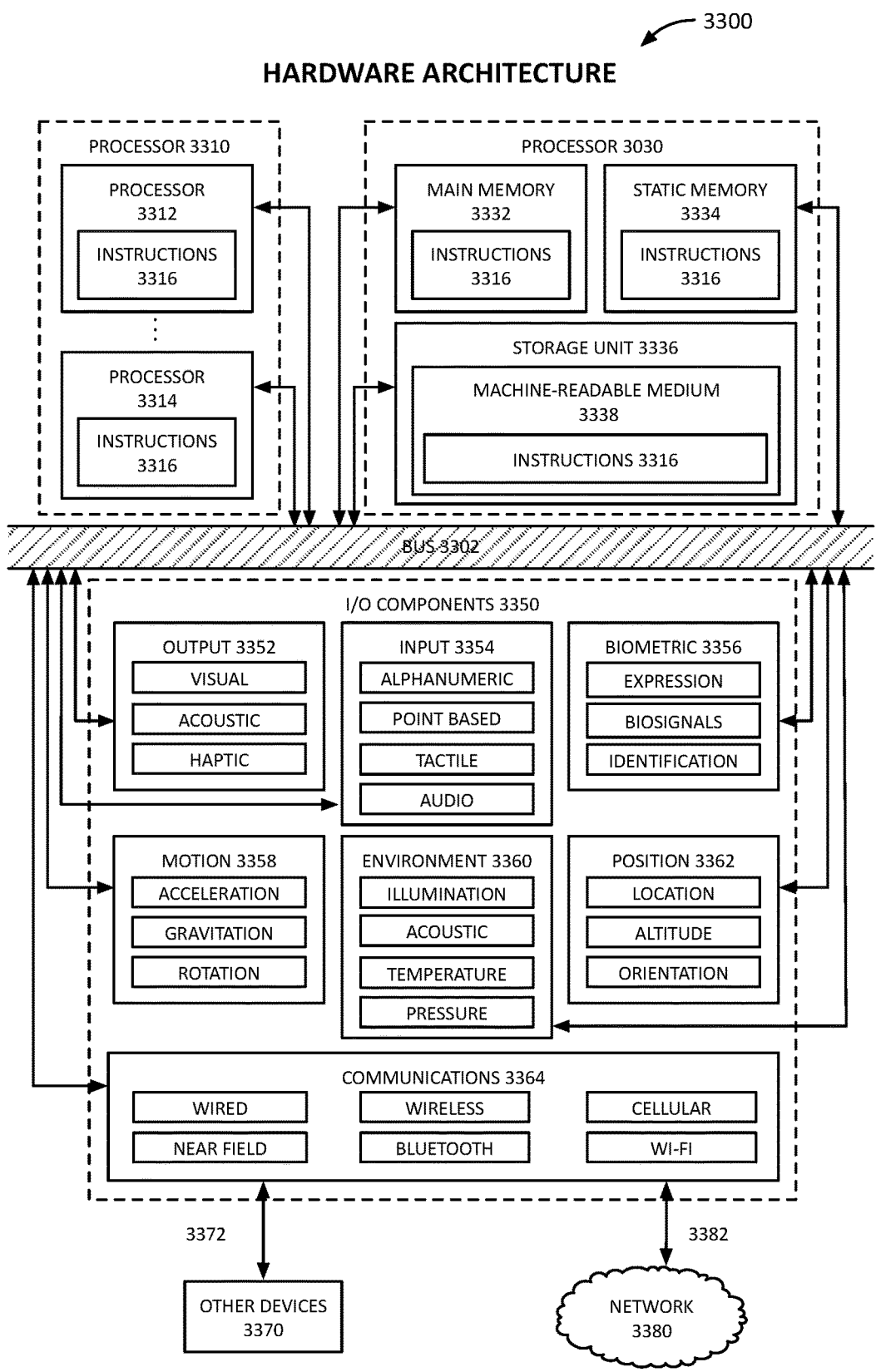
Figure 34:
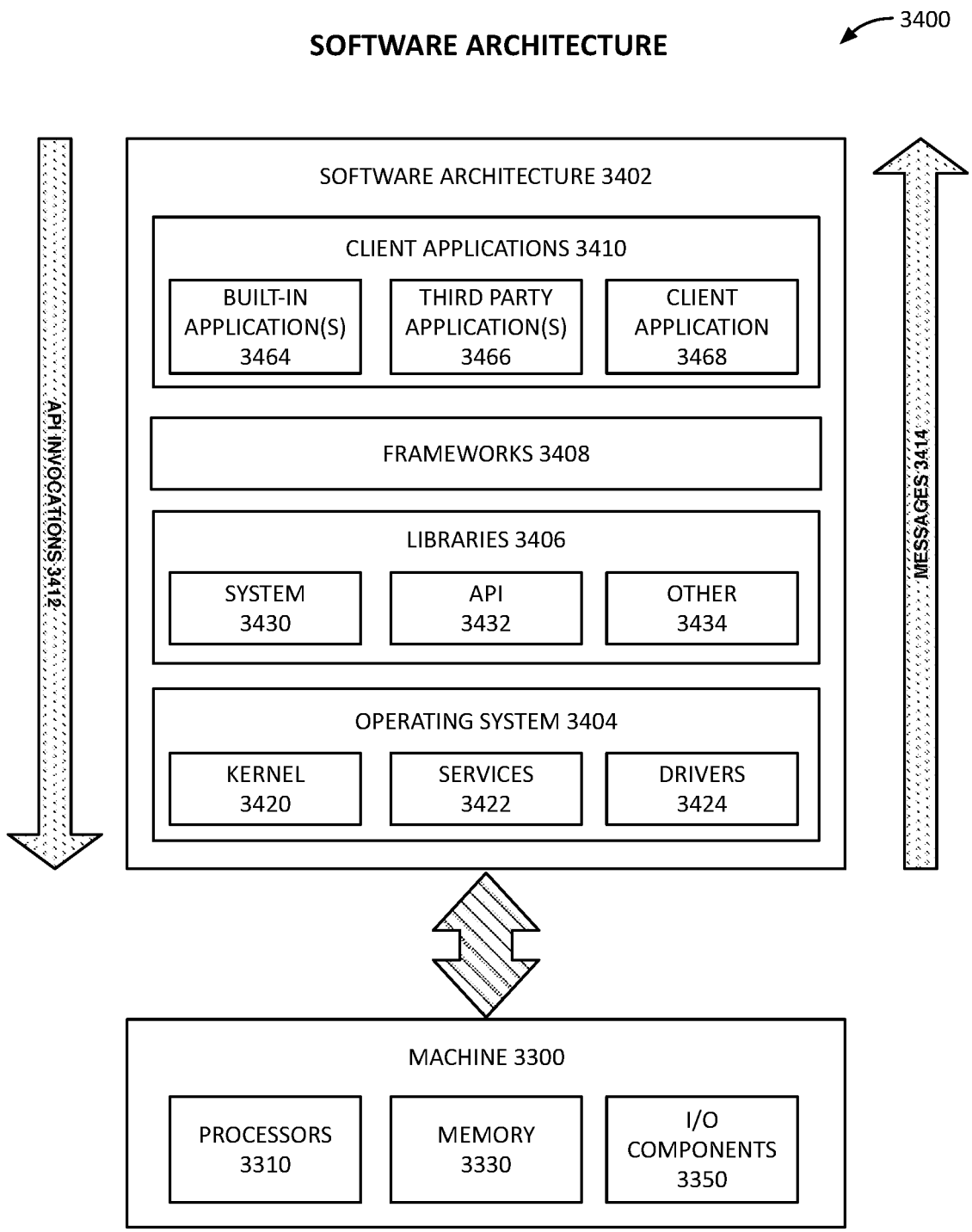
Figure 35:
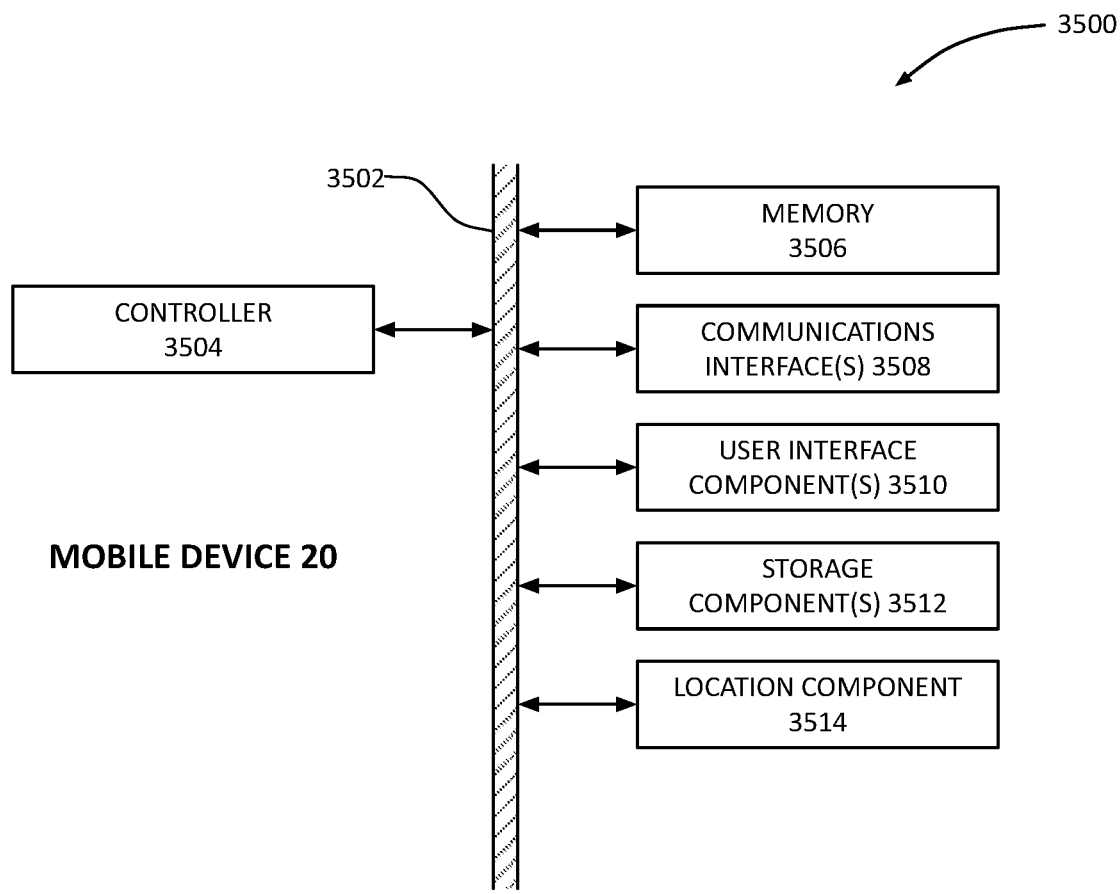
Figure 36:
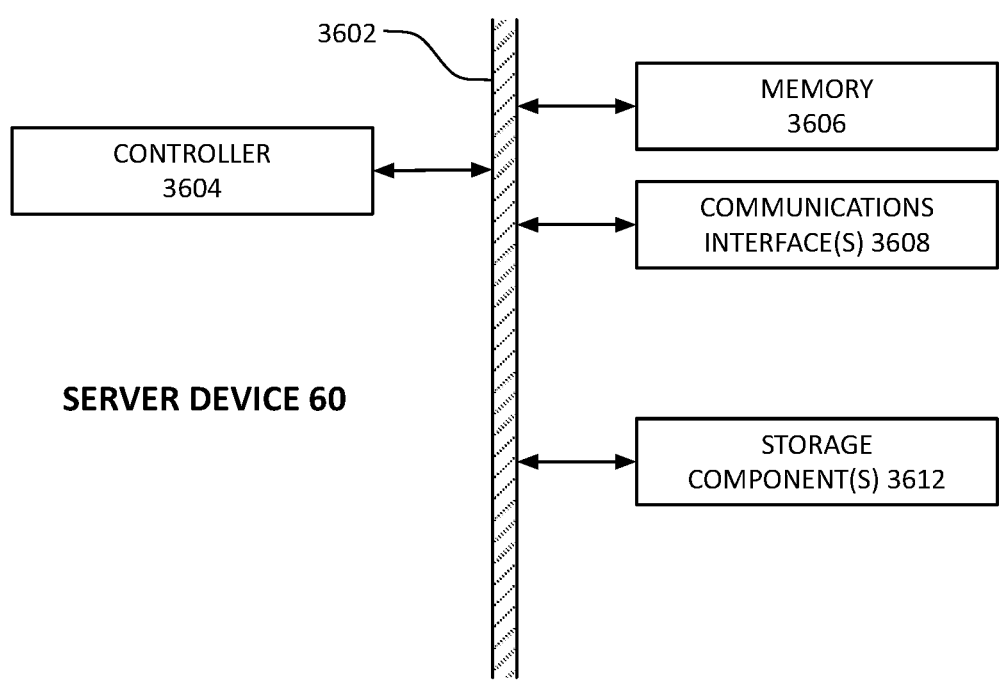

FIG. 20 graphically illustrates the Lifecycle of an Image Envelope;

FIG. 21 is a graphical illustration of View Hierarchy;

FIG. 22 is a graphical illustration of a Tab Bar;

FIG. 23 is a graphical illustration of an Advertiser View;

FIG. 24 is a graphical illustration of a Browser View;

FIG. 25A is a graphical illustration of a Preferences View;

FIG. 25B is a graphical illustration of an additional Preferences View;

FIG. 26A is a graphical illustration of a Peer Dictionary View;

FIG. 26B is a graphical illustration of an additional Peer Dictionary View;

FIG. 27 is a graphical illustration of a Photo Album Viewer View;

FIG. 28A is a graphical illustration of a Photo Selection View;

FIG. 28B is a graphical illustration of an additional Photo Selection View;

FIG. 29A is a graphical illustration of a Single Image View;

FIG. 29B is a graphical illustration of an additional Single Image View;

FIG. 29C is a graphical illustration of an additional Single Image View in portrait orientation;

FIG. 29D is a graphical illustration of an additional Single Image View in landscape orientation;

FIG. 30 is a graphical illustration of the Live Viewfinder in Augmented Reality Mode;

FIG. 31A is a graphical illustration of an Outgoing Images View;

FIG. 31B is a graphical illustration of an additional Outgoing Images View;

FIG. 31C is a graphical illustration of an Outgoing Images View in selection mode;

FIG. 31D is a graphical illustration of an Outgoing Images View in single image mode;

FIG. 32A is a graphical illustration of an Incoming Images View;

FIG. 32B is a graphical illustration of an additional Incoming Images View;

FIG. 32C is a graphical illustration of an additional Incoming Images View in selection mode;

FIG. 32D is a graphical illustration of an additional Incoming Images View in single image mode;

FIG. 33 is an exemplary hardware architecture block diagram for an exemplary machine;

FIG. 34 is an exemplary software architecture block diagram for the machine of FIG. 33;

FIG. 35 graphically illustrates a block diagram of an exemplary mobile device; and FIG. 36 graphically illustrates a block diagram of an exemplary server device.

DETAILED DESCRIPTION OF THE PREFERRED EMBODIMENTS

The embodiments set forth below represent the necessary information to enable those skilled in the art to practice the claims and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1A:
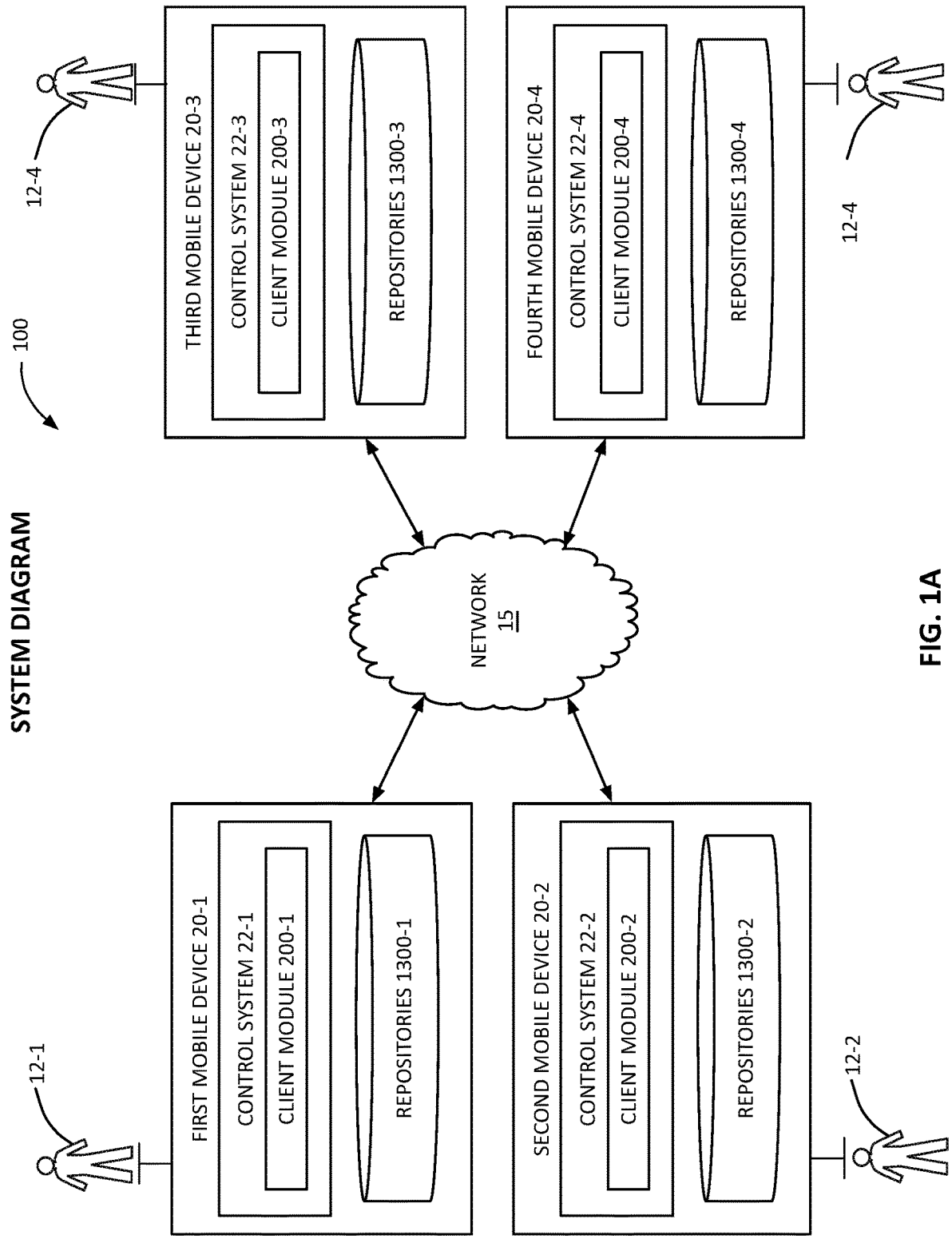
FIG. 1A is a system diagram illustrating the entities comprising the present system.

Referring now to FIG. 1A, a block diagram illustrates the basic elements of the system 100. The system is comprised of a plurality of mobile devices 20 associated with mobile device users 12. While only four mobile devices are shown, further embodiments will support up to N number of mobile devices 20 associated with N number of mobile device users 12. Each mobile device 20 is comprised of a control system 22 and an image repository 1300. Each control system 22 is comprised of a client 200 and an image repository 1300. The client 200 is described further in FIG. 2. The image repository 1300 is further described in FIG. 13. Mobile devices 20 are connected via an ad hoc network 15.

Figure 1B:
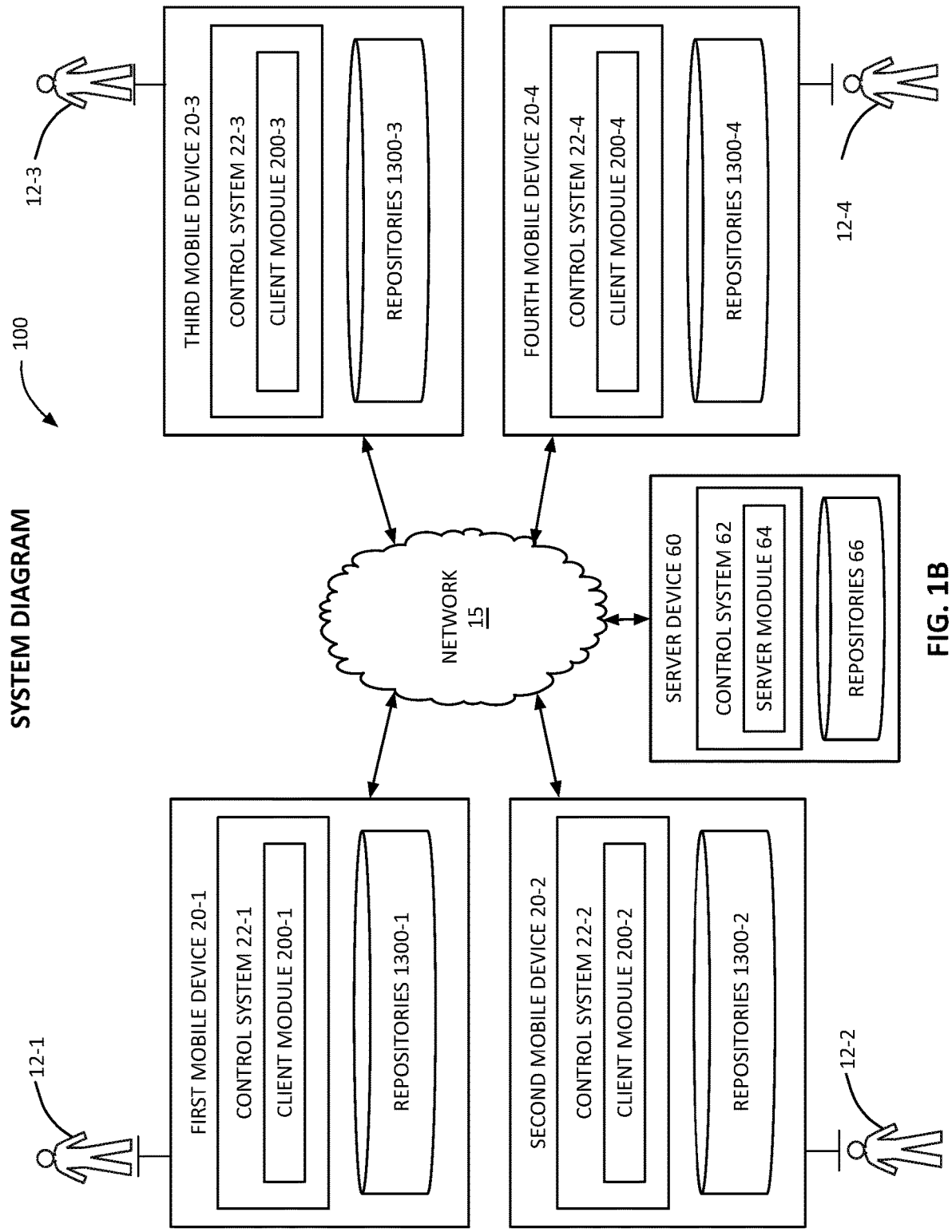
FIG. 1B is a system diagram illustrating the entities comprising the present system using a server device.
Figure 17A:
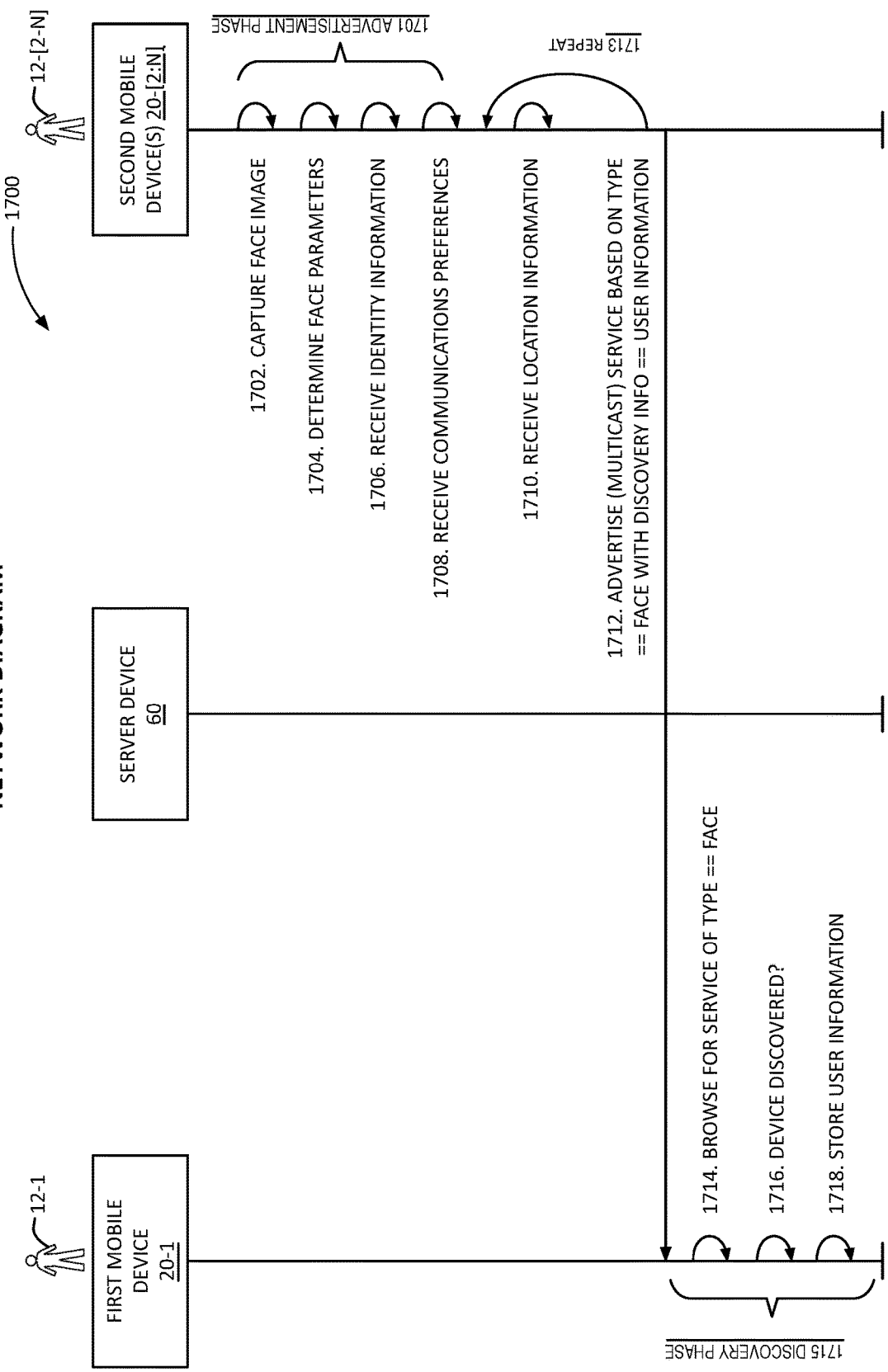
FIG. 17A is a network diagram showing the communications between a First Device and Second Device illustrating the setup, advertisement, and discovery of a service for Sharing Facial Information.
Figure 17B:
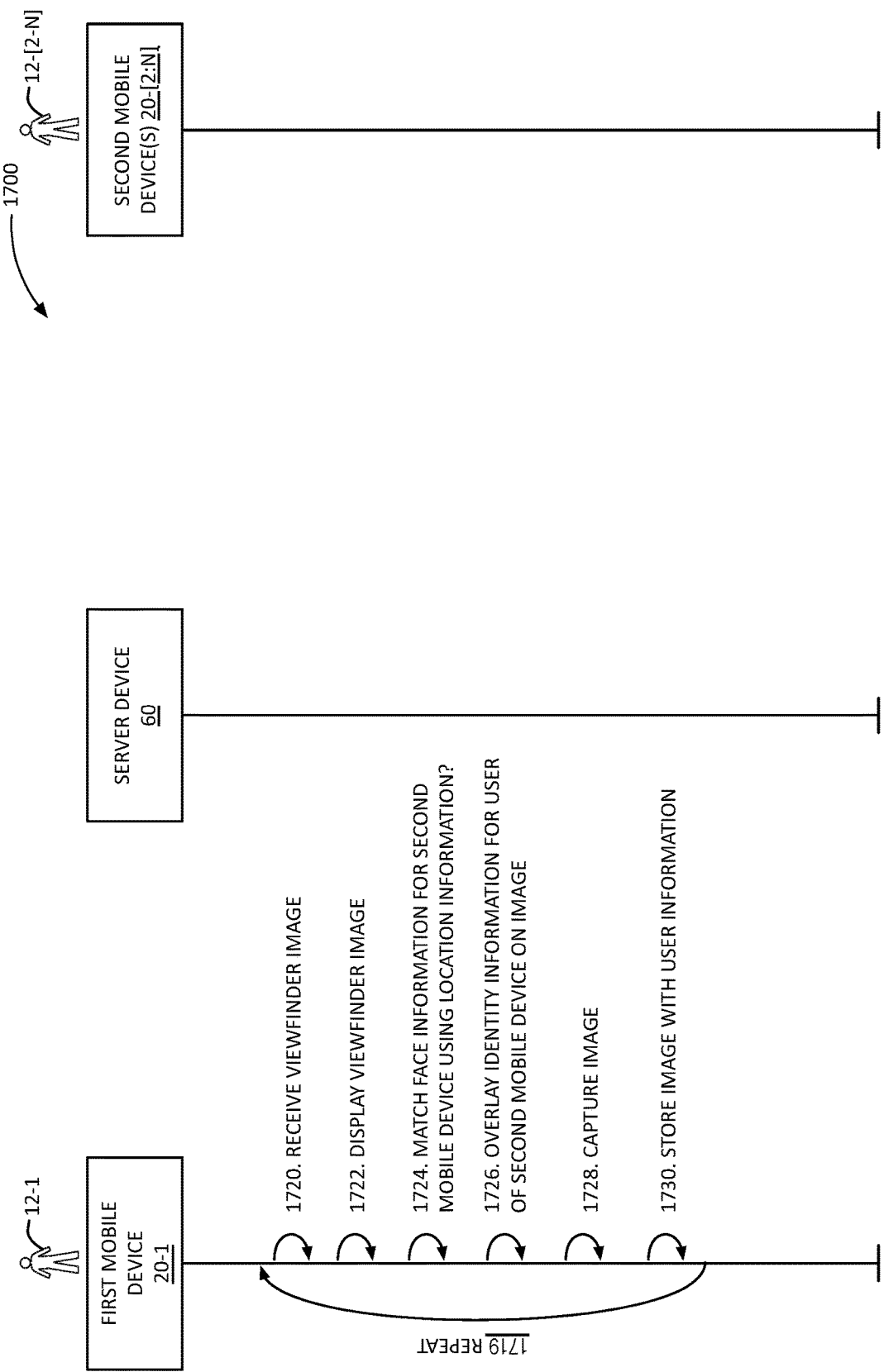
FIG. 17B is a network diagram showing the operation of a viewfinder and a camera of the Second Device.
Figure 17C:
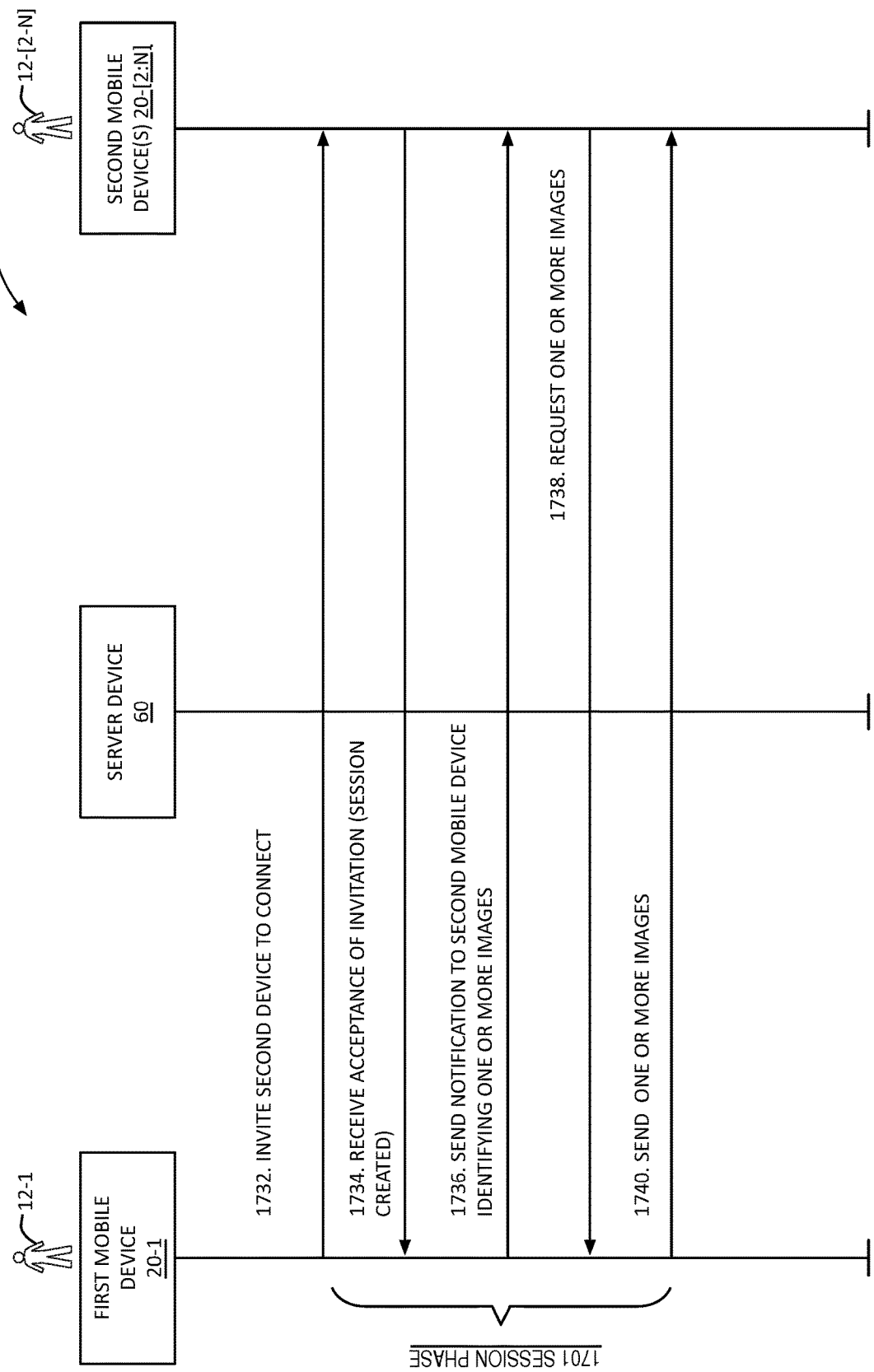
FIG. 17C is a network diagram showing the sharing of image data between the first device and second device without the aid of an intermediary server.
Figure 17D:
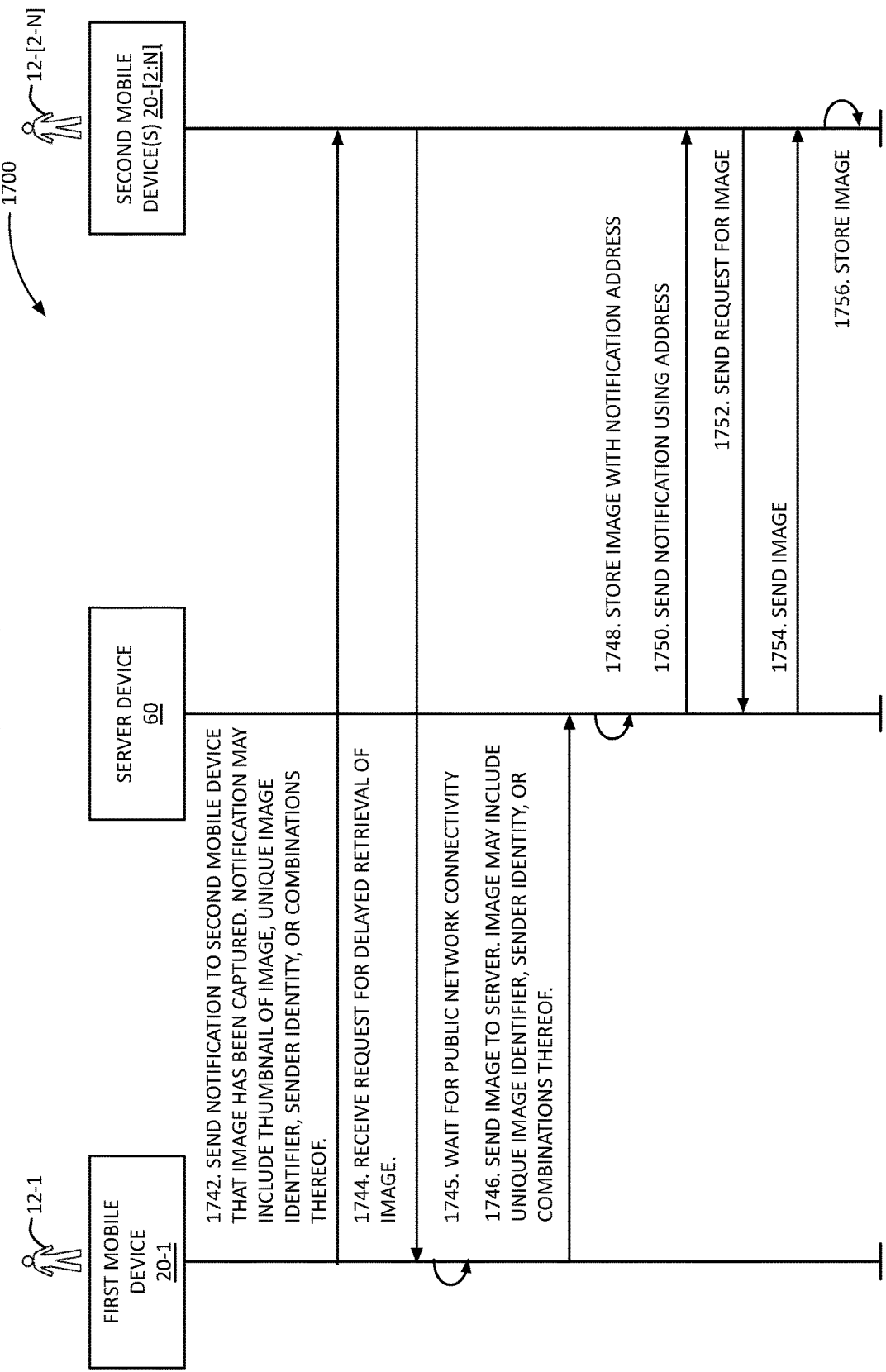
FIG. 17D is a network diagram showing the sharing of image data between the First Device and Second Device with the aid of an intermediary server.

FIG. 1B is a system diagram illustrating the entities comprising the present system using a server device 60 to facilitate in the sharing of images using a public network as described in FIG. 17D. The server device 60 is comprised of a control system 62 executing a server module 64 and one or more repositories 66.

Data Structures and Objects

Figure 2:
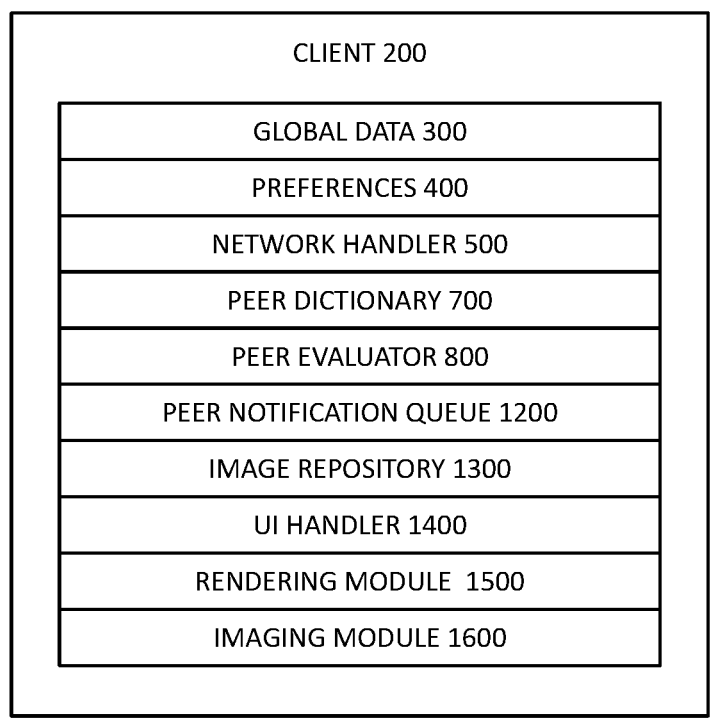
FIG. 2 is a graphical illustration of Client structure.
Figure 3:
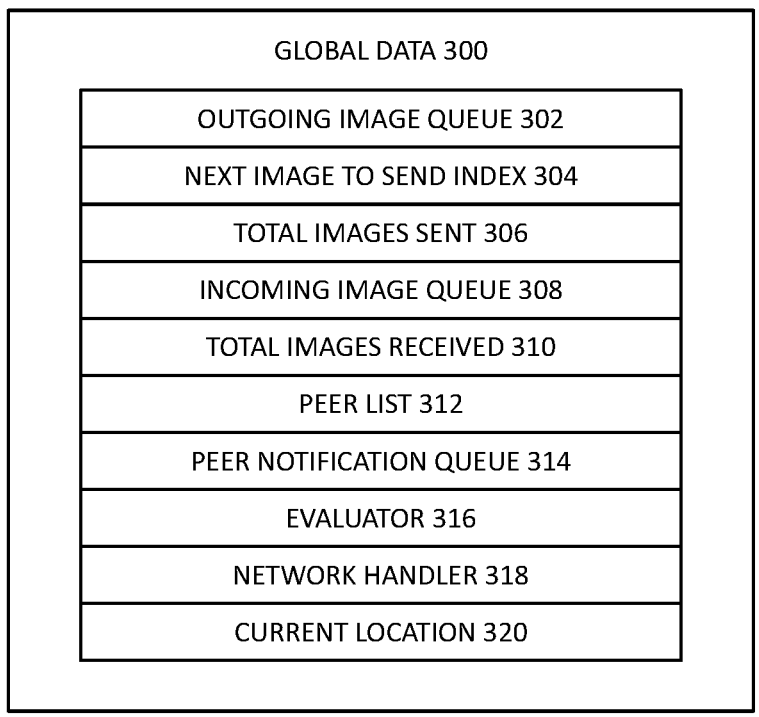
FIG. 3 is a graphical illustration of Global Data structure.
Figure 4:
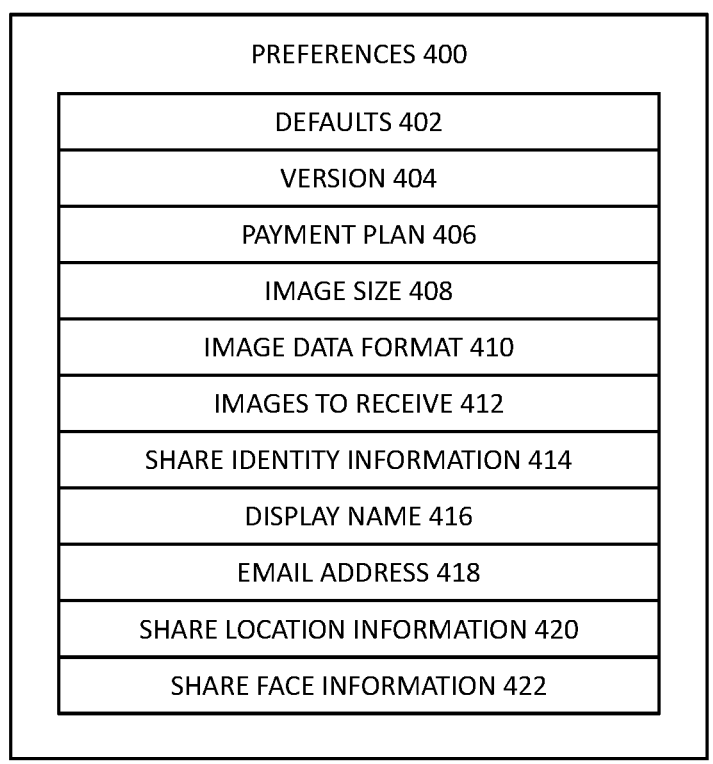
FIG. 4 is a graphical illustration of Preferences structure.
Figure 5:
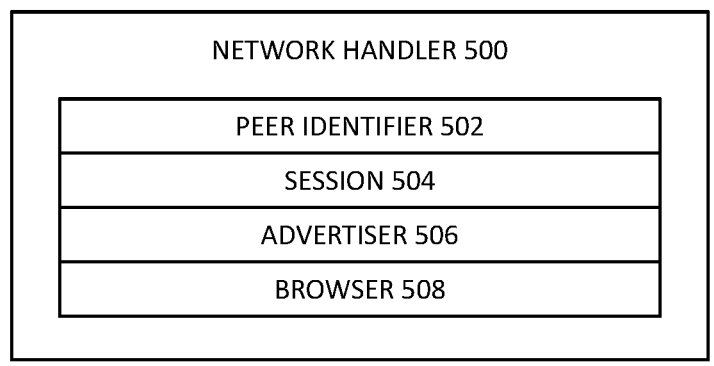
FIG. 5 is a graphical illustration of Network Handler structure.
Figure 8:
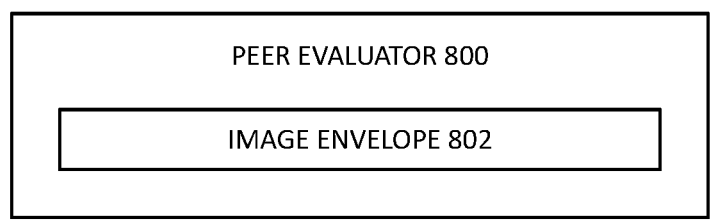
FIG. 8 is a graphical illustration of Peer Evaluator structure.
Figure 12:
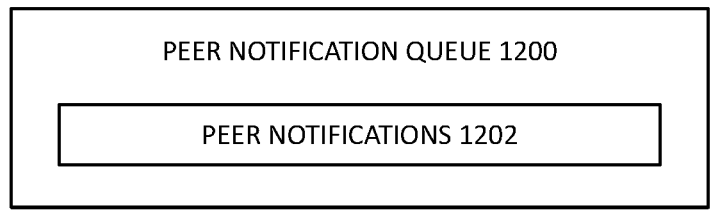
FIG. 12 is a graphical illustration of Notification Queue structure.
Figure 13:
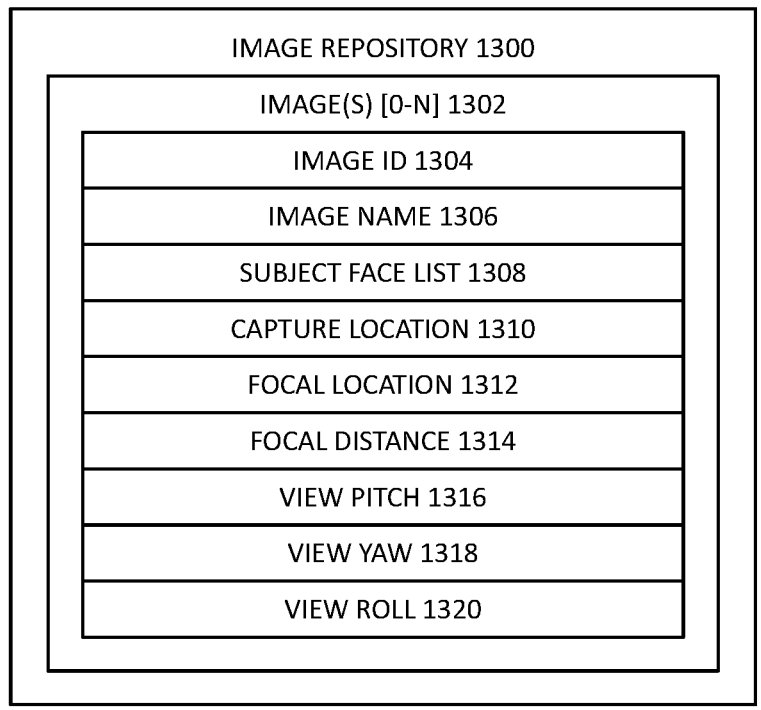
FIG. 13 is a graphical illustration of Image Repository structure.
Figure 14:
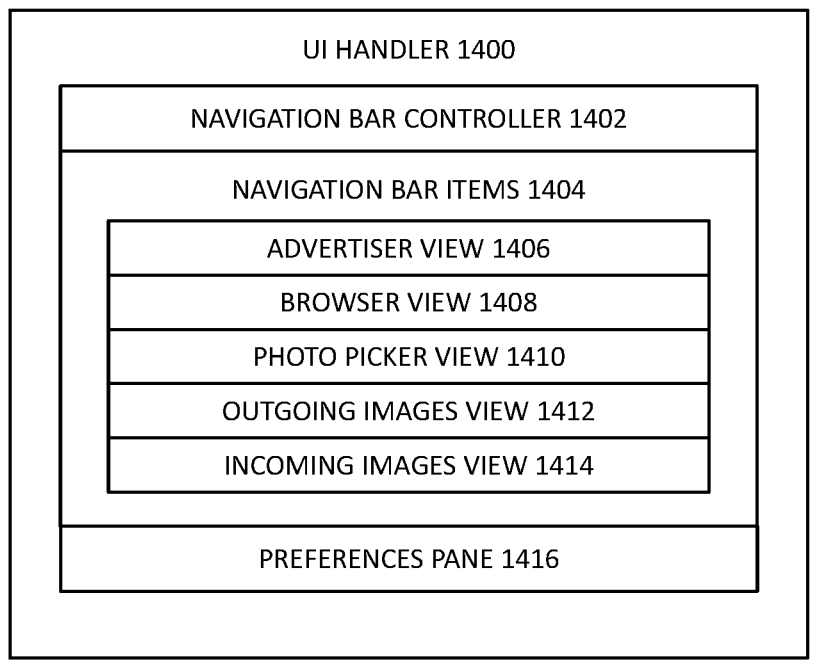
FIG. 14 is a graphical illustration of UI Handler structure.
Figure 15:
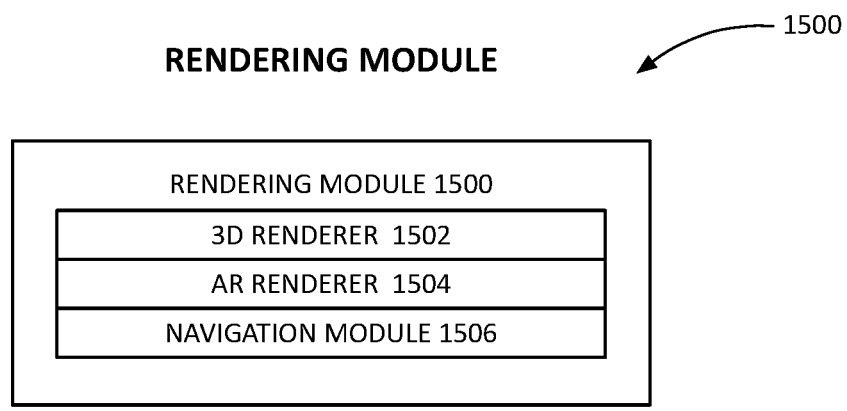
FIG. 15 is a graphical illustration of Rendering Module structure.
Figure 16:
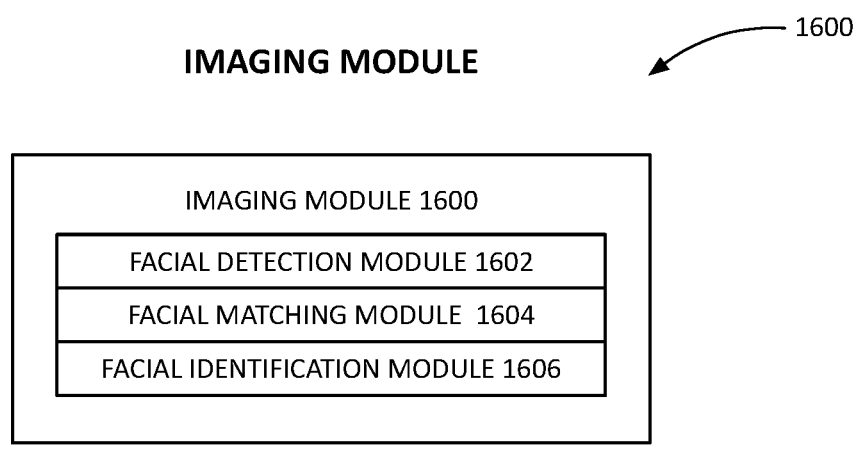
FIG. 16 is a graphical illustration of Imaging Module structure.

Referring now to FIG. 2, the client 200 includes global data 300 structure of FIG. 3, preferences 400 structure of FIG. 4, network handler 500 structure of FIG. 5, advertisement dictionary 700 structure of FIG. 7, peer evaluator 800 structure of FIG. 8, peer notification queue 1200 structure of FIG. 12, image repository 1300 structure of FIG. 13, UI handler 1400 structure of FIG. 14, rendering module 1500 structure of FIG. 15, face module 1600 structure of FIG. 16.

Referring now to FIG. 3, the global data 300 structure represents data available to the client and includes an outgoing image queue 302, next image to send index 304, total images sent 306, incoming image queue 308, total images received 310, peer list 312, peer notification queue 314, evaluator 316, network handler 318, current location 320. The outgoing image queue 302 stores information regarding images that have been captured. Images are marked with information indicating to whom they are to be sent and if they have been sent to the devices associated with those users. Images are stored in the outgoing image queue 302 in the order in which they are captured. The next image to send index 304 stores information indicating the next image to be sent. The total images sent 306 count represents the total number of images contained in the outgoing image queue 302 that have been sent. The incoming image queue 308 stores information regarding images that have been received. Images are marked with information indicating who they were received from and when they were received. The total images received 310 count represents the total number of images contained in the incoming image queue 308 that have been received. The peer list 312 contains a list of other devices that are currently in a session with the device. The peer notification queue 314 contains notifications that are to be transmitted to other devices 20-[2:N]. The evaluator 316 is a software module that evaluates designated images and determines to which mobile devices 20 they should be addressed. Images that are determined to need sending are placed in the outgoing image queue 302. The network handler 318 handles the advertising, browsing, session creation, and transmission of data between the device 20-1 and other devices 20-[2:N]. The current location 320 stores the current GPS location of the device 20 or other equivalent location mechanism (what3words, etc.).

Referring now to FIG. 4, the preferences 400 object stores information defining the preferred behavior of certain operating characteristics of the client 200. The defaults 402 field stores the developer chosen default operating behaviors. Version 404 stores the version (major release number, minor release number, build number, package number, and combinations thereof or other comparable unique identifier) of the software running on the client 200. The payment plan 406 field stores information indicating the payment plan. Payment plans may include free, paid, and variations thereof. The image size 408 field stores information indicating the image size(s) the client 200 would prefer to receive. Examples include full resolution, thumbnail, link to image, variations thereof, and combinations thereof. The image data format 410 field stores information indicating format of the image data received. Examples include RAW, JPEG, variations thereof, and combinations thereof. The images to receive 412 field identifies the size(s) to be received. The share identity information 414 may include the fields of identity information 726, and may include Boolean for each field, and the like. The display name 416 field stores information indicating the identifier (name, handle, or the like) of the user operating the client 200 on the device 20. The display name 416 may be stored as text as name 730. The email address 418 field stores information indicating the email address of the user 12 operating the client 200 on the device 20 in email address 744. The email address is typically stored as text or could be hashed for further privacy. The share location information 420 field stores a Boolean indicating whether the device 20 would like to transmit location information to other devices 20-[2:N]. The location information is typically transmitted in the form of GPS coordinates, but could leverage other location based technologies (like what3words) and could also generalize coordinates to more user friendly locations (like translating coordinates in the name of a state park where a family reunion was held). The share face information 422 field stores a Boolean indicating whether the device 20 would like to transmit face information to other devices 20-[2:N]. The face information is typically transmitted in the form of a vector or template representing the face or other comparable format used for facial matching.

Referring now to FIG. 5, the network handler 500 is comprised of a peer identifier 502, session 504 object, advertiser 506 object and browser 508 object. The peer identifier 502 represents a mobile device 20 in a multi-device session. The session 504 object enables and manages communication among all mobile devices 20 in a session. Before communication may take place, the session 504 must be initialized. The initialization of the session 504 requires a service type and discovery information. The service type is application defined and chosen by the developer at design time. The discovery information may be information such as the Peer Dictionary 700. The advertiser 506 object publishes an advertisement for a specific service type that the client 200 provides and handles invitations from nearby mobile devices 20. The advertiser 506 object tells nearby mobile devices 20 that the client 200 is willing to join sessions 504 of a specified type. An advertiser 506 object uses a single local mobile device 20 object to provide information that identifies the device 20 and its user to other nearby mobile devices 20. The browser 508 object searches (by service type) for services offered by nearby mobile devices 20 using infrastructure Wi-Fi, peer-to-peer Wi-Fi, and Bluetooth or Ethernet, and provides the ability to invite those devices 20 to a session 504. This network handler 500 is used in two phases: (1) the discovery phase and (2) the session phase. In the discovery phase, the browser 508 object is used to browse for nearby mobile devices 20. The client 200 also uses the advertiser 506 object to tell nearby mobile devices 20 that it is available, so that clients 200 on other nearby mobile devices 20 can invite it to a session 504. During the discovery phase, a client 200 has limited communication with and knowledge of other mobile devices 20; it has access to the discovery information data that other nearby clients 200 provide, and any context data that other mobile devices 20 provide when inviting it to join a session 504. After the client 200 chooses which mobile devices 20 to add to a session 504, the client invites those mobile devices 20 to join the session 504. Clients 200 running on the nearby mobile devices 20 can choose whether to accept or reject the invitation and can ask their users 12 for permission. If the mobile device 20 accepts the invitation, the browser 508 establishes a connection with the advertiser and the session 504 phase begins. In this phase, the client 200 can perform direct communication to one or more mobile devices 20 within the session 504. The framework notifies the client 200 through delegate callbacks when mobile devices 20 join the session 504 and when they leave the session 504. In some embodiments, the network handler 500 is provided by the operating system or as a framework. For example, on iOS on the iPhone, the network handler 500 is provided by the Multipeer Connectivity Framework.

Figure 6:
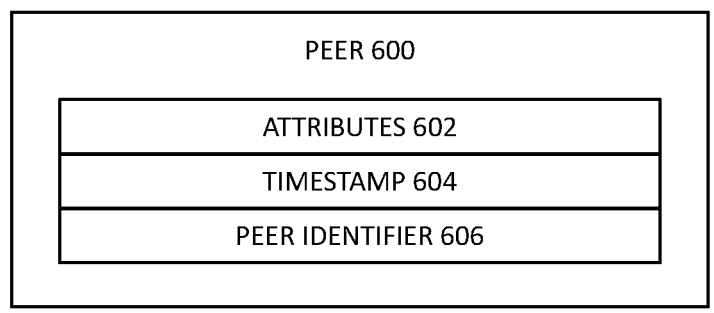
FIG. 6 is a graphical illustration of Peer Structure.

Referring now to FIG. 6, the peer 600 object includes an attributes 602 dictionary, timestamp 604, and peer identifier 606. The attributes 602 dictionary may include information such as the peer dictionary 700. The timestamp 604 identifies the time at which the peer dictionary 700 was received at the mobile device 20 and added to the peer list 312.

Referring now to FIG. 7, peer dictionary 700 includes a timestamp 702, face information 704, location information 710, identity information 728, communication preferences 734, and device information 746. The face information 704 includes a face image 706 and face template 708. The face image 706 may be a thumbnail image of the face of the user 12. The face template 708 is numerical parameters representing a face, sometimes called a template or vector. This face template is used to match a face in an image to a template received from another mobile device 20.

The Share Face Information 422 setting on the preferences 400 view enables control of how information is shared with other mobile devices 20 in the advertisement phase 1701 and discovery phase 1715. The location information 710 includes the location of the mobile device 20 and includes a latitude 712, longitude 714, altitude 716, speed 718, floor 720, course 722, horizontal accuracy 724, and vertical accuracy 726. The latitude 712 and longitude 714 are typically expressed as GPS coordinates. The altitude 716 is the vertical height of the mobile device 20 above the surface of the earth. The speed 718 is the speed of the mobile device 20 over a time interval. The floor 720 is the floor level inside a building structure. The course 722 is the direction of travel of the mobile device 20. The horizontal accuracy 724 and the vertical accuracy 726 represent the confidence level in the corresponding coordinates. This location information 710 is constantly being updated as the mobile device 20 is moved around according to the user's movement. The Share Location Information 420 setting on the preferences 400 view control whether this information is shared with other mobile devices in the advertisement phase 1701 and discovery phase 1715.

The identity information 728 includes a name 730 and graphical identifier 732. The name 730 corresponds to the display name 416 set in the preferences 400 view and may include a user supplied icon or graphical identifier 732.

The communication preferences 734 include an image size 736, image data format 738, and images to receive 740 which correspond to the image size 408, image data format 410, and images to receive 412 set in the preferences 400 view. The notification preferences 742 allow the mobile device 20 to define various other notification that may be received. For example, notification may be sent and received when a sent image is viewed. As another example, notification may be sent when a capturing device detects a subject in a live viewfinder image (indicating that the subject may appearing in an image about the be captured). The email address 744 corresponds to the email address 418 set in the preferences 400 view.

The device information 746 includes model name 748, system version 750, system name 752, device name 754, and client version 756. The model name 748 indicates the model name of the device 20, such as "iPhone 6s Plus" 2638. The system version 750 indicates the version of the operating system, such as "13.6" 2640. The system name 753 indicates the name of the operating running on the device such as "iOS" 2642. The device name 754, which is user supplied, is an informal identifier and may take any form such as "Hugh's Pink iPhone 6s" 2644. The client version identifies the version of the client 200 2516 running on the mobile device 20.

The Peer dictionary 700 is passed 1712 between the advertisement phase 1701 and discovery phase 1715.

Note that in some embodiments, the only information that is passed in the peer dictionary is the face template 708, and everything else is optional.

Referring now to FIG. 8, the peer evaluator 800 object performs the flowchart illustrated in FIG. 20. Upon instantiation the image envelope 802 is addressed and placed in the peer notification queue 1200 for delivery over the network.

Figure 9:
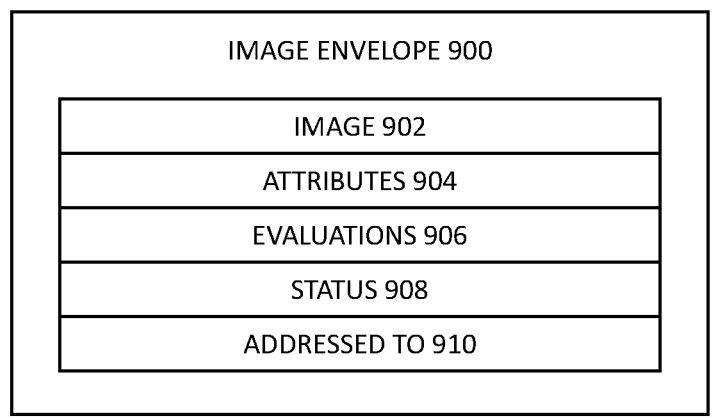
FIG. 9 is a graphical illustration of Image Envelope structure.

Referring now to FIG. 9, the image envelope 900 object is created by the Photo Picker View 2800 and sent to the peer evaluator 800. The peer evaluator 800 iterates through the peer list 312 creating a new evaluation 906 for each mobile device 20 with respect to the image 902 and adding it to the list of evaluations 906. If the evaluation 1000 produces a match (notification flag 1010=true) then a peer notification 1100 is created and added to the peer notification queue 1200. The attributes 904 field stores a list of attributes for the image 902. The status 908 field stores the status of the image envelope 900. Statuses for outgoing image envelopes include "Pending", "Sending", "Sent", and "Viewed". The "Viewed" status may optionally include a count of the number of times the image has been viewed. Statuses for incoming image envelopes include "Pending", "Receiving", "Received", and "Viewed". The "Viewed" status may optionally include a count of the number of times the image has been viewed. The addressed to 910 field stores the list of mobile devices 20 to which the image is to be sent to based on the notification flag 1010.

Figure 10:
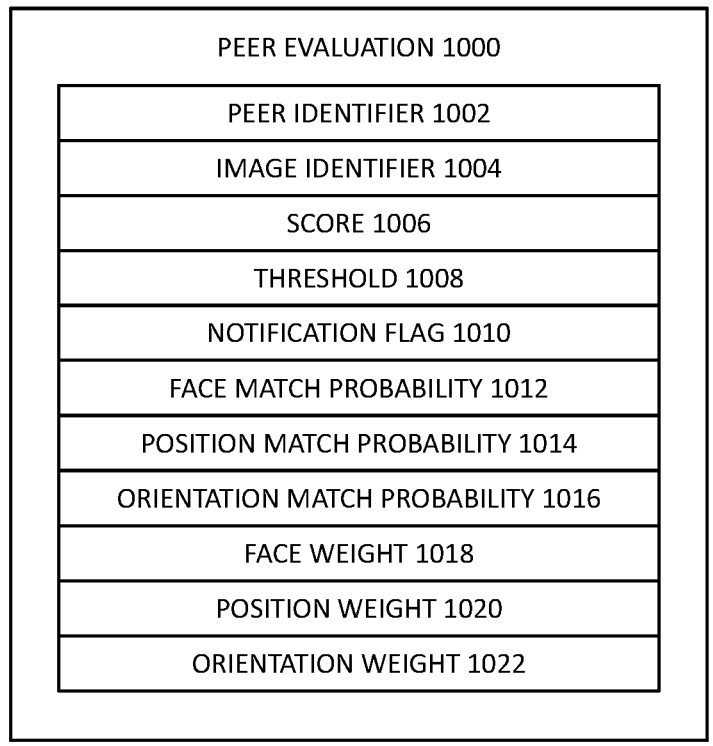
FIG. 10 is a graphical illustration of Peer Evaluation structure.

Referring now to FIG. 10, the peer evaluation 1000 object includes a peer 1002 identifier, image 1004 identifier, score 1006, notification flag 1010, face match probability (FMP) 1012, position match probability (PMP) 1014, orientation match probability (OMP) 1016, face weight (FW) 1018, position weight (PW) 1020, orientation weight (OW) 1022. The peer 1002 identifier specifies the mobile device 20 for which the image 1004 evaluation is being performed. For each image 1004 designated by a peer, an image 1004 evaluation is performed. Each image is evaluated against each mobile device 20 in the peer list 312. The notification flag 1010 is a Boolean indicating whether a peer notification 1100 should be sent for the image. The notification flag 1010 is determined based on performing a comparison of the score 1006 to a threshold value 1008. If the score 1006 is determined to be greater that the threshold value, then the notification flag 1010 is set to true.

$$\text{score}=\text{FMP}*\text{FW}+\text{PMP}*\text{PW}+\text{OMP}*\text{OW} \quad \text{Equation 1}$$

Figure 19A:
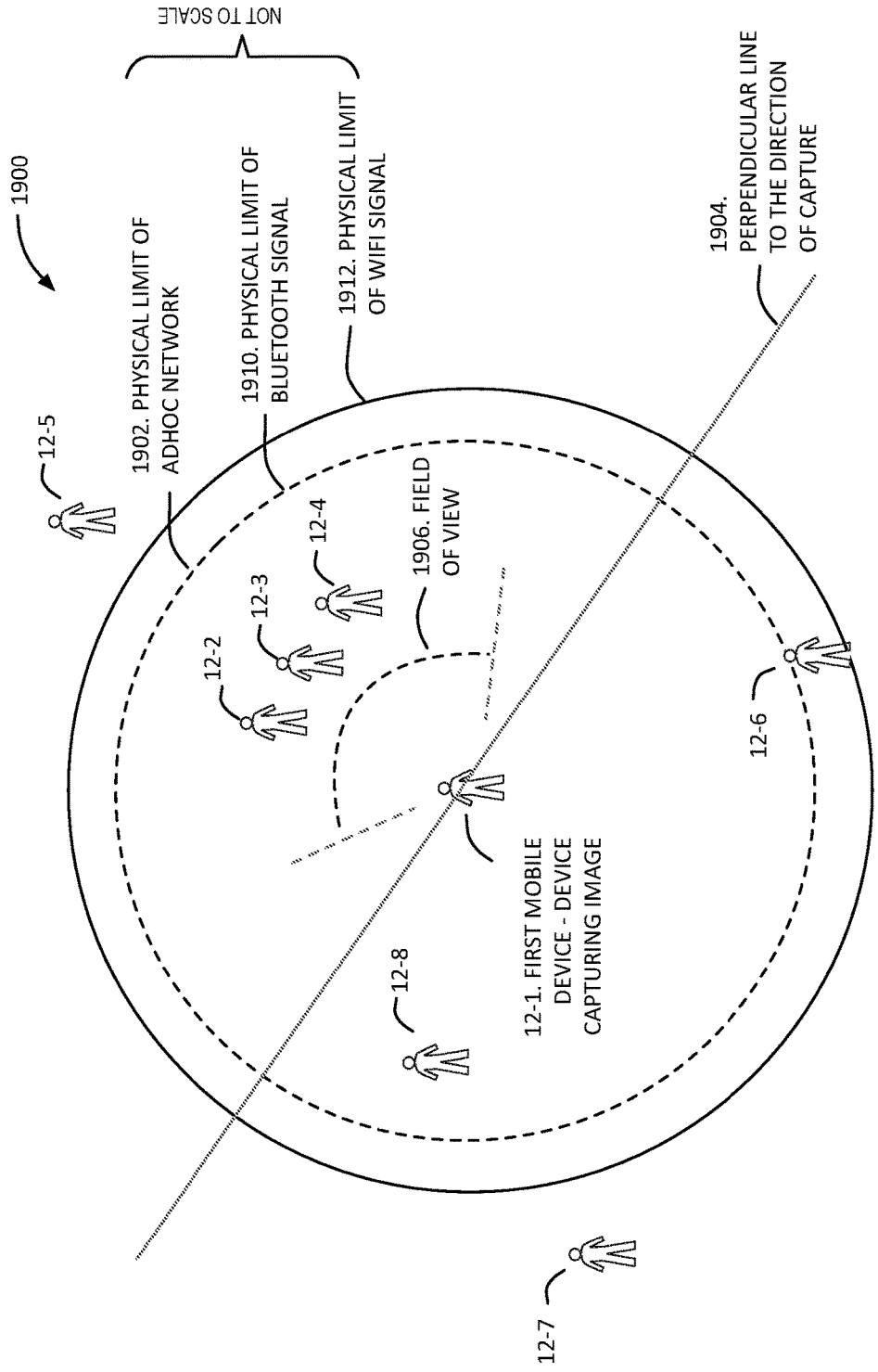
FIG. 19A illustrates the factors involved in determining if a mobile device can participate in an ad hoc network.

Referring now to Equation 1, the face match probability (FMP) 1012 is a measure of the probability that a face template matches a face in the image. This may be determined by the face matching module 1604. The position match probability (PMP) 1014 is a measure of the probability that the position of the face/device in the image matches the position of the mobile device 20 that provided the template 708. For example if the face/device appears to the right in the captured image (12-4 in FIG. 19A for example), but the location information 710 provided by the device indicates that it should be in the left (12-2 in FIG. 19A for example) then the position match probability (PMP) 1014 would be assigned a lower score compared to the case where the location information 710 also indicates that the device should be on the right. The position match probability (PMP) 1014 further helps to prevent sending the captured image to users/devices not appearing in the captured image. The orientation match probability (OMP) 1016 is a measure of the probability that the orientation of the face in the image complements the orientation of the device taking the image. For example, the capturing device 12-1 in FIG. 19A is facing north-east. The course 722 provided by users/devices 12-2, 12-3, and 12-4 should be facing roughly south-west for their faces to appear in the image. The orientation match probability (OMP) 1016 further helps to prevent sending the captured image to users/devices not appearing in the captured image.

The face weight (FW) 1018 specifies a level of importance of the face match probability (FMP) 1012 in determining the score 1006. The position weight (PW) 1020 specifies a level of importance of the position match probability (PMP) 1014 in determining the score 1006. The orientation weight (OW) 1022 specifies a level of importance of the orientation match probability (OMP) 1016 in determining the score 1006. The face weight (FW) 1018, position weight (PW) 1020, orientation weight (OW) 1022 may be system defined parameters. They may also be adjusted by the user 12. Some implementations may use only the face match probability (FMP) 1012 and face weight (FW) 1018.

Figure 11:
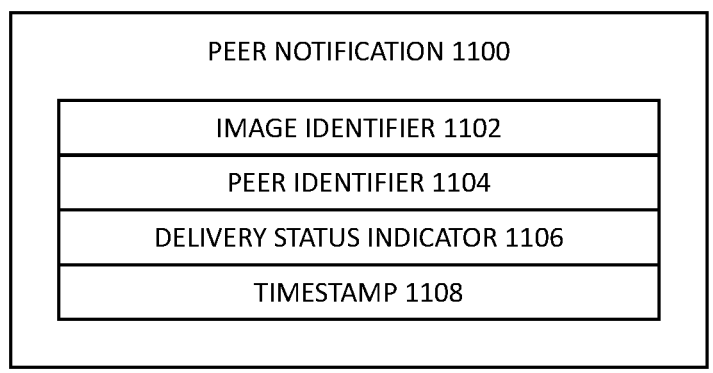
FIG. 11 is a graphical illustration of Peer Notification structure.

Referring now to FIG. 11, the peer notification 1100 is comprised of an image identifier 1102, peer identifier 1104, and delivery status indicator 1106, and timestamp 1108. When a peer evaluation 1000 produces a match (notification flag 1010==true) then a peer notification 1100 is created and added to the peer notification queue 1200. The image identifier 1102 identifies an image to be sent. The peer identifier 1104 specifies the mobile device 20 to which the image identifier 1004 is to be sent. The delivery status indicator 1106 specifies the current status of the peer notification 1100. Possible values include created, initialized, queued, in transit, and delivered. The timestamp 1108 identifies the time at which the delivery status indicator 1106 was last changed.

Referring now to FIG. 12, the peer notification queue 1200 manages the delivery of peer notifications 1202. The peer notification queue 1200 may operate asynchronously and deliver peer notifications 1202 on a background thread Referring now to FIG. 13, image repository 1300 operates to store images on the mobile device 20. The imaging module 1600 performs operations on the image repository 1300. The image repository 1300 stores zero or more images 1302. Each image 1302 includes an image ID 1304, image name 1306, face list 1308, capture location 1310, focal location 1312, focal distance 1314, view pitch 1316, view yaw 1318, and view roll 1320. The image ID 1304 uniquely identifies the image within the system 100. The image name 1306 stores the alpha numeric name of the image. The face list 1308 stores a list of the subject faces appearing in the image 902. The subject face representations may be produced by conventional facial representation generation techniques, such as techniques described in either or both of U.S. Pat. No. 5,164,992, entitled "FACE RECOGNITION SYSTEM" and U.S. Pat. No. 6,292,575, entitled "REAL-TIME FACIAL RECOGNITION AND VERIFICATION SYSTEM". The face representation is typically in the form of a template, which represents each of the persons in the subject face list 1308. As used herein, the term subject face refers to the face of a person (subject) appearing in an image.

As background, face recognition systems use computer algorithms to pick out specific, distinctive details about a person's face. These details, such as distance between the eyes or shape of the chin, are then converted into a mathematical representation and compared to data on other faces typically collected in a face recognition database. The data about a particular face is often called a face template and is distinct from a photograph because it's designed to only include certain details that can be used to distinguish one face from another. As such, it can require much less memory to store and bandwidth to transmit.

Some face recognition systems, instead of positively identifying an unknown person, are designed to calculate a probability match score between the unknown person and specific face templates stored in the database. These systems will offer up several potential matches, ranked in order of likelihood of correct identification, instead of just returning a single result.

Face recognition systems vary in their ability to identify people under challenging conditions such as poor lighting, low quality image resolution, and suboptimal angle of view (such as in a photograph taken from above looking down on an unknown person).

It is also important to understand the differences between face recognition, face detection, face identification, and face matching. Face recognition is a general topic that may include the others. Face detection refers to the process of determining that an image contains a face and may determine the boundaries of that face within the image. Face identification refers to matching the detected face in the image to a specific person of known identity (i.e. uniquely identify). Face matching refers to determining if a person appearing in one image is the same person appearing in another image—without necessarily identifying who that person is. The face detection, face identification, and face matching used in the present disclosure may be conventional and are not focus of the present disclosure.

The capture location 1310 stores the geographic location of the device 20 that captured the image 902 at the time of capture. The focal location 1312 stores the geographic location that was the focal point of the image 902. The focal distance 1314 stores the distance between the capture location 1310 and the focal location 1312. The view pitch 1316 stores the vertical viewing angle. The yaw pitch 1318 stores the horizontal viewing angle. The view roll 1320 stores the rotation angle along the viewing axis.

Referring now to FIG. 14, the UI handler 1400 includes a tab bar controller 1402, navigation bar items 1404 and preferences panels 1416. The navigation bar items 1404 include an advertiser view 1406, browser view 1408, photo picker view 1410, outgoing images view 1412 and incoming images view 1414.

In some embodiments, the advertiser view 1406 is a view such as that described in FIG. 23. In some embodiments, the browser view 1408 is a view such as those described in FIG. 24. In some embodiments, the preferences view 1416 is a view such as those described in FIG. 25A-25B. In some embodiments, the photo picker view 1410 is a view such as those described in FIGS. 27, 28A, 28B, 29A, 29B, 29C, and 29D. In some embodiments, the outgoing images view 1412 is a view such as those described in FIGS. 31A, 31B, 31C, and 31D. In some embodiments, the incoming images view 1414 is a view such as those described in FIGS. 32A, 32B, 32C, and 32D. Users 12-2, 12-3, 12-4, and 12-8 from FIG. 19A that are in the physical limit of the ad hoc network 1902 are shown.

Referring now to FIG. 15, the rendering module 1500 includes a 3d renderer 1502, an AR renderer 1504, and navigation module 1506.

Referring now to FIG. 16, the face module 1600 includes a facial detection module 1602, facial matching module 1604, and a facial identification module 1606. The facial detection module 1602 operates to detect the presence of a subject face within an image, output the size and position of the face. The facial matching module 1604 operates to compare two faces to determine if they are the same face. In some embodiments, the faces are reduced to templates before performing the comparison. The facial identification module 1606 operates to determine the identity of a subject face, that is, matching the subject face with a real-world person.

Networking and Communications

A number of networking technologies and specification are available to implement the described system. They may be used in isolation, or in combination with other technologies/specification. For example, due to their underlying features and limitations, Bluetooth may be used for the discovery phase, and WiFi Direct may be used for more intensive data sharing.

Bluetooth devices use the free, 2.4-gigahertz radio band known as ISM, which stands for industrial, scientific and medical devices. The band is unlicensed for low-power use, so headsets and other Bluetooth accessories use very little in the way of batteries. While any two Bluetooth devices can share¬data at a range between 10 and 100 meters (33 and 328 feet), phones usually operate at the former, laptops at the latter. Any Bluetooth device can communicate with up to seven other devices at a time.

Every Bluetooth device has its own address, a unique 48-bit identifier with six bytes of information that might look like this: 01:23:45:67:89.10. The first three bytes (01:23:45) are assigned to the specific manufacturer of the device, while the last three bytes (67:89:10) are assigned by the manufacturer. These make each device entirely unique.

The Bluetooth standard's maximum data rate is, at best, 3 mbps or about 2.1 after protocol overheads take their cut. Wi-fi on the other hand, maxes out anywhere from 54 to 1300+ mbps depending on whether you have "g", "n", or "ac" wi-fi plus any enhancements in the adaptors and router support. A general rule of thumb in home networking says that wi-fi routers operating on the traditional 2.4 ghz band reach up to 150 feet (46 m) indoors and 300 feet (92 m) outdoors. Older 802.11a routers that ran on 5 ghz bands reached approximately one-third of these distances.

A piconet is a network of devices connected using Bluetooth technology. The network ranges from two to eight connected devices. When a network is established, one device takes the role of the master while all the other devices act as slaves. Piconet gets its name from the word "pico", which means very small. This very small network is so called because the number is limited to seven devices, plus the master, which limits network and data sharing capability. Data transfer rates vary from 200 to 2,100 kbps at the application. A piconet is sometimes called a personal area network (pan) because the range of optimal operation for Bluetooth is 10 meters, about the size of a living room.

The number of devices that can be paired is practically unlimited—as long as you have enough storage for every device's mac address and link key. In a piconet, one master can actively communicate with seven other devices (limited by a 3-bit address), and up to 255 devices can be part of the piconet but inactive ("parked").

Bluetooth communications are not limited to building piconets, however. More often the connection is between exactly two devices (for example, file transfers between two phones). In this case, since the full 48-bit mac address is used, the master could juggle many such connections at once, within hardware limitations. Another possibility is a scatternet, where multiple piconets are linked by a shared device. Historically, there have been few actual implementations of scatternets due to limitations of Bluetooth and the mac address protocol.

Zigbee is another wireless networking specification with less restrictive limits and more efficient power use: Because ZigBee nodes can go from sleep to active mode in 30 msec or less, the latency can be low and devices can be responsive, particularly compared to Bluetooth wake-up delays, which are typically around three seconds. Because ZigBee nodes can sleep most of the time, average power consumption can be low, resulting in long battery life.

Wi-Fi Direct, initially called Wi-Fi P2P, is a Wi-Fi standard enabling devices to easily connect with each other without requiring a wireless access point. Wi-Fi Direct allows two devices to establish a direct Wi-Fi connection without requiring a wireless router. Hence, Wi-Fi Direct is single radio hop communication, not multihop wireless communication, unlike wireless ad hoc networks and mobile ad hoc networks. Wi-Fi ad hoc mode, however, supports multi-hop radio communications, with intermediate Wi-Fi nodes as packet relays. Wi-Fi becomes a way of communicating wirelessly, much like Bluetooth. It is useful for everything from internet browsing to file transfer, and to communicate with one or more devices simultaneously at typical Wi-Fi speeds. One advantage of Wi-Fi Direct is the ability to connect devices even if they are from different manufacturers. Only one of the Wi-Fi devices needs to be compliant with Wi-Fi Direct to establish a peer-to-peer connection that transfers data directly between them with greatly reduced setup. Wi-Fi Direct negotiates the link with a Wi-Fi Protected Setup system that assigns each device a limited wireless access point. The "pairing" of Wi-Fi Direct devices can be set up to require the proximity of a near field communication, a Bluetooth signal, or a button press on one or all the devices.

Referring now to FIG. 17A, a network diagram is 1700 showing the communications between a first device 20-1 and a second device 20-2 illustrating the advertisement phase.

Advertisement Phase

An image of the face of the second user 12-2 of the second mobile device 20-2 is designated. This may be accomplished by capturing 1702 a face image of the second user 12-2, for example using the front facing camera of the second mobile device 20-2. It may also be accomplished through allowing the second user 12-2 to select an existing image. This may be an image already stored on the second mobile device 20-2, or it may be an image retrieved over a network. This may also be an image used by the second mobile device 20-2 to allow the second user 12-2 to authenticate on the second mobile device 20-2.

Facial information is determined and/or obtained 1704 for the identified face image of the second user 12-2. The facial information may be represented as a template or other representation. The face Information may include information such as that shown in face information 704.

Identity information is obtained 1706 at the second mobile device 20-2. The Identity Information may be obtained from information already stored and/or cached at the second mobile device 20-2, may be retrieved from a remote device, or may be received via user input from the second user 12-2.

The identity information may include information such as that shown in identity information 726.

Communication preference Information is obtained 1708 at the second mobile device 20-2. The communication preference Information may be obtained from information already stored and/or cached at the second mobile device 20-2, may be retrieved from a remote device, or may be received via user input from the second user 12-2. The communication preference Information may include information such as that shown in communication preferences 734.

Location Information is obtained 1710 at the device. The Location Information may be obtained from information already stored and/or cached at the second mobile device 20-2, may be retrieved from a remote device, or may be received via user input from the second user 12-2. The Location information may include information such as that shown in location information 710.

The from the second user 12-2 advertises 1712 its presence with a service type and discovery information. The discovery information includes information such as that shown in the peer dictionary 700. The peer dictionary 700 includes information such as face information 704, location information 710, identity information 728, and communication preferences 734. The location information 710, identity information 728, and communication preferences 734 are optional in some implementations.

The advertisement signaling is repeated on a periodic basis to account for the fact that other devices 20 may be coming into range as time progresses.

Referring now to FIG. 17B, a network diagram is 1700 showing the operation of a viewfinder and a camera of the second device.

Discovery Phase

The first mobile device 20-1 browses 1714 for second devices advertising with a service type matching its desired service type. In this context, browsing means that the device is monitoring certain networking addresses and ports for the transmission of packets containing the advertisement announcement.

Whenever an advertisement announcement is discovered 1716 matching the desired service type, the discovery information included in the advertisement announcement is read into memory.

The discovery information may be stored 1718 for later access.

The first mobile device 20-1 is operable to take images using a capture subsystem. During this process, the image data appearing on the ADC may be received 1720.

The received viewfinder image may be displayed 1722. In some embodiments, the viewfinder image is updated in real time to facilitate real-time feedback and framing of an image to capture. In some embodiments, the viewfinder image is of lower resolution than that of an image designated for capture by the first user 12-1.

Face matching 1724 may be accomplished using a face comparison module that performs a face comparison between a subject face received from a first user 12-1 and a face appearing in an image and returning a match indicator if the match confidence is greater than or equal to a match threshold.

Faces occurring in the viewfinder image may be matched with the face information 704 received in the peer dictionary 700 found in the advertisement announcements from other mobile devices 20. When any of those faces are determined to be a match, the matching faces will be highlighted in the viewfinder image. In some embodiments, those faces determined to be a match may be augmented 1726 with identity information 728 from the peer dictionary 700.

Once framing of an image is complete, the first user may trigger the capturing of the image (a captured image) to designate 1728 an image. In other modes of operation, an image may be designated 1728 by receiving input from the first user and designating it from previously captured images or other images stored on the device. In one aspect, the designating of the image flows from the capture event, and the designation of the image is automatic and passive, requiring no other inputs from the user other than triggering the capture event. In another aspect, the first user may be prompted, based on a preference, and require that the first user approve the sending of the captured image.

The captured image is associated with information identifying the mobile devices that were in the proximity of the first mobile device 20-1 at the time of designation for later use by the peer evaluator 800. This information is stored 1730 at the first mobile device 20-1 in the peer list 312.

The face matching process is performed 1731 again to determine subject faces of second users of second mobile devices 20-2 from among the peer list 312 maintained on the first mobile device 20-1.

For those second mobile devices 20 for which the second users 12 face appears in the designated image, an invitation 1732 is sent to the second mobile device 20-2.

For those second mobile device 20-2 that accept the invitation, an invitation acceptance 1734 message is sent, and a communication session is created.

Referring now to FIG. 17C, a network diagram 1700 illustrating sharing of image data between the first device and second device without the aid of an intermediary in the session phase.

Session Phase

For each of the second mobile devices 20-2 associated with the image, the first mobile device 20-1 sends the image message for the designated image.

In some embodiments, the first mobile device 20-1 will send the designated image to an exchange server using an Internet connection. This may provide backup of the image and allow for distribution to second mobile devices 20-2 that may leave the network range of the first mobile device 20-1.

The image message may include one or more of the designated images, a thumbnail of the designated image, an identifier for the designated image and an identifier for the thumbnail of the designated image. The image identifiers allow for later retrieval of the designated image and the thumbnail of the designated image. The identifiers are globally unique identifiers (GUID). In some embodiments, the GUID is generated from time and one or more of the MAC addresses and the processor serial number.

Once the second mobile device 20-2 is ready to receive the designated image, the second mobile device 20-2 may send a request for the image to the first mobile device 20-1. The request will include the image identifier indicating the image desired. In other scenarios, the second device may operate on a group of designated images.

Upon receiving the request from the second mobile device 20-2, the first mobile device 20-1 sends to the second mobile device 20-2 the requested image. If the first mobile device 20-1 no longer has the designated image, an error code is returned. The image may no longer be available because the first mobile device 20-1 may have deleted it, or the first mobile device 20-1 is no longer in network range. In the case where the first mobile device 20-1 is no longer in network reach, an exchange server may be used.

In the situation where the first mobile device 20-1 is no longer in network range, the second mobile device 20-1 may send one or more image identifiers to the exchange server to retrieve the one or more images.

Referring now to FIG. 17D, a network diagram 1700 is shown illustrating the sharing of image data between the first device and second device with the aid of an intermediary server.

Delayed Image Transmission

A notification is sent 1742 from the first mobile device 20-1 to the second mobile device 20-2 that an image has been captured. The notification may include thumbnail of image, unique image identifier, sender identity, or combinations thereof.

A request is received 1744 by the first mobile device 20-1 from the second mobile device 20-2. The first mobile device 20-1 waits 1745 until public network connectivity is re-established. If public network connectivity is already present, then flow proceeds immediately.

The image is sent 1746 to the server device 60 from the first mobile device 20-1. The transmission may include image may include unique image identifier, sender identity, or combinations thereof.

The image is stored 1748 at the server device 60 along with the notification address of the second mobile device 20-2. When the second mobile device 20-2 is once again in range of a public network, a notification may be delivered 1750 to the second mobile device 20-2 providing a retrieval address that may be used to request and receive the image from the server device 60. The retrieval of the image may be automatic, on a periodic basis or on demand or some other sequence. The second mobile device 20-2 may send 1752 a request for the previously captured image. The image may be delivered 1754 to the second mobile device 20-2 over the public network. The image may be stored 1756 at the second mobile device 20-2.

Figure 18:
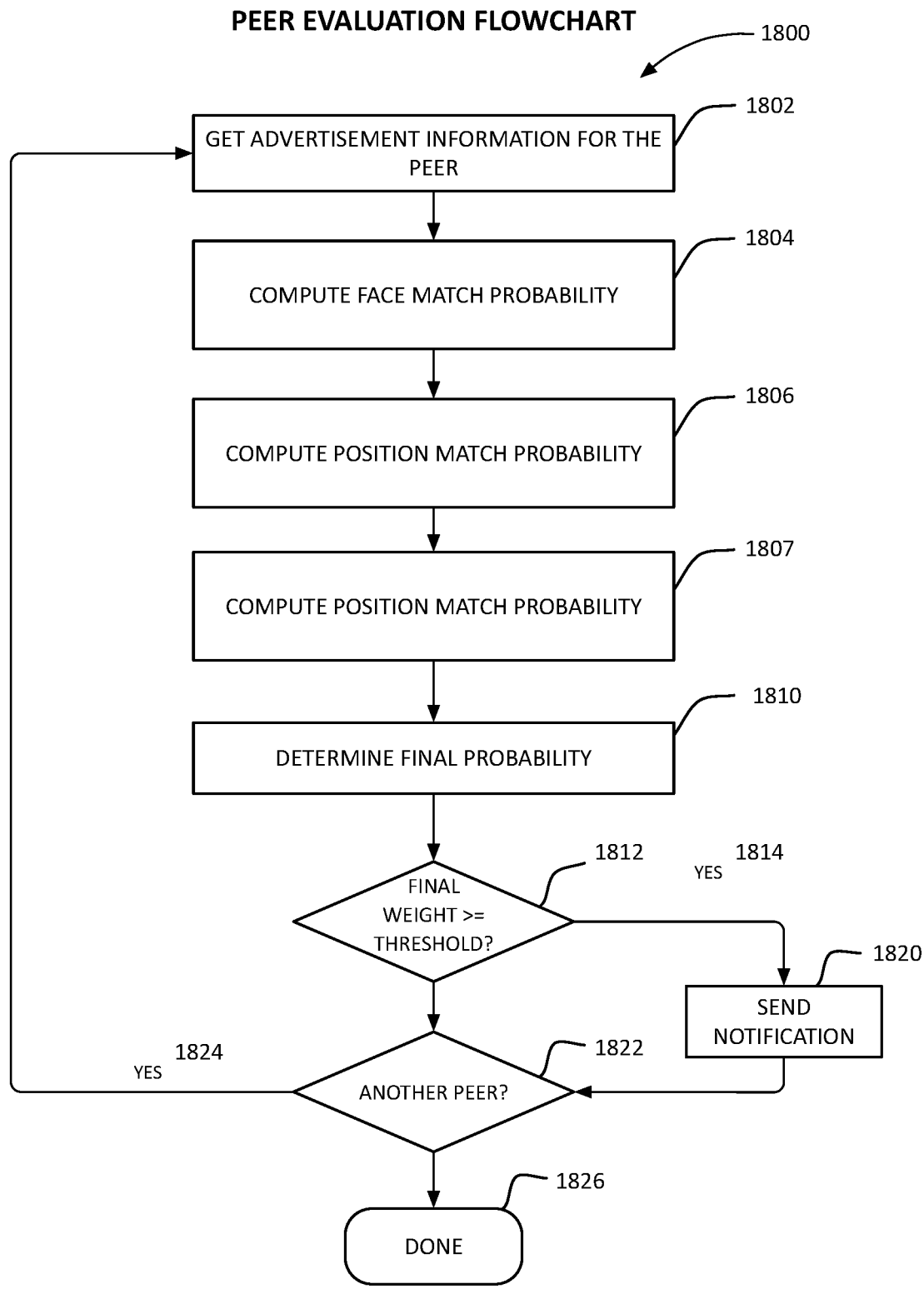
FIG. 18 illustrates a flowchart for performing a Peer Evaluation to address an image.

Referring now to FIG. 18, the flowchart 1800 illustrates the process by which a peer evaluation 1000 is made for a given image 1004. The peer evaluation 1000 structure shown in FIG. 10. The peer dictionary 700 for the peer 1002 is retrieved. A comparison performed to determine 1804 a probability that the face template 708 in the peer dictionary 700 of the peer 1002 matches a face appearing in the image 1004. This first probability is stored in the peer evaluation 1000 structure as the face match probability (FMP) 1012.

A second comparison is performed to determine 1806 if the position of the face in the image 1004 matches the physical location of the peer 1002. This second probability is stored in the peer evaluation 1000 structure as the position match probability (PMP) 1014. this second comparison is further illustrated in FIG. 19A. In some implementations, this computation may also include the use of altitude information. For example, comparing the two peers are on the same floor of a building.

A third comparison is performed to determine 1807 if the orientation of the face and the image matches the orientation of the user taking the image. 1004 This third probability is stored in the peer evaluation 1000 structure as the orientation match probability (OMP) 1016. In some implementations, this third computation may also include the use of pitch, yaw, and roll information for the user capturing the image 1004. For example, if the altitude of the user appearing in the image is higher than the user capturing the image 1004, this should be reflected in the pitch, yaw, and roll information.

The final probability computation 1810 is performed to determine the match score 1006. This match score 1006 is determined as the products of the probability weights multiplied by the individual probabilities according to Equation 1. If the match score 1006 is greater than or equal to 1812 the match threshold 1008 value then the notification flag 1010 is set to true and a notification is sent to the mobile device 20. This loop 1812 (steps 1802-1822) is repeated until all peers 1002 have been evaluated 1826.

FIG. 19A shows a topology 1900 for determining users in the field of view of an image capture. It is a goal of the present system to determine users 12-2:N with associated mobile devices 20-2:N that are in the field of view 1906 of the image capture and also within communication range of Bluetooth for the purpose of determining which users are likely to appear in the captured image and were able to provide the capturing device 20-1 their peer dictionary 700. The capturing device 20-1 uses this information to determine which other devices are likely to have their corresponding users appearing in the captured image. Other devices 20-2:N not within Bluetooth range of the capturing mobile device 20-1 can't provide their peer dictionary 700 to the capturing mobile device 20-1 so they will not be able to receive the image even if their corresponding user 12 falls within the field of view (user 12-5 for example).

The user 12-1 of the first mobile device (the capturing mobile device) 20-1 is aiming said device towards another group of three users 12:2-4 associated with corresponding mobile devices 20:2-4. The field of view 1906 seen by the capture system of the device 20-1 includes users 12:2-4 associated with corresponding mobile devices 20:2-4, but not users 12-6 and 12-8 associated with corresponding devices 20-6 and 20-8. For reference, a line perpendicular 1904 to the direction the camera is pointed is shown. The field of view 1906 seen by the first mobile device 20-1 shows that the three users 12:2-4 are all in the field of view 1906 while user 12-6 and 12-8 are outside the Field of View 1906. The physical limit of the reception for the Bluetooth signal 1910 is shown, and the physical limit of the reception for the WIFI signal 1908 is shown. It can be seen that user 12-6 is outside the reception area of the Bluetooth signal but within WIFI range. In some embodiments, the first mobile device 20-1 will use the information that the devices 20:2-4 are within the Field of View 1906 of capture, while the users 12-8 and 12-6 are outside the Field of View 1906 to increase or decrease the probability that the devices 20 correspond to users 12 appearing in the image.

In the description of FIG. 19A, and in other sections of the specification, reference is often made to either a user 12 or a device 20 participating in the system. Referring to one but not both is a matter of convenience. A device participating in the system 100 should be assumed to include both a user 12 and a device 20. For example, FIG. 19A shows a user 12-8. This is really referring to user 12-8 operating corresponding device 20-8.

FIG. 19B illustrates the logic involved in determining if a mobile device can and should be sent an image according to one embodiment of the present disclosure. Column 1 of FIG. 19B shows various attributes for each of the users 12 of FIG. 19A. Column 2, the field of view, indicates if a user 12 is within the capture frame of the capturing device 20-1. Column 3 indicates whether a device is within Bluetooth signal range 1910. Column 4 indicates whether a device is within WIFI signal range 1912. Column 5, ad hoc network availability, indicates if a device is within Bluetooth signal range 1910 and WIFI signal range 1912. To have ad hoc network availability 1902, a device needs to be in both Bluetooth signal range 1910 and WIFI signal range 1912.

FIG. 19C illustrates an example computation for determining if a mobile device can and should be sent an image according to one embodiment of the present disclosure. In this example, modeled on FIG. 19A, Equation 1 is applied. The values for FMP 1012 may be determined from the face matching module 1604. The PMP 1014 may be determined based on factors including location information 710 including latitude 712, longitude 714, altitude 716, floor 720, horizontal accuracy 724 and vertical accuracy 726. The OMP 1016 may be determined based on factors including course 722 and orientation 3362 (not shown in peer dictionary). The FW 1018, PW 1020, and OW 1022 may be system defined parameters. The score is determined from Equation 1. The threshold may be a system defined parameter as well.

Referring now to FIG. 20, the block diagram represents a flowchart of the life cycle 2000 of an image envelope 900. An image envelope 900 is instantiated when an image 1302 is designated by the photo picker view 2110. The image envelope 900 is passed to the peer evaluator 800 which iterates through the list of mobile devices 20 in the peer list 312 comparing the face of the user 12 of each mobile device 20 to each face appearing in the image. For each facial match that is made, image envelope 900 is addressed to 910 be sent to that mobile device 20. The image envelope 900 is then placed in the outgoing image queue 1200/302 for future transmission. The transmission of the items in the outgoing notification queue 1200 may be interrupt driven, event driven, on a periodic basis or on demand or some other sequence. The outgoing image view 2112 displays the image envelopes 900 that have been instantiated. When the image envelope 900 is selected from the outgoing image queue 302 for transmission, the image envelope is passed to the archiver 2010 for serialization. The image envelope 900 data are then transmitted according to the currently negotiated transmission link (Bluetooth, WIFI Direct, Infrastructure WIFI, etc). Upon reception at the destination mobile device 20, the image envelope 900 data are de-archived 2020 and the reconstituted image envelope 900 is placed in the incoming image queue 1200/308. The reception of the items to be placed in the incoming notification queue 1200 may be interrupt driven, event driven, on a periodic basis or on demand or some other sequence. The incoming image queue 308 is displayed in the incoming image view 2114.

User Interface

Referring now to FIG. 21, the View Hierarchy includes a launch screen view 2102 and a tab bar controller view 2104 and a preferences view 2120. The tab bar controller view 2104 includes an advertiser view 2106, browser view 2108, photo picker view 2110, outgoing images view 2112, incoming images view 2114, peer dictionary view 2116, and image view 2118.

The various modes of the advertiser view 2106 are shown in FIG. 23. The various modes of the browser view 2108 are shown in FIG. 24. The various modes of the photo picker view 2110 are shown in FIGS. 27, 28A-28B, and 29A-29D. The various modes of the outgoing images view 2112 are shown in FIGS. 31A-17C.

The various modes of the incoming images view 2114 are shown in FIGS. 32A-32C. The various modes of the peer dictionary view 2116 are shown in FIGS. 26A and 26B. The various modes of the image view 2118 are shown in FIGS. 32D and 32D. The various modes of the preferences view 2120 are shown in FIGS. 25A and 25B.

Referring now to FIG. 22, the tab bar 2200 of FIG. 22, selecting the advertiser navigation bar item 2202 operates to present the Advertiser View of FIG. 23. Selecting the browser navigation bar item 2204 operates to present the Browser View of FIG. 24. Selecting the photos navigation bar item 2206 operates to present the Photo Picker View of FIGS. 27, 28A, 28B, 29A, 29B, 29C, and 29D. Selecting the outgoing images navigation bar item 2208 operates to present the Outgoing Images View of FIG. 31A-31D. Selecting the incoming images navigation bar item 2210 operates to present the Advertiser View of FIG. 32A-32D.

Referring now to FIG. 23, the Advertising View 2300, selecting the preferences button control 2302 operates to present the preferences panes of FIGS. 25A-25B. The purpose of the Advertising View 2300 is summarized in the title 2303. Selecting the face selection button 2304 operates to allow the user to designate an image of their face. This can be done by selecting an existing image, or by using a front facing camera to take a picture of their face. The face image frame 2306 shows the image designated by the face selection button 2304. The advertising name explanation text 2308 describes how the advertising name inputted using the advertising name entry control 2310 will be used. The advertising enable toggle control 2312 allows the user to control when they are being advertised. Selecting the account registry button control 2314 operates to allow the user to register their account with the server.

Referring now to FIG. 24, the Browser View 2400 illustrates an interface for selecting the preferences button control 2402 to present the preferences panes of FIGS. 25A-25B. The purpose of the Browser View 2400 is summarized in the title 2403. The browsing enable toggle 2404 button allows for browsing to be enabled and disabled from within the view. The browsing radar control 2406 operates to present other mobile devices 20 that are in proximity to the mobile device 20. The connection list table description text 2408 describes the entries in the connection list names table view 2410. In the exemplary FIG. 24, the connection list names table view 2410 includes entries for two discovered mobile devices, mobile device "iPhone 11 Pro Max" 2412 and mobile device "Samsung Galaxy 10" 2414.

Referring now to FIG. 25A, the preferences table view 2500 illustrates an interface for setting the items in the preferences 400 structure. The operating system permissions preference description 2504 includes a location permission preference setting 2506, photo permission preference setting 2508, camera permission preference setting 2510, and AI voice assistant permission preference setting 2512. These items correspond to services available from the operating system 3404 and require user permission for the client 200 to access. The application information preference description 2514 includes the version information 2516, and payment plan preference setting 2518, which correspond to the version 404 and payment plan 406 of the preferences 400 pane. The image transmission format preference description 2520 include an image size preference setting 2522, image format preference setting 2524, and images to receive preference setting 2526 which correspond to image size 408, image data format 410, and images to receive 412 of the preferences 400 structure.

Referring now to FIG. 25B, the identity information preference description 2528 includes the identity sharing toggle 2530, display name text entry 2532, and the contact address 2534, which correspond to the share identity information 414, display name 416, and email address 418 of the preferences 400 structure. The location preference description 2536 includes the location sharing toggle 2538 which corresponds to the share location information 420 of the preferences 400 pane. The identity information preference description 2540 includes the face sharing toggle 2542 which corresponds to the share identity information 414 of the preferences 400 pane.

Referring now to FIGS. 26A and 26B, the Peer Dictionary View 2600 operates to display elements such as the elements of the peer dictionary 700. The timestamp 2604 corresponds to speed 702, the face image 2606 corresponds to face image 706, the latitude 2608 corresponds to latitude 712, the longitude 2610 corresponds to longitude 714, the altitude 2612 corresponds to altitude 716, the speed 2614 corresponds to speed 718, the floor 2616 corresponds to floor 720, the course 2618 corresponds to course 722, the horizontal accuracy 2620 corresponds to horizontal accuracy 724, the vertical accuracy 2622 corresponds vertical accuracy 726, the name 2624 corresponds to name 730, the graphical identifier 2626 corresponds to graphical identifier 732, the image size 2628 corresponds to image size 736, the image data format 2630 corresponds to image data format 738, the images to receive 2632 corresponds to images to receive 740, the notification preferences 2634 corresponds to notification preferences 742, the email address 2636 corresponds to email address 744, the model 2638 corresponds to model 748, the system version 2640 corresponds to system version 750, the system name 2642 corresponds to system name 752, the device name 2644 corresponds to device name 754, the client version 2646 corresponds to client version 756. The dictionary items 2654 found in the peer dictionary views includes a dictionary item name 2650 and dictionary item value 2652.

Referring now to FIG. 27, the Photo View 2700, selecting the album navigation control 2702 "back" allows the user to navigate to the view from which they came. The middle instruction text 2704 "all images" describes the contents of the view. Selecting the album cancel control 2706 "cancel" allows the user to navigate back to the view from which they came without saving any changes they made while in the view. The album middle instruction text 2708 "pick some images" provides the user with instructions as to operates available while in the view. Selecting the album done control 2709 "done" allows the user to navigate back to the view from which they came while saving changes made while in the view. The album group 2710 shows the various "album" types within the overall image collection available to the device. In the exemplary interface shown in FIG. 27, there are three albums types: all images 2710-1, albums 2710-2, and smart albums 2710-3. Each album group 2710 is comprised of an album type name 2714 and an album item 2712. Each album item 2712 includes an album cover image 2716, album title 2718, album image count 2720, and an album navigation control 2722. The album navigation control 2722 allows the user to navigate to the underlying album view, for example the album views shown in FIGS. 28A and 28B. The capture selector control 2740 invokes the capture view as shown in FIGS. 29A through 29D.

Referring now to FIG. 28A, the photo album item view 2800 shows an expanded view of an album item 2712 from FIG. 27. Selecting the album navigation control 2802 "back" allows the user to navigate to the view from which they came. The middle instruction text 2804 "all images" describes the contents of the view. Selecting the album cancel control 2806 "all images" allows the user to navigate back to the view from which they came without saving any changes they made while in the view. The album middle instruction text 2808 "pick some images" provides the user with instructions as to operates available while in the view. Selecting the album done control 2810 "done" allows the user to navigate back to the view from which they came while saving changes made while in the view. The middle instruction text 2812 "Camera Roll" shows the album title 2718. The image wells 2814 show the contents of the album in a scrollable view. The capture selector control 2840 invokes the capture view as shown in FIGS. 29A through 29D. The photos selected indicator 2842 "0" shows the number of images currently selected. Referring now to FIG. 28B, photos selected indicator 2842 "3" shows the number of images currently selected 2844. In one aspect of the present disclosure, images may be designated based on user input, and sent to specific devices based on second user inputs. In another aspect of the present disclosure, images may be designated based on user input, and sent to all devices in communication range.

Referring now to FIG. 29A, the single image view 2900, the flash toggle switch 2902 operates to display the flash controls 2912 of FIG. 29B. When enabled, the user may select between "Auto", "On, and "Off", after which the controls disappear. The cancel control 2904 operates to return the view to the previous view. The pop-up indicator 2906 operates to remind the user that the capture view is being displayed as a pop-up. The front face/back face toggle switch 2908 toggles the camera orientation. If the camera is current front facing, then it will transition to backwards facing, and vice versa. The capture actuator 2910 operates to instruct the capture subsystem to take a picture.

Referring now to FIGS. 29C and 29D, the single image view 2900 in vertical orientation (FIG. 29C) and horizontal orientation (FIG. 29D). Once an image has been taken, the retake image control 2916 operates to return the user to the capture views of FIGS. 29A and 29B. The use photo control 2918 operates to save the image and return the users to the capture views of FIGS. 29A and 29B.

Referring now to FIG. 30, an alternate view of the display of the mobile device 20-1 while in capture mode. The display shows four users 3004-[1:4], each carrying a mobile device 20 (not shown) running the described system. A face detection indicator frame 3002-[1:4] of each detected subject 3004-[1:4] is highlighted in the live viewfinder 3000 of the mobile device 20-1 presented on the display 3452 of the device. Using augmented reality techniques, metadata 3008-[1:4] for the user 3004-[1:4] of each mobile device 20 may be shown overlaid on the viewfinder image 3000. The metadata 3008 displayed may be sourced from the identification information 728 if optionally provided. This metadata may include for example a name 730 and/or graphical identifier 732. The metadata 3008 may also include the subject face image 706 if optionally provided.

Referring now to FIG. 31A, outgoing images view 3100 shows images stored in the outgoing images queue 302. Selecting the navigation control 3102 "Back" returns the user to the previous view.

The table description text 3104 "Outgoing Images" displays the name of the table. Selecting the edit control 3106 "Edit" operates to display the view shown in FIG. 31C allowing the user to delete images 902 from the queue. The outgoing images view 3100 displays any number of images in a table 3108 allowing navigation to individual outgoing image 3136. Each image item 3108-4 is comprised of a thumbnail image 3110, delivery status 3112, list of addresses 3116, and a navigation control 3114. The outgoing delivery status 3112 may be one of "pending", "sending", and "sent". The list of addresses 3116 may be set in the Image Envelope 900 by the Peer Evaluator 800. In another aspect of the present disclosure, images may be designated based on user input, and addressed to specific devices based on second user inputs. In another aspect of the present disclosure, images may be designated based on user input, and sent to all devices in communication range. The navigation control 3114 operates to display an expanded view 3136 of the image 902 as shown in FIG. 31D.

Referring now to FIG. 31B, a pop-up menu 3120 is shown. The pop-menu includes a title 3122. The Number Picked Images Text 3126 operates to display the number of images 902 in the queue. The Next Image to Send Text 3128 operates to identify the next image 902 in the queue to send. The Total Images Sent Text 3130 operates to identify total number of images 902 sent.

Referring now to FIG. 31C, editing controls are presented. The delete control 3130 allows an individual image to be removed. The marked indicator 3132 allows an individual image 902 to be selected. The reorder control 3134 allows an individual image 902 to be moved in position within the table list 3108.

Referring now to FIG. 31D, a single image view is presented. An expanded view 3136 of the image is displayed. The delivery status 3112 and list of addresses 3116 are shown.

Referring now to FIG. 32A, incoming images view 3200 shows images stored in the incoming images queue 308. Selecting the navigation control 3202 "Back" returns the user to the previous view.

The table description text 3204 "Incoming Images" displays the name of the table. Selecting the edit control 3206 "Edit" operates to display the view shown in FIG. 31C allowing the user to delete images from the queue. The incoming images view 3200 displays any number of images 3208 navigate to individual image 3210. Each image item 3208-4 is comprised of a thumbnail image 3210, delivery status 3212, sender 3216, and a navigation control 3214. The incoming delivery status 3212 may be one of "pending", "receiving", and "received". The sender 3216 may be set in the Image Envelope 900 by the Peer Evaluator 800. The navigation control 3214 operates to display an expanded view 3236 of the image as shown in FIG. 31D.

Referring now to FIG. 32B, a pop-up menu 3220 is shown. The pop-menu includes a title 3222. The Total Images Received Text 3224 indicates the total number of images received.

Referring now to FIG. 32C, editing controls are presented. The delete control 3230 allows an individual image to be removed. The marked indicator 3232 allows an individual image 902 to be selected. The reorder control 3234 allows an individual image to be moved in position within the table list 3208.

Referring now to FIG. 32D, a single image view is presented. An expanded view 3236 of the image is displayed. The delivery status 3212 and list of addresses 3216 are shown.

System Block Diagrams

FIG. 33 is a block diagram illustrating components of a machine 3300, according to some embodiments, able to read instructions from a machine-readable medium 3338 (e.g., a machine-readable storage medium) and perform any one or more of the methodologies discussed herein. Specifically, FIG. 33 shows a diagrammatic representation of the machine 3300 in the example form of a computer system, within which instructions 3316 (e.g., software, a program, an application, an applet, an app, client, or other executable code) for causing the machine 3300 to perform any one or more of the methodologies discussed herein can be executed. In alternative embodiments, the machine 3300 operates as a standalone device or can be coupled (e.g., networked) to other machines 3300. In a networked deployment, the machine 3300 may operate in the capacity of a server machine or a client machine in a server-client network environment, or as a peer machine in a peer-to-peer (or distributed) network environment. The machine 3300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), a digital picture frame, a TV, an Internet-of-Things (IoT) device, a camera, other smart devices, a web appliance, a network router, a network switch, a network bridge, or any machine capable of executing the instructions 3316, sequentially or otherwise, that specify actions to be taken by the machine 3300. Further, while only a single machine 3300 is illustrated, the term "machine" shall also be taken to include a collection of machines 3300 that individually or jointly execute the instructions 3316 to perform any one or more of the methodologies discussed herein.

In various embodiments, the machine 3300 comprises processors 3310, memory 3330, and I/O components 3350, which can be configured to communicate with each other via a bus 3302. In an example embodiment, the processors 3310 (e.g., a central processing unit (CPU), a reduced instruction set computing (RISC) processor, a complex instruction set computing (CISC) processor, a graphics processing unit (CPU), a digital signal processor (DSP), an application specific integrated circuit (ASIC), a radio-frequency integrated circuit (RFIC), another processor, or any suitable combination thereof) include, for example, a processor 3312 and a processor 3314 that may execute the instructions 3316. The term "processor" is intended to include multi-core processors 3310 that may comprise two or more independent processors 3312, 3314 (also referred to as "cores") that can execute instructions 3316 contemporaneously. Although FIG. 33 shows multiple processors 3310, the machine 3300 may include a single processor 3310 with a single core, a single processor 3310 with multiple cores (e.g., a multi-core processor 3310), multiple processors 3312, 3314 with a single core, multiple processors 3310, 3312 with multiples cores, or any combination thereof.

The memory 3330 comprises a main memory 3332, a static memory 3334, and a storage unit 3336 accessible to the processors 3310 via the bus 3302, according to some embodiments. The storage unit 3336 can include a machine-readable medium 3338 on which are stored the instructions 3316 embodying any one or more of the methodologies or functions described herein. The instructions 3316 can also reside, completely or at least partially, within the main memory 3332, within the static memory 3334, within at least one of the processors 3310 (e.g., within the processor's cache memory), or any suitable combination thereof, during execution thereof by the machine 3300. Accordingly, in various embodiments, the main memory 3332, the static memory 3334, and the processors 3310 are considered machine-readable media 3338.

As used herein, the term "memory" refers to a machine-readable medium 3338 able to store data temporarily or permanently and may be taken to include, but not be limited to, random-access memory (RAM), read-only memory (ROM), buffer memory, flash memory, and cache memory. While the machine-readable medium 3338 is shown, in an example embodiment, to be a single medium, the term "machine-readable medium" should be taken to include a single medium or multiple media (e.g., a centralized or distributed database, or associated caches and servers) able to store the instructions 3316. The term "machine-readable medium" shall also be taken to include any medium, or combination of multiple media, that is capable of storing instructions (e.g., instructions 3316) for execution by a machine (e.g., machine 3300), such that the instructions 3316, when executed by one or more processors of the machine 3300 (e.g., processors 3310), cause the machine 3300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 3350 include a wide variety of components to receive input, provide output, produce output, transmit information, exchange information, capture measurements, and so on. In general, it will be appreciated that the I/O components 3350 can include many other components that are not shown in FIG. 33. Likewise, not all machines will include all I/O components 3350 shown in this exemplary embodiment. The I/O components 3350 are grouped according to functionality merely for simplifying the following discussion, and the grouping is in no way limiting. In various example embodiments, the I/O components 3350 include output components 3352 and input components 3354. The output components 3352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 3354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 3350 include biometric components 3356, motion components 3358, environmental components 3360, position components 3362, among a wide array of other components. For example, the biometric components 3356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 3358 include acceleration sensor components (e.g., accelerometer), gravitation sensor components, rotation sensor components (e.g., gyroscope), and so forth. The environmental components 3360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 3362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 3350 may include communication components 3364 operable to couple the machine 3300 to other device(s) 3370 and networks 3380 or via a coupling 3372 and a coupling 3382, respectively. For example, the communication components 3364 include a network interface component or another suitable device to interface with the network 3380. In further examples, communication components 3364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 3370 may be another machine 3300 or any of a wide variety of peripheral devices (e.g., a peripheral device coupled via a Universal Serial Bus (USB)).

Moreover, in some embodiments, the communication components 3364 detect identifiers or include components operable to detect identifiers. For example, the communication components 3364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 3364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 3380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 3380 or a portion of the network 3380 may include a wireless or cellular network, and the coupling 3380 may be a Code Division Multiple Access (CDMA) connection, a Global System for Mobile communications (GSM) connection, or another type of cellular or wireless coupling. In this example, the coupling 3382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 3316 are transmitted or received over the network 3380 using a transmission medium via a network interface device (e.g., a network interface component included in the communication components 3364) and utilizing any one of a number of well-known transfer protocols (e.g., Hypertext Transfer Protocol (HTTP)). Similarly, in other example embodiments, the instructions 3316 are transmitted or received using a transmission medium via the coupling 3372 (e.g., a peer-to-peer coupling) to the devices 3370. The term "transmission medium" shall be taken to include any intangible medium that is capable of storing, encoding, or carrying the instructions 3316 for execution by the machine 3300, and includes digital or analog communications signals or other intangible media to facilitate communication of such software.

Furthermore, the machine-readable medium 3338 is non-transitory (not having any transitory signals) in that it does not embody a propagating signal. However, labeling the machine-readable medium 3338 "non-transitory" should not be construed to mean that the medium is incapable of movement; the medium 3338 should be considered as being transportable from one physical location to another. Additionally, since the machine-readable medium 3338 is tangible, the medium 3338 may be considered to be a machine-readable device.

In the embodiments described herein, the other devices 3370 may include the mobile device 20 and server device 60. The network 3380 may include the network 15.

FIG. 34 is a block diagram 3400 illustrating an exemplary software architecture 3402, which can be employed on any one or more of the machines 3300 described above. FIG. 34 is merely a non-limiting example of a software architecture, and it will be appreciated that many other architectures can be implemented to facilitate the functionality described herein. Other embodiments may include additional elements not shown in FIG. 34 and not all embodiments will include all of the elements of FIG. 34. In various embodiments, the software architecture 3402 is implemented by hardware such as machine 3300 of FIG. 33 that includes processors 3310, memory 3330, and I/O components 3350. In this example architecture, the software architecture 3402 can be conceptualized as a stack of layers where each layer may provide a particular functionality. For example, the software architecture 3402 includes layers such as an operating system 3404, libraries 3406, frameworks 3408, and applications 3410. Operationally, the applications 3410 invoke application programming interface (API) calls 3412 through the software stack and receive messages 3414 in response to the API calls 3412, consistent with some embodiments.

In various implementations, the operating system 3404 manages hardware resources and provides common services. The operating system 3404 includes, for example, a kernel 3420, services 3422, and drivers 3424. The kernel 3420 acts as an abstraction layer between the hardware and the other software layers, consistent with some embodiments. For example, the kernel 3420 provides memory management, processor management (e.g., scheduling), component management, networking, and security settings, among other functionality. The services 3422 can provide other common services for the other software layers. The drivers 3424 are responsible for controlling or interfacing with the underlying hardware, according to some embodiments. For instance, the drivers 3424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In some embodiments, the libraries 3406 provide a low-level common infrastructure utilized by the applications 3410. The libraries 3406 can include system libraries 3430 (e.g., C standard library) that can provide functions such as memory allocation functions, string manipulation functions, mathematic functions, and the like. In addition, the libraries 3406 can include API libraries 3432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 3406 can also include a wide variety of other libraries 3434 to provide many other APIs to the applications 3410.

The frameworks 3408 provide a high-level common infrastructure that can be utilized by the applications 3410, according to some embodiments. For example, the frameworks 3408 provide various graphic user interface (GUI) functions, high-level resource management, high-level location services, and so forth. The frameworks 3408 can provide a broad spectrum of other APIs that can be utilized by the applications 3410, some of which may be specific to a particular operating system 3404 or platform.

According to some embodiments, the applications 3410 are programs that execute functions defined in the programs. Various programming languages can be employed to create one or more of the applications 3410, structured in a variety of manners, such as object-oriented programming languages (e.g., Objective-C, Java, or C++) or procedural programming languages (e.g., C or assembly language). In a specific example, the third-party application 3466 (e.g., an application 3410 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 3466 can invoke the API calls 3412 provided by the operating system 3404 to facilitate functionality described herein.

FIG. 35 is a block diagram 3500 of the mobile device 20, which is an embodiment of the hardware architecture of FIG. 33 and the software architecture of FIG. 34. Most mobile devices 20, modern cellular phones for example, will incorporate most if not all the element described in FIGS. 33 & 34.

Referring now to FIG. 35, the mobile device 20 includes a controller 3504 communicatively connected to memory 3506, one or more communications interfaces 3508, one or more user interface components 3510, and one or more storage devices 3512, and location components 3514 by a bus 3502 or similar mechanism. The controller 3504 may be, for example a microprocessor, digital ASIC, FPGA, or the like. In the embodiment of FIG. 35, the controller 3504 is a microprocessor, and the client 200 is implemented in software and stored in the memory 3506 for execution by the controller 3504. However, the present disclosure is not limited thereto. The aforementioned functions and module may be implemented in software, hardware, or a combination thereof. Further, the repositories 1300-1 may be stored in the one or more secondary storage components 3512. The mobile device 20 also includes a communication interface 3508 enabling the mobile device 20 to connect to the network 15. For example, the communications interface 3508 may be a local wireless interface such as a wireless interface operating according to one of the suite of IEEE 802.11 standards, BLUETOOTH®, or the like. However, the present disclosure is not limited thereto. The one or more user interface components 3510 include, for example, a touchscreen, a display, one or more user input components (e.g., a keypad), a speaker, or the like, or any combination thereof. The storage component(s) 3512 is a non-volatile memory. In this embodiment, the location component 3514 is a hardware component, such as a GPS receiver. However, the present invention is not limited thereto.

FIG. 36 is a graphical illustration 3600 of the server device 60. The server device 60 is also an instance the hardware architecture of FIG. 33 and the software architecture of FIG. 34, however in most embodiments the server device 60 will be a stripped-down implementation of the machine 3300. For example, a server device 60 may be a rack mount server and/or a blade server and may lack many of the sensors and I/O components shown FIG. 33. Server devices 60 are often optimized for speed, throughput, power consumption, and reliability.

Referring to FIG. 36, the server device 60 includes a controller 3604 communicatively connected to memory 3606, one or more communications interfaces 3608, and one or more storage devices 3612 by a bus 3602 or similar mechanism. The controller 3604 may be, for example a microprocessor, digital ASIC, FPGA, or the like. In this embodiment, the controller 3604 is a microprocessor, and the server module is implemented in software and stored in the memory 3606 for execution by the controller 3604. However, the present disclosure is not limited thereto. The aforementioned module may be implemented in software, hardware, or a combination thereof. The server device 60 also includes a communication interface 3608 enabling the server device 60 to connect to the network 15. For example, the communications interface 3608 may be a wired interface such as an Ethernet interface. However, the present disclosure is not limited thereto. The server repository may be stored in the one or more secondary storage components 3612. The secondary storage components 3612 may be digital data storage components such as, for example, one or more hard disk drives. However, the present invention is not limited thereto.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Throughout this specification, like reference numbers signify the same elements throughout the description of the figures.

When elements are referred to as being "connected" or "coupled", the elements can be directly connected or coupled together, or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media is non-transitory and includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage components, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The methodologies presented herein are described around the use of still image capture, but they are not restricted thereto. The same principles may be applied to the presentation of video clips captured at a location and should be considered within the scope of the present application.

Those skilled in the art will recognize improvements and modifications to the embodiments of the present disclosure. All such improvements and modifications are considered within the scope of the concepts disclosed herein and the claims that follow.

What is claimed is:

1. A system for sharing an image without using a server device comprising:
   a first mobile phone associated with a first user comprising:
      a first memory and a first processor, associated with a first communication subsystem, operable to:
         capture a first image of a face of the first user of the first mobile phone;
         determine a first facial template based on the first image;
         send first information over a first connection, the first information including the first facial template; and
      the first communication subsystem operable to:
         couple the first mobile phone to a second mobile phone over the first connection and a second connection; and
   the second mobile phone associated with a second user comprising:
      a second communication subsystem operable to:
         couple the second mobile phone to the first mobile phone over the first connection and the second connection; and
      a second memory and a second processor, associated with the second communication subsystem, operable to:
         receive the first information;
         capture a second image;
         detect, using facial detection, a subject face appearing in the second image, the subject face defining the face of a person;
         determine a second facial template from the subject face appearing in the second image;
         determine, using the first facial template and the second facial template, a match based on a computation of a face match probability, a position match probability, and an orientation match probability; and
         in response to capturing the second image and determining the match, automatically send to the first mobile phone the second image over the second connection, wherein the first mobile phone and the second mobile phone are operable to share the second image without using either a cellular network or an infrastructure WIFI network and wherein the first connection and the second connection are single hop networks.

2. The system of claim 1 wherein to send to the first mobile phone the second image the second mobile phone is further operable to:
   determine a notification score based on a computation of the face match probability, the position match probability, and the orientation match probability; and
   send to the first mobile phone the second image based on the notification score.

3. The system of claim 2 wherein to send the second image based on the notification score the second mobile phone is further operable to:
   perform a comparison of the notification score to a threshold value; and
   based on the comparison, send to the first mobile phone the second image.

4. The system of claim 1 wherein the first information comprises identity information including one or more of:
   an alphanumeric name of the first user associated with the first mobile phone, the alphanumeric name not uniquely identifying the first user;
   a graphical element representing the first user of the first mobile phone, the graphical element not being an image of the face of the first user; and
   an image of the face of the first user of the first mobile phone.

5. The system of claim 1 wherein the first information comprises communication preferences including one or more of:
   a network address at which the first user of the first mobile phone may be contacted;
   a first preference identifying how the first user of the first mobile phone will be sent the second image; and
   a second preference identifying additional notification types to be sent, the additional notification types including one or more of image viewing events and face appearances in a live viewfinder.

6. The system of claim 1 wherein the first facial template and the second facial template are numerical parameters representing faces corresponding to the first user and the subject face appearing in the second image.

7. The system of claim 1 wherein:
   the first communication subsystem is comprised of a first network interface and a second network interface; and
   the second communication subsystem is comprised of a third network interface and a fourth network interface.

8. The system of claim 7 wherein:
   the first network interface and the third network interface are each compliant to at least one version of a Bluetooth communication protocol; and
   the second network interface and the fourth network interface are WIFI interfaces each compliant to at least one version of a WIFI Direct protocol.

9. The system of claim 8 wherein:
   the first network interface of the first communication subsystem is operable to:
      advertise the first information; and
   the third network interface of the second communication subsystem is operable to:
      browse for the first information.

10. The system of claim 8 wherein:
    the second network interface of the first communication subsystem is operable to:
       receive the second image; and
    the fourth network interface of the second communication subsystem is operable to:
       send the second image.

11. The system of claim 1 wherein to provide a live viewfinder on the second mobile phone, the second mobile phone is further operable to periodically:
    capture an updated viewfinder image;
    determine a third facial template from an other subject face detected in the updated viewfinder image;
    perform a second comparison of the first facial template to the third facial template to determine a second match;

in second response to determining the second match, present a detection frame around the other subject face detected in the updated viewfinder image; and
send to the first mobile phone a notification.

12. The system of claim 11 wherein the second mobile phone is further operable to:
send the notification, in response to the second match, indicating to the first mobile phone that the face of the first user of the first mobile phone appears in the updated viewfinder image and is subject to appear in a future captured image.

13. The system of claim 11 wherein the second mobile phone is further operable to:
determine a position within the updated viewfinder image of the other subject face appearing in the updated viewfinder image; and
display, in an area adjacent to the position within the updated viewfinder image of the other subject face appearing in the updated viewfinder image, identity information, the identity information included in the first information.

14. The system of claim 11, wherein to detect the other subject face appearing in the second image, the second mobile phone further operable to:
detect other faces appearing in the updated viewfinder image, the other faces corresponding to other users of other mobile phones; and
based on geographical positions of the other mobile phones, adjust notification scores of ones of the other users of the other mobile phones, the geographical positions obtained from location information included in the first information.

15. The system of claim 14, wherein to adjust the notification scores of the ones of the other users of the other mobile phones, the second mobile phone is operable to:
determine a field of view of a camera subsystem of the second mobile phone;
determine, using the geographical positions of the other users of the other mobile phones, the ones of the other users of the other mobile phones that are not currently in the field of view of the camera subsystem of the second mobile phone; and
adjust the notification scores of the ones of the other users of the other mobile phones.

16. The system of claim 1 wherein to determine the match, faces in the second image are detected and matched, but not uniquely identified.

17. The system of claim 1 wherein to send the second image to the first mobile phone the second mobile phone is further operable to:
send one or more of:
a full resolution version of the second image,
a thumbnail of the second image, and
an identifier usable to receive the second image from the second mobile phone.

18. The system of claim 1 wherein the first mobile phone and the second mobile phone are not configured to share data with each other through a common sharing service and are configured to directly send and directly receive information to and from each other over a first connection and a second connection.

19. A first mobile phone associated with a first user comprising:
a first communication subsystem operable to:
couple the first mobile phone to a second mobile phone over a first connection and a second connection; and
a first memory and a first processor, associated with the first communication subsystem, operable to:
capture a first image of a face of the first user of the first mobile phone;
determine a first facial template based on the first image;
send first information over the first connection, the first information including the first facial template; and
receive from the second mobile phone associated with a second user, a second image, the second image automatically sent from the second mobile phone over the second connection in response to capturing the second image and determining a match, the match determined based on a computation of a face match probability, a position match probability, and an orientation match probability using the first facial template and a second facial template, the second facial template determined from a subject face appearing in the second image, the second image captured at the second mobile phone, the first facial template received from the first mobile phone over the first connection,
wherein the first mobile phone and the second mobile phone are operable to share the second image without using either a cellular network or an infrastructure WIFI network and wherein the first connection and the second connection are single hop networks.

20. The first mobile phone of claim 19 wherein the first facial template and the second facial template are numerical parameters representing faces corresponding to the first user and the subject face appearing in the second image.

21. The first mobile phone of claim 20 wherein:
the first communication subsystem is comprised of a first network interface and a second network interface; and
the first network interface is compliant to at least one version of a Bluetooth communication protocol;
the second network interface is a WIFI interface compliant to at least one version of a WIFI Direct protocol.

22. The first mobile phone of claim 21 wherein:
the first network interface of the first communication subsystem is operable to:
advertise the first information over the first connection; and
the second network interface of the first communication subsystem is operable to:
receive the second image over the second connection.

23. A first mobile phone associated with a first user comprising:
a first communication subsystem operable to:
couple the first mobile phone to a second mobile phone over a first connection and a second connection; and
a first memory and a first processor, associated with the first communication subsystem, operable to:
receive first information from the second mobile phone over the first connection, the first information including a first facial template, the first facial template determined from a first image, the first image being an image of a face of a second user of the second mobile phone captured by the second mobile phone;
capture a second image;
detect, using facial detection, a subject face appearing in the second image, the subject face defining the face of a person;
determine a second facial template from the subject face appearing in the second image;
determine, using the first facial template and the second facial template, a match based on a computation of a face match probability, a position match probability, and an orientation match probability; and in response to capturing the second image and determining the match, automatically send to the first mobile phone the second image over the second connection, wherein the first mobile phone and the second mobile phone are operable to share the second image without using either a cellular network or an infrastructure WIFI network and wherein the first connection and the second connection are single hop networks.

24. The first mobile phone of claim 23 wherein the first facial template and the second facial template are numerical parameters representing faces corresponding to the first user and the subject face appearing in the second image.

25. The first mobile phone of claim 24 wherein:
the first communication subsystem is comprised of a first network interface and a second network interface;
the first network interface is compliant to at least one version of a Bluetooth communication protocol; and
the second network interface is a WIFI interface compliant to at least one version of a WIFI Direct protocol.

26. The first mobile phone of claim 25 wherein:
the first network interface of the first communication subsystem is operable to:
browse for the first information over the first connection; and
the second network interface of the first communication subsystem is operable to:
send the second image over the second connection.

* * * * *